(12) United States Patent
Paluri et al.

(10) Patent No.: US 12,375,712 B2
(45) Date of Patent: Jul. 29, 2025

(54) METHOD AND APPARATUS FOR PROCESSING VIDEO SIGNAL ON BASIS OF INTER PREDICTION

(71) Applicant: LG Electronics Inc., Seoul (KR)

(72) Inventors: Seethal Paluri, Seoul (KR); Seunghwan Kim, Seoul (KR); Mehdi Salehifar, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/738,522

(22) Filed: Jun. 10, 2024

(65) Prior Publication Data

US 2024/0333965 A1 Oct. 3, 2024

Related U.S. Application Data

(63) Continuation of application No. 17/419,869, filed as application No. PCT/KR2019/018792 on Dec. 31, 2019, now Pat. No. 12,010,336.

(60) Provisional application No. 62/787,357, filed on Jan. 1, 2019.

(51) Int. Cl.
| | |
|---|---|
| *H04N 19/52* | (2014.01) |
| *H04N 19/137* | (2014.01) |
| *H04N 19/176* | (2014.01) |
| *H04N 19/70* | (2014.01) |

(52) U.S. Cl.
CPC ......... *H04N 19/52* (2014.11); *H04N 19/137* (2014.11); *H04N 19/176* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 11,483,567 | B2* | 10/2022 | Paluri | H04N 19/31 |
| 11,528,484 | B2* | 12/2022 | Paluri | H04N 19/159 |
| 12,010,336 | B2* | 6/2024 | Paluri | H04N 19/139 |
| 2015/0256844 | A1* | 9/2015 | Ikai | H04N 19/36 382/233 |
| 2015/0382010 | A1* | 12/2015 | Rapaka | H04N 19/139 375/240.16 |
| 2016/0100171 | A1* | 4/2016 | Karczewicz | H04N 19/176 375/240.02 |

* cited by examiner

*Primary Examiner* — Lindsay J Uhl

(74) *Attorney, Agent, or Firm* — Fish & Richardson P.C.

(57) ABSTRACT

A method and device for processing a video signal are disclosed. More specifically, a method of processing a video signal based on inter prediction may comprise: deriving a motion vector predictor based on motion information of a neighboring block of a current block; deriving a motion vector difference of the current block based on layer information and index information; deriving a motion vector of the current block based on the motion vector predictor and the motion vector difference; generating a prediction block of the current block based on the motion vector of the current block; and generating a reconstructed block of the current block based on the prediction block and a residual block of the current block, wherein the layer information includes at least one syntax element indicating a layer group to which the current layer belongs.

9 Claims, 39 Drawing Sheets

[Fig. 1]
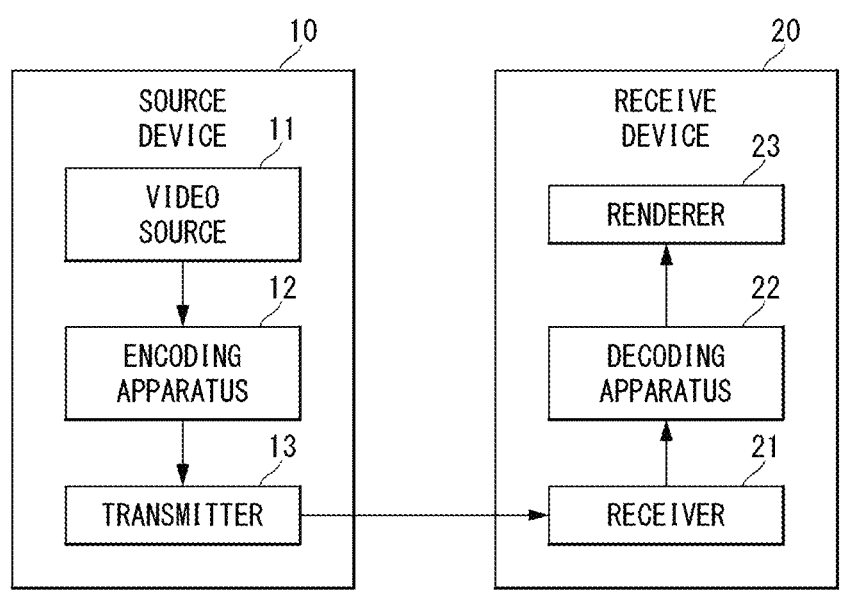

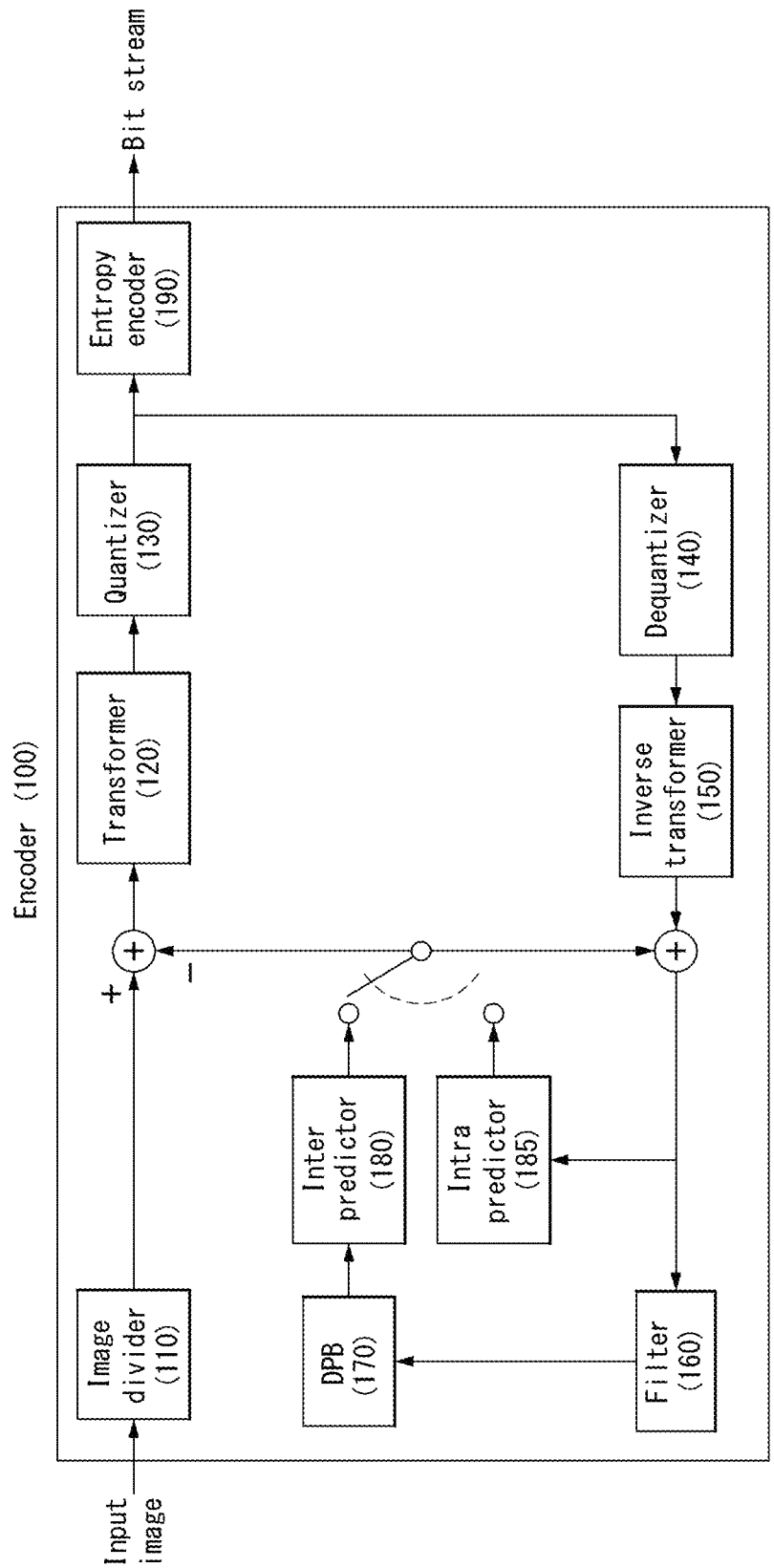
[FIG. 2]

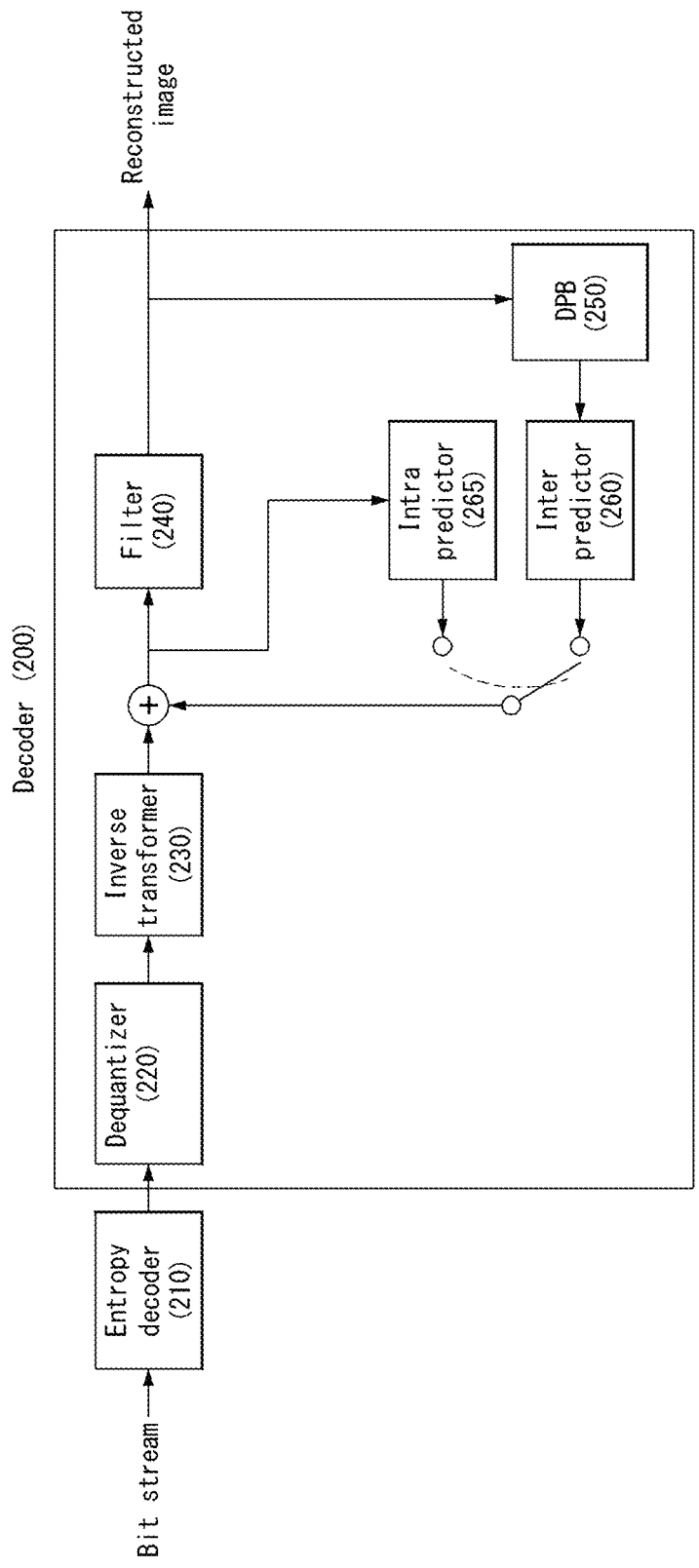

【Fig. 4】
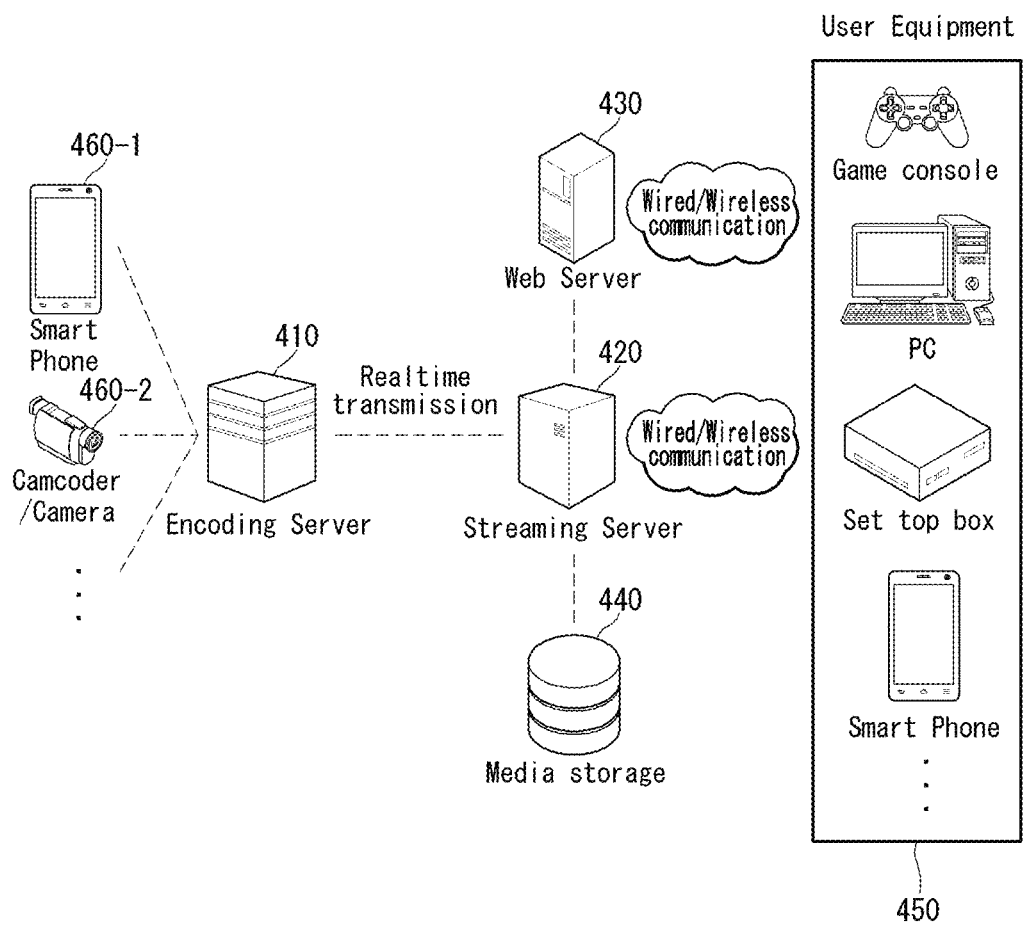
【Fig. 5】
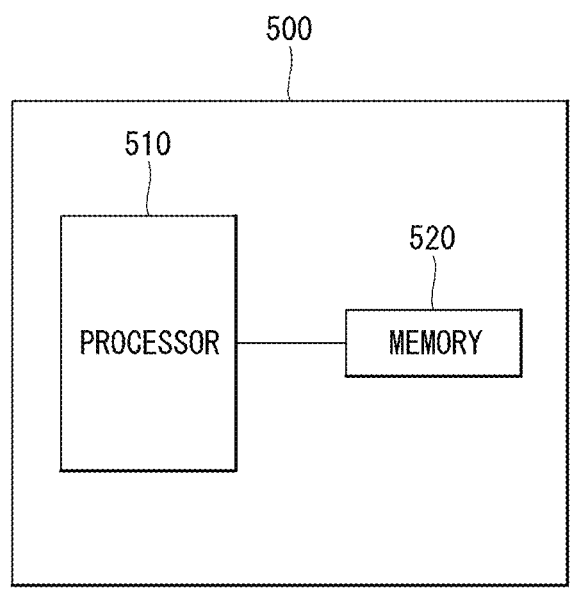

[Fig. 6A]
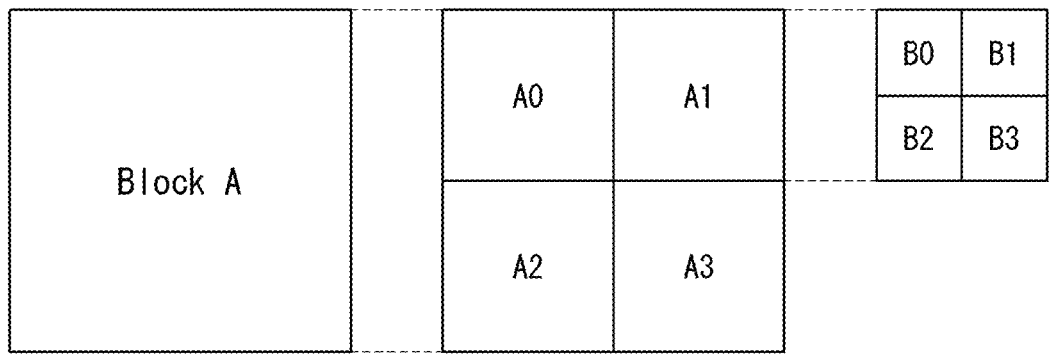
[Fig. 6B]
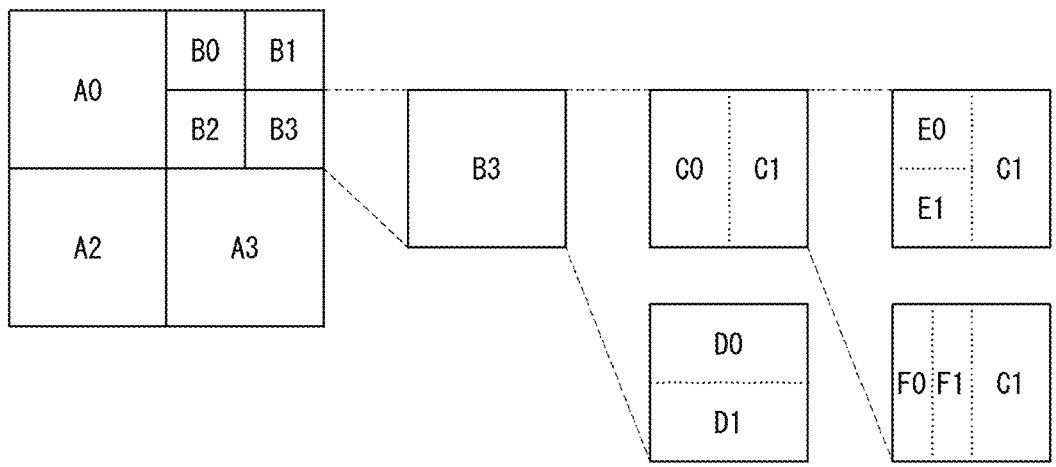
[Fig. 6C]
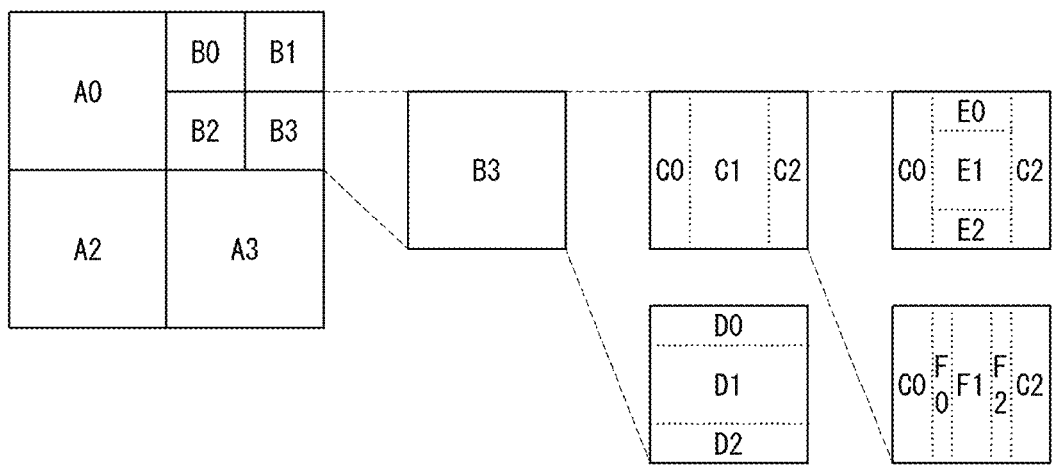

[Fig. 6D]
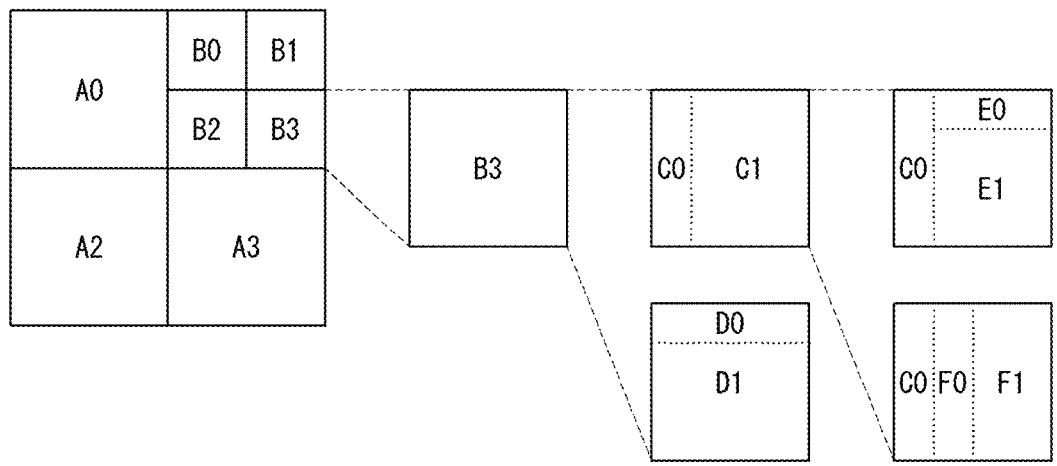
[Fig. 7]
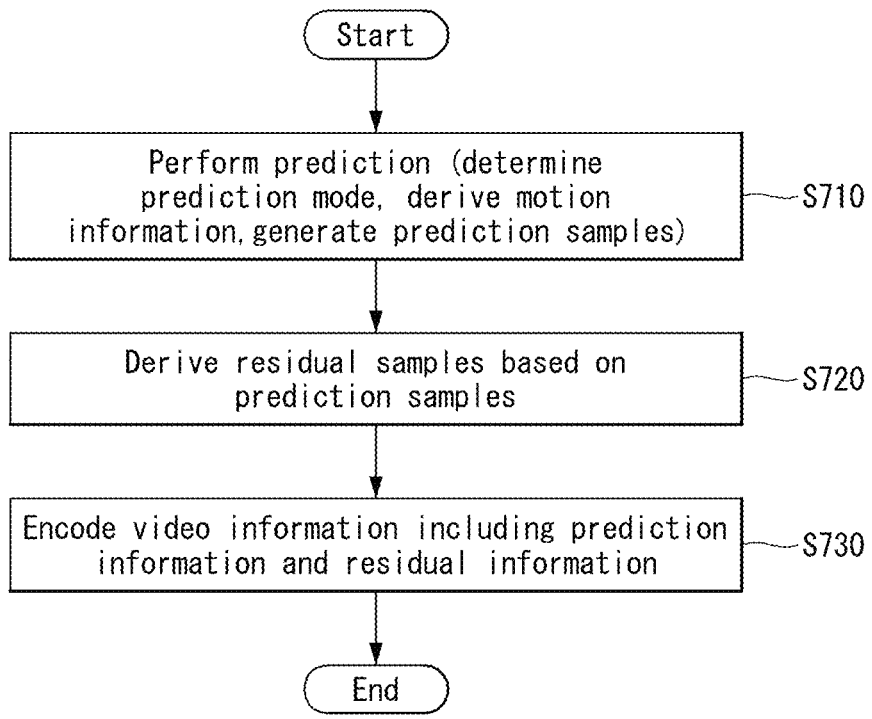

[Fig. 8]
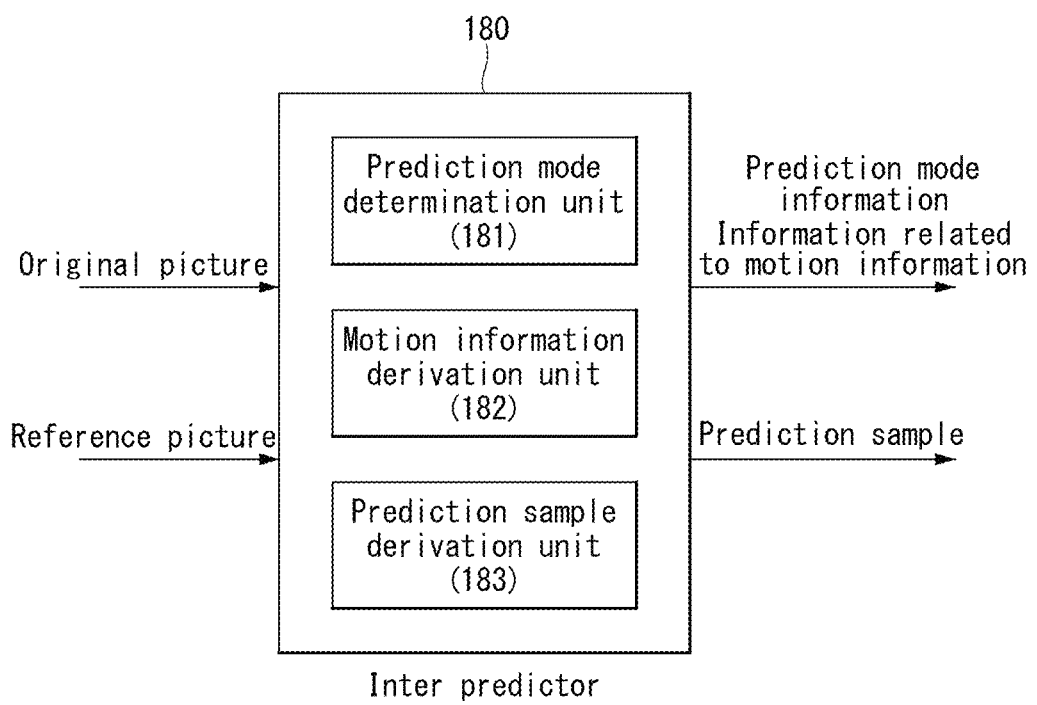

[Fig. 9]
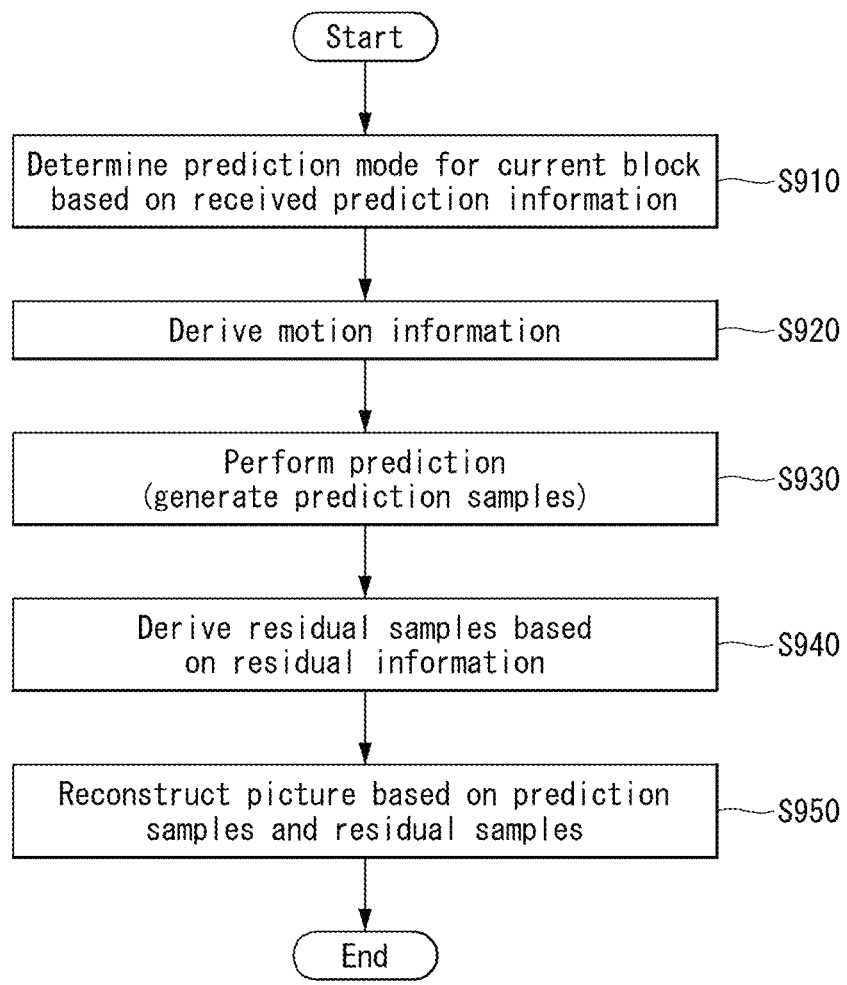

[Fig. 10]
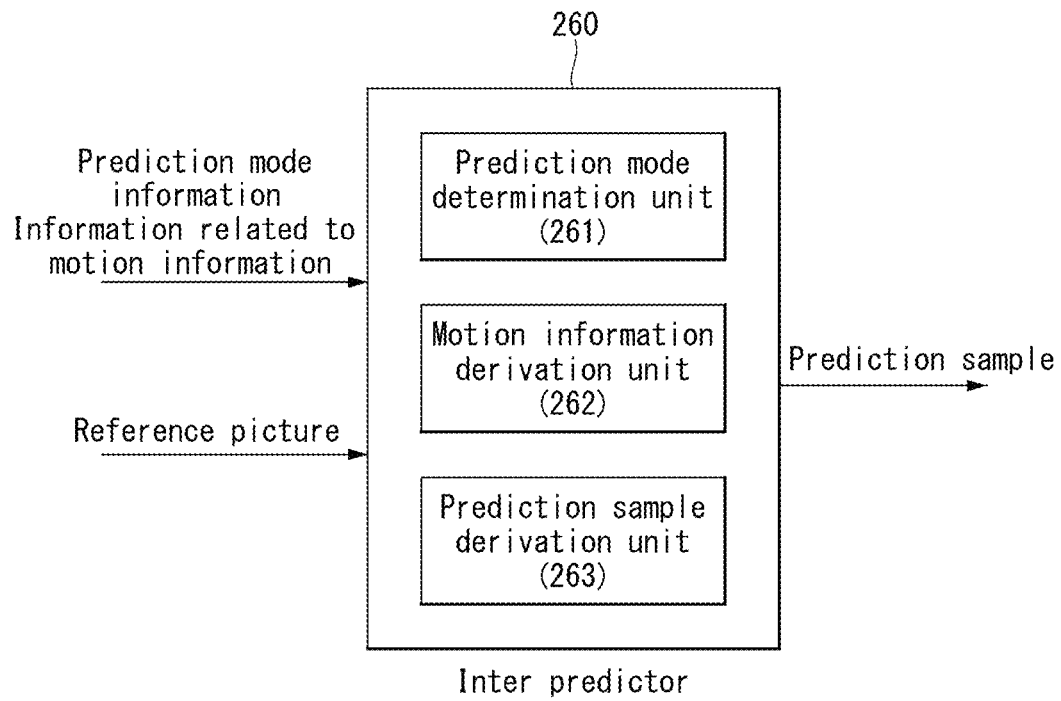
[Fig. 11]
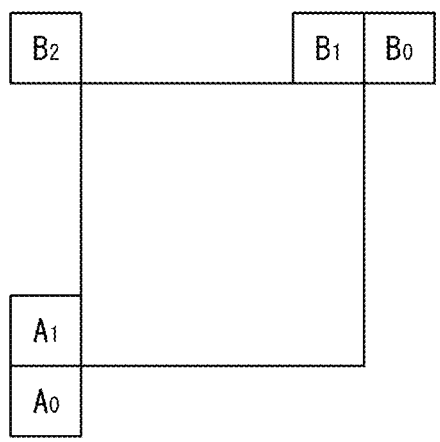

[Fig. 12]
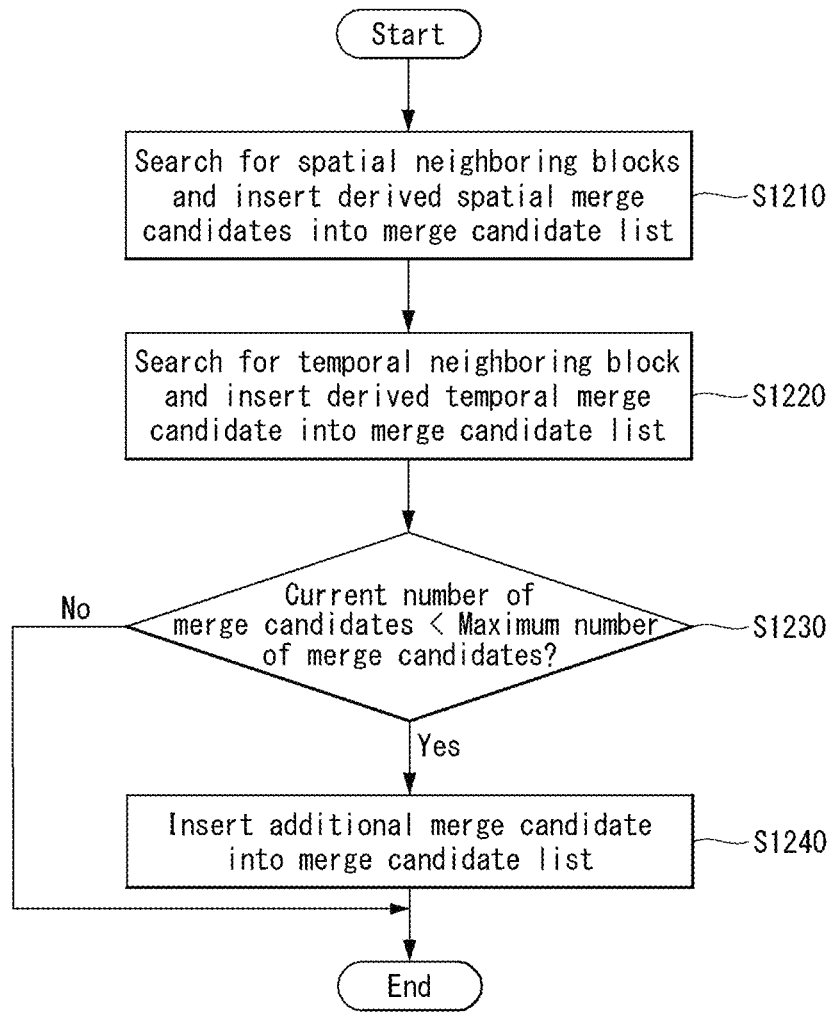

[Fig. 13]
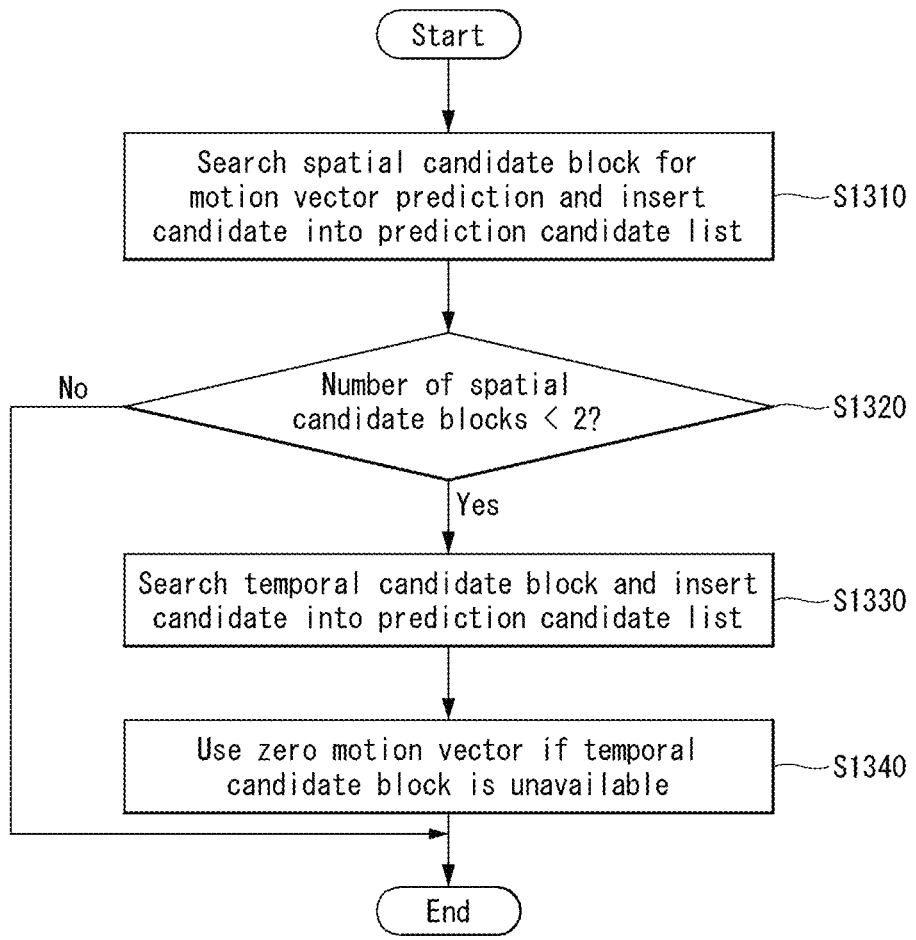

[Fig. 14]
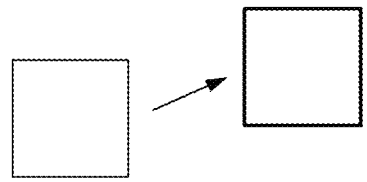
Translate
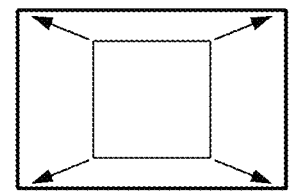
Scale
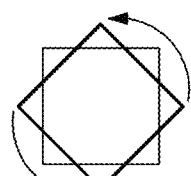
Rotate
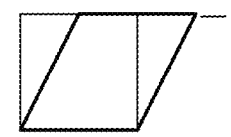
Shear
[Fig. 15]
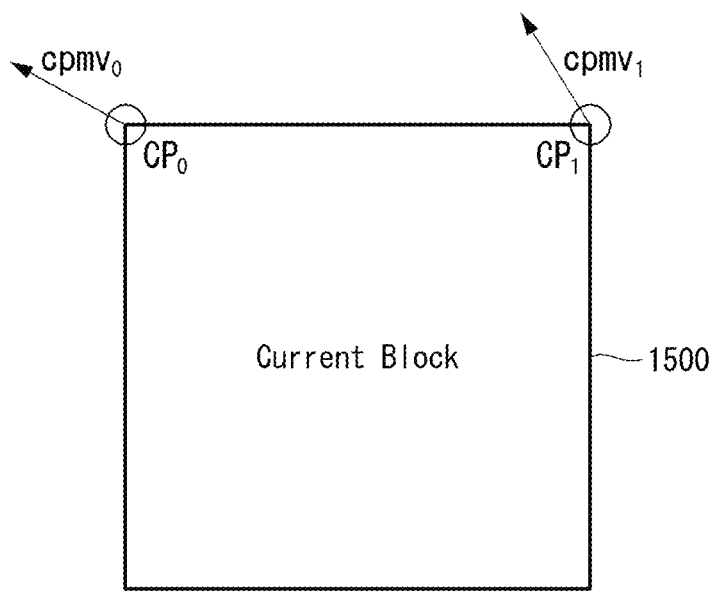

[Fig. 16]
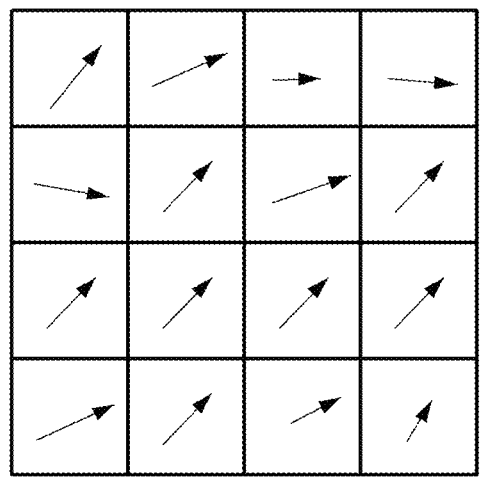
[Fig. 17]
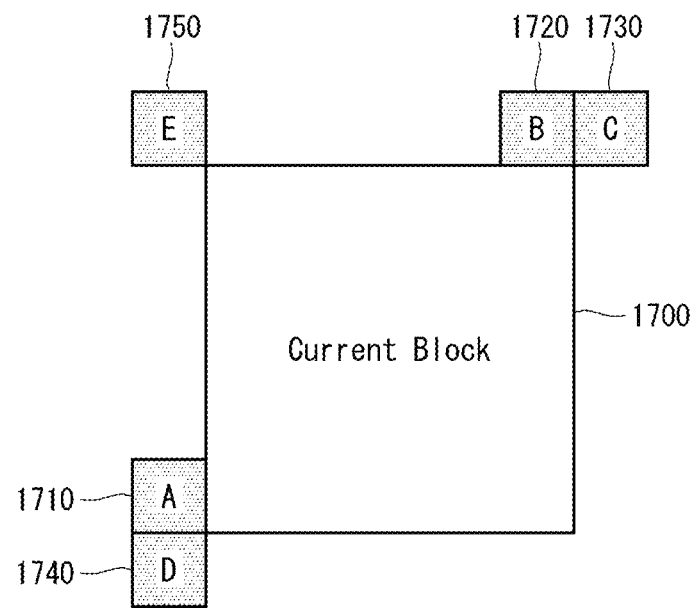

[Fig. 18]
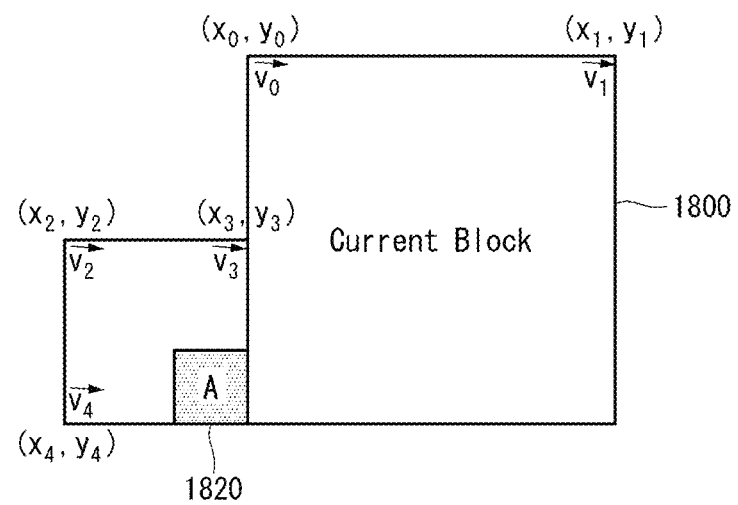

[Fig. 19]
(a)
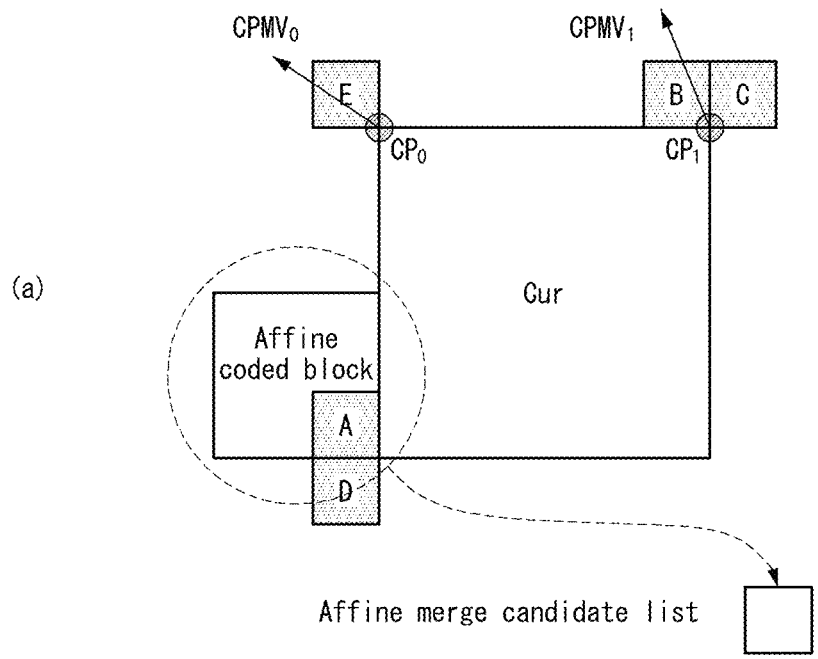
(b)
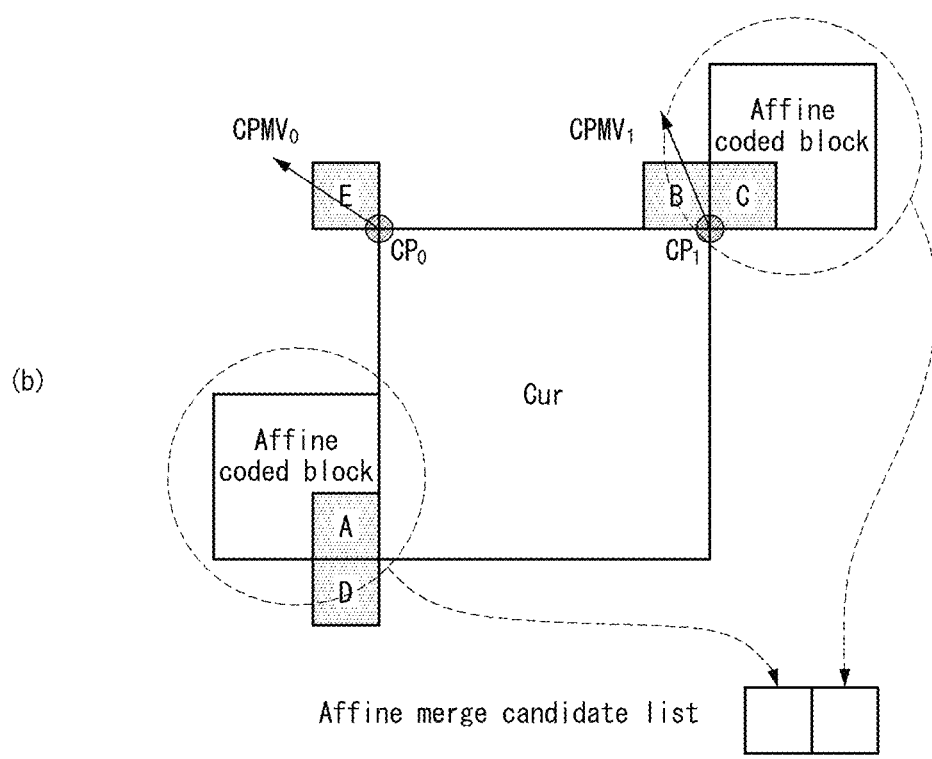

[Fig. 20]
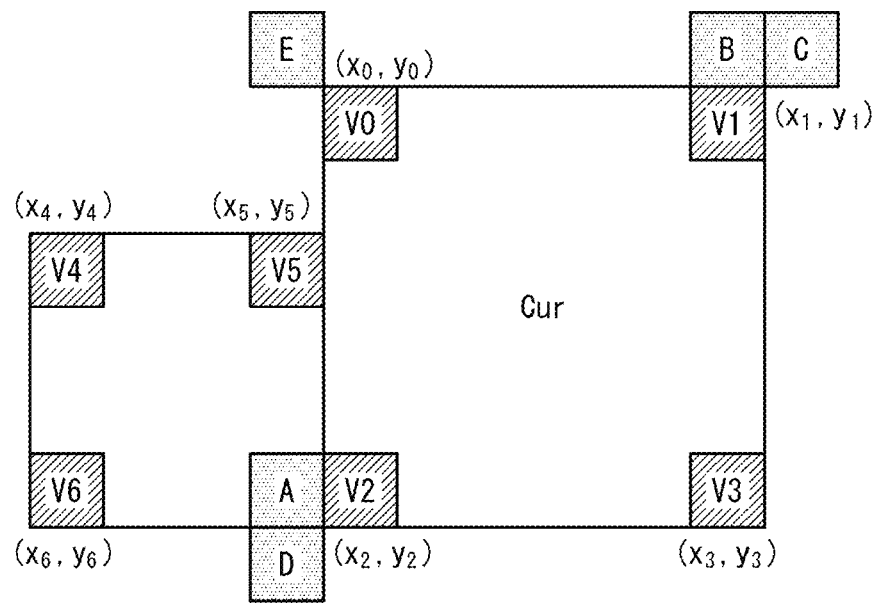
[Fig. 21]
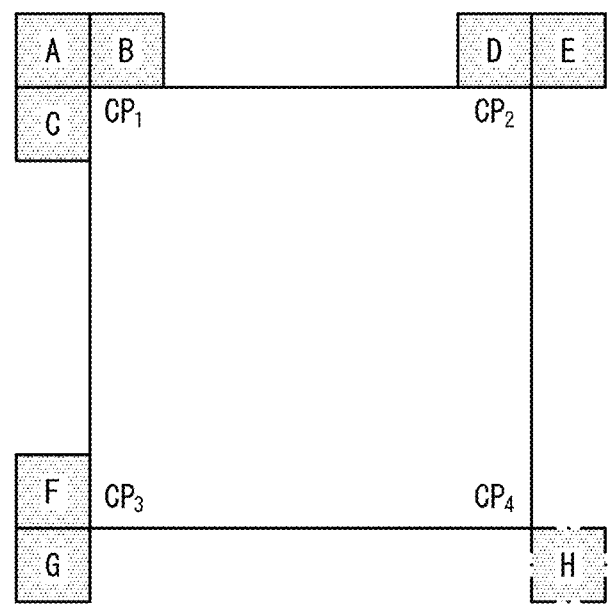

[Fig. 22]
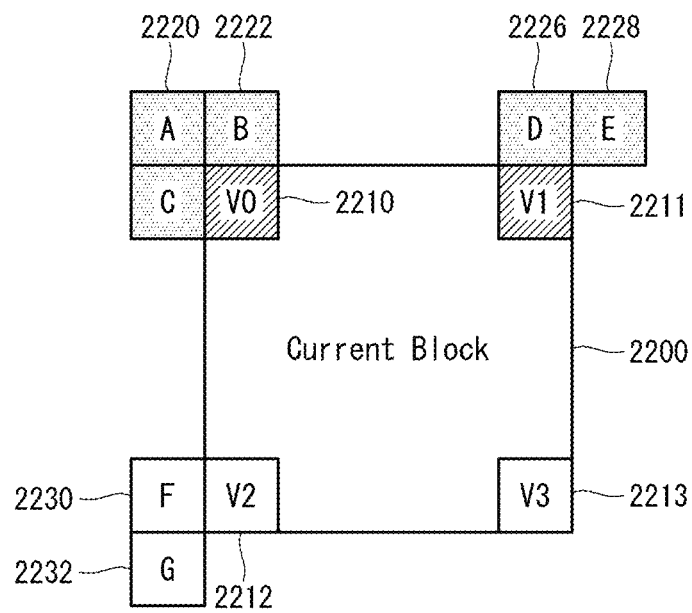
[Fig. 23]
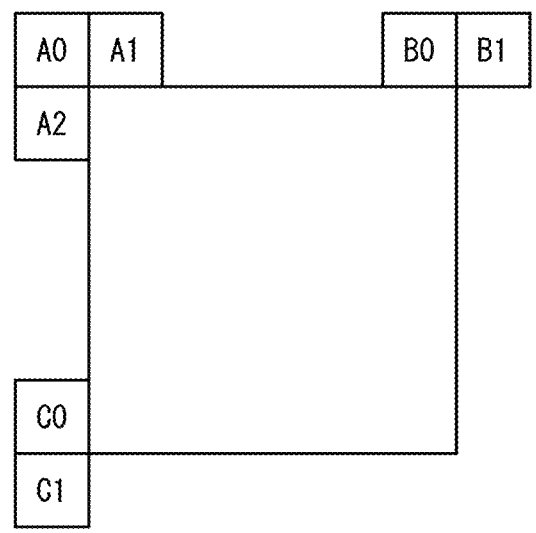

[Fig. 24]
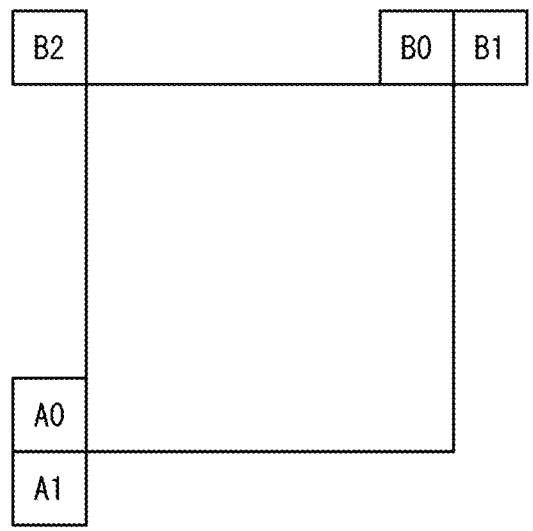
[Fig. 25]
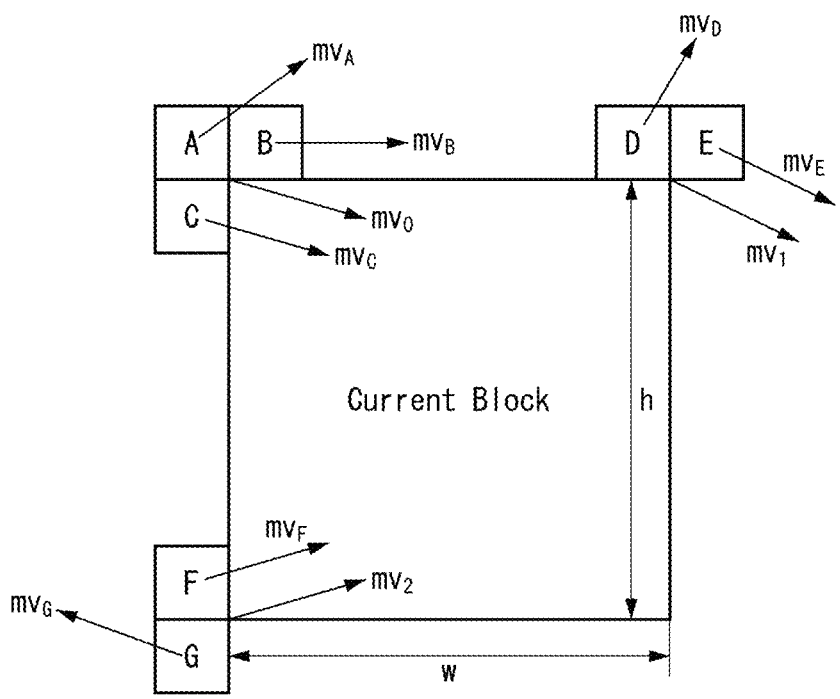

[Fig. 26]
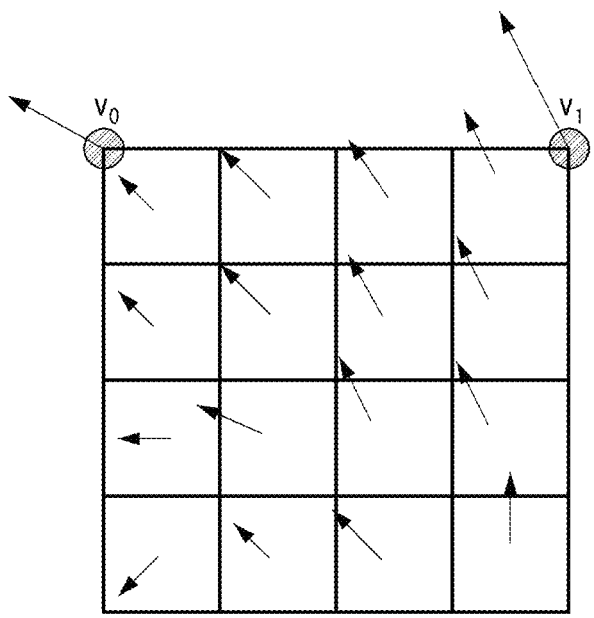
[Fig. 27]
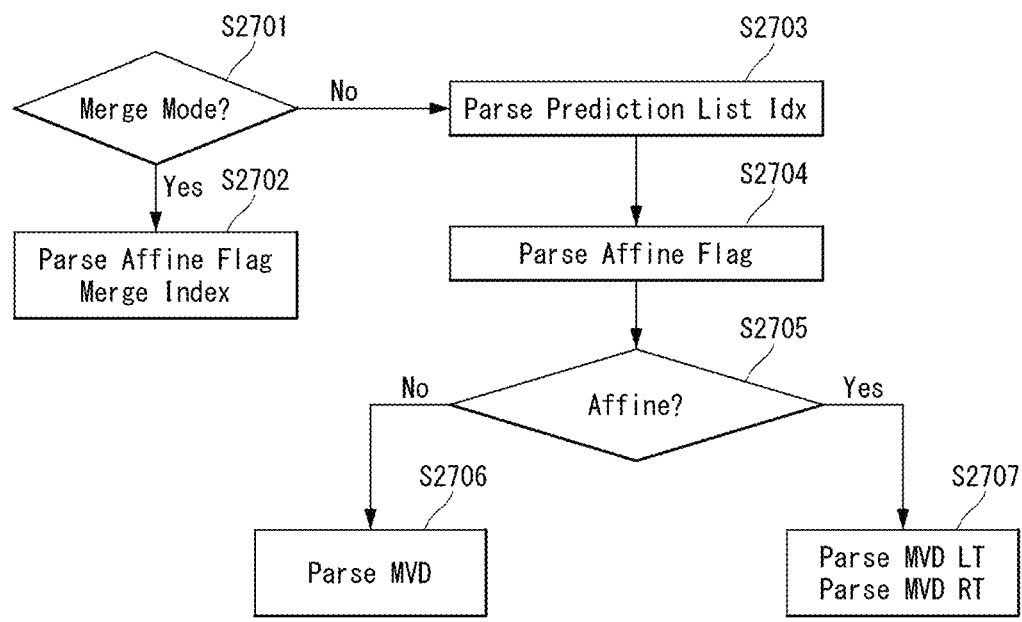

[Fig. 28]
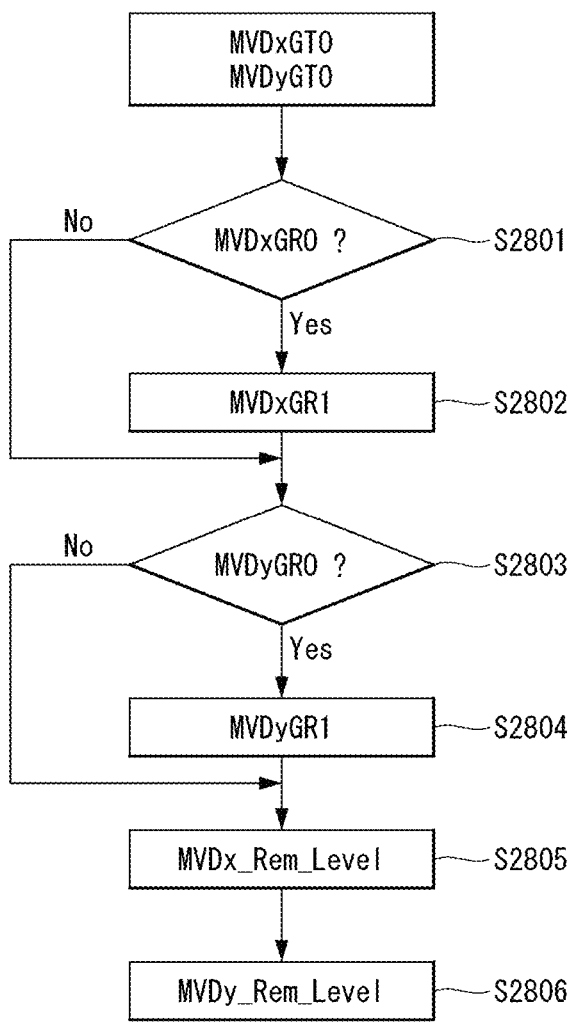

[Fig. 29]
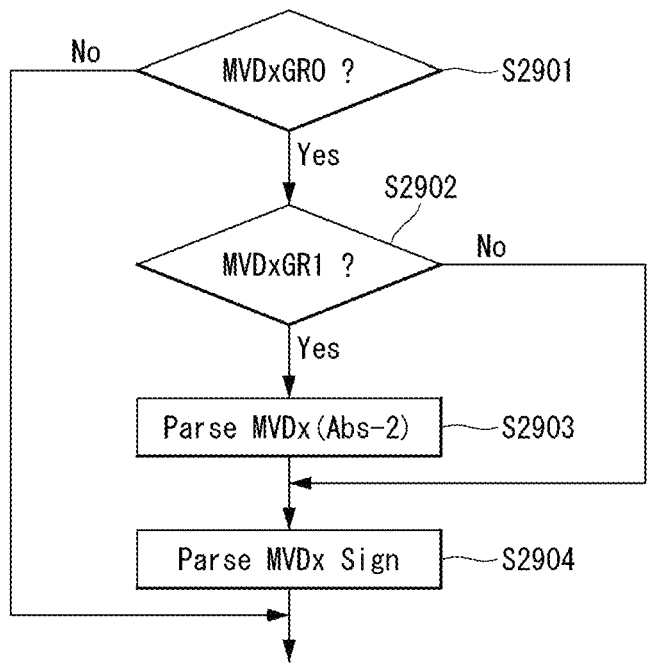
[Fig. 30]
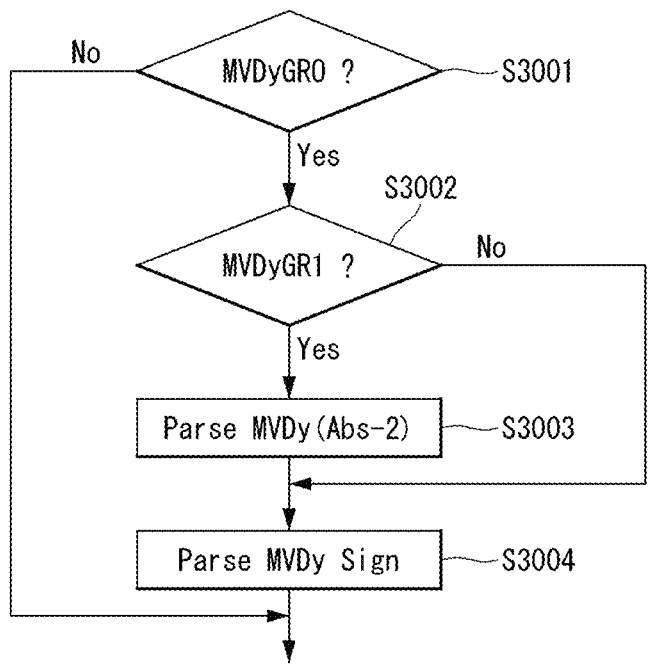

[Fig. 31]
(a)
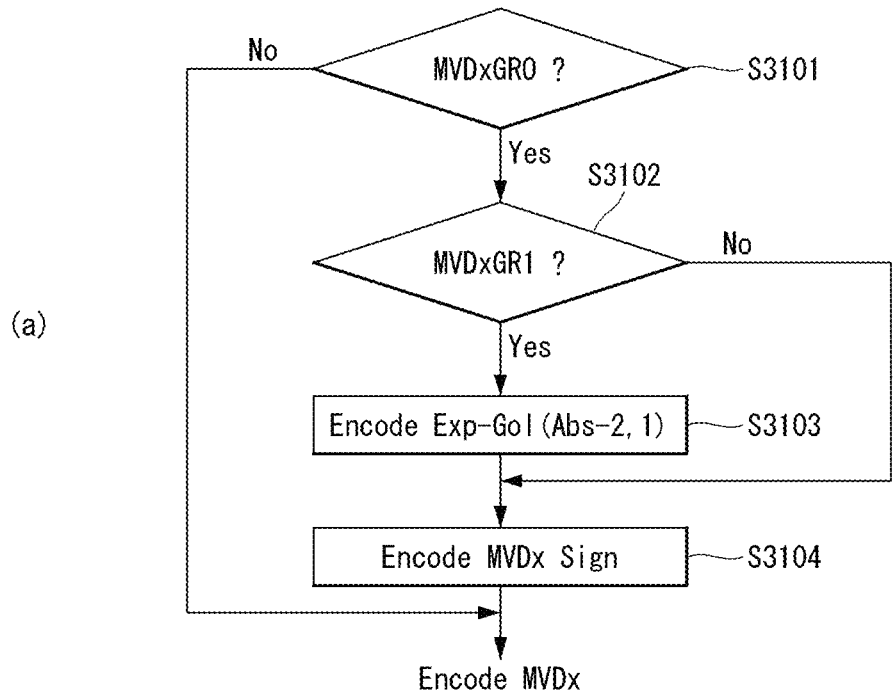
(b)
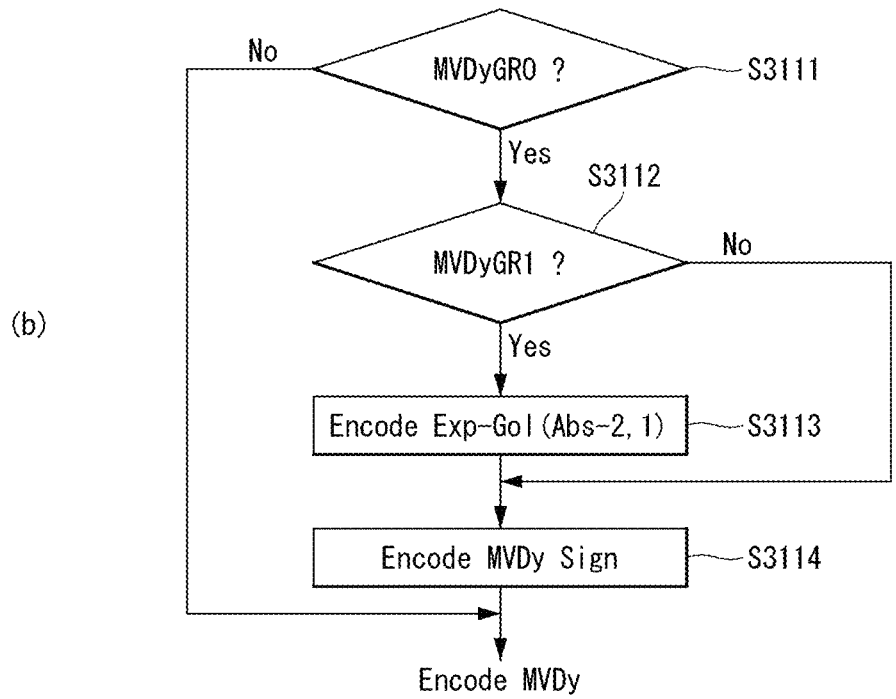

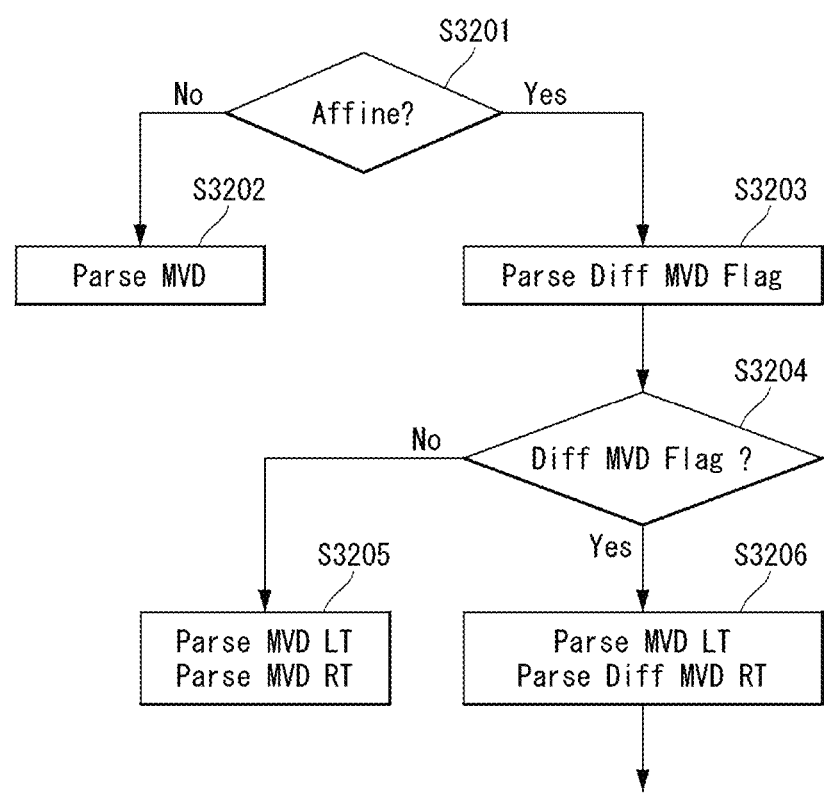
[Fig. 32]

[Fig.33]
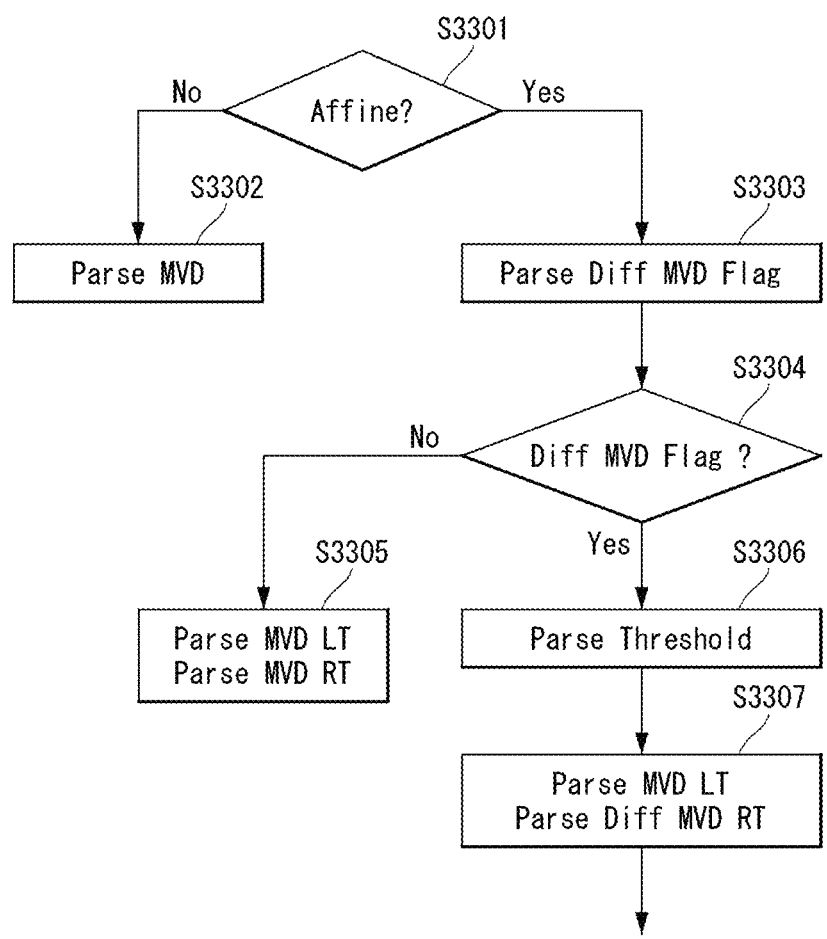

[Fig. 34]
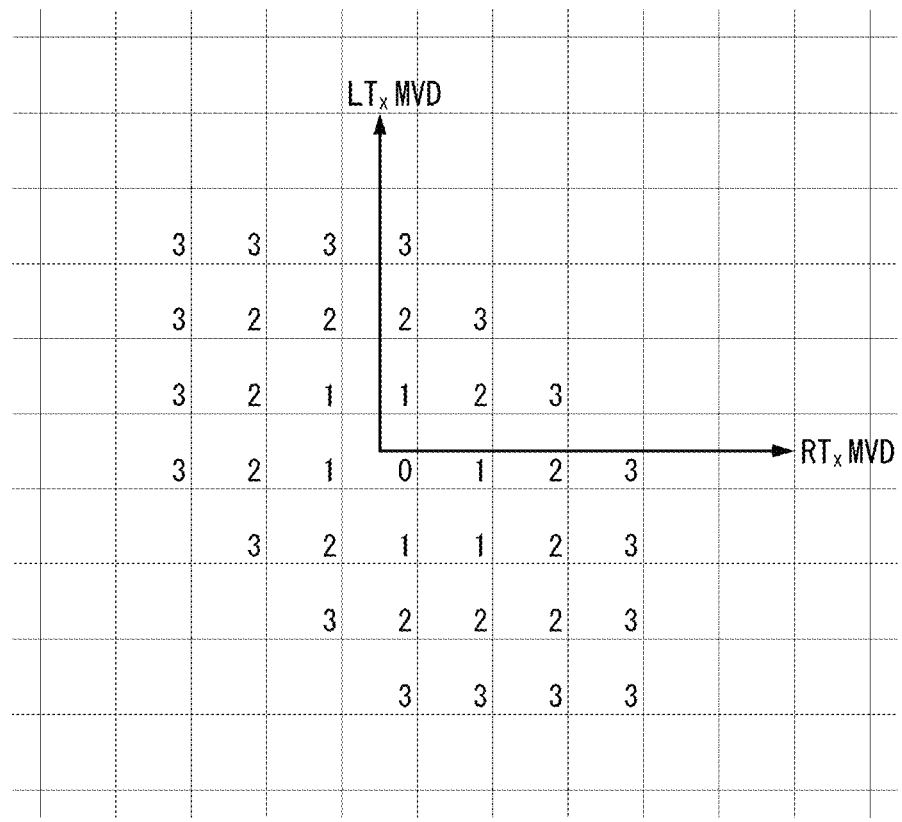
[Fig. 35]
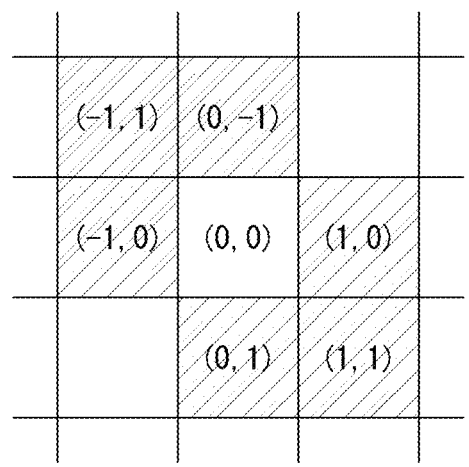

[Fig. 36]
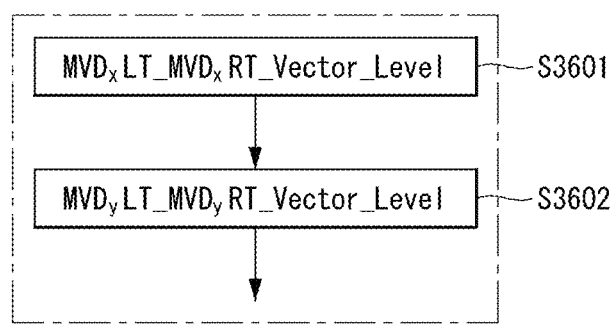

[Fig. 37]
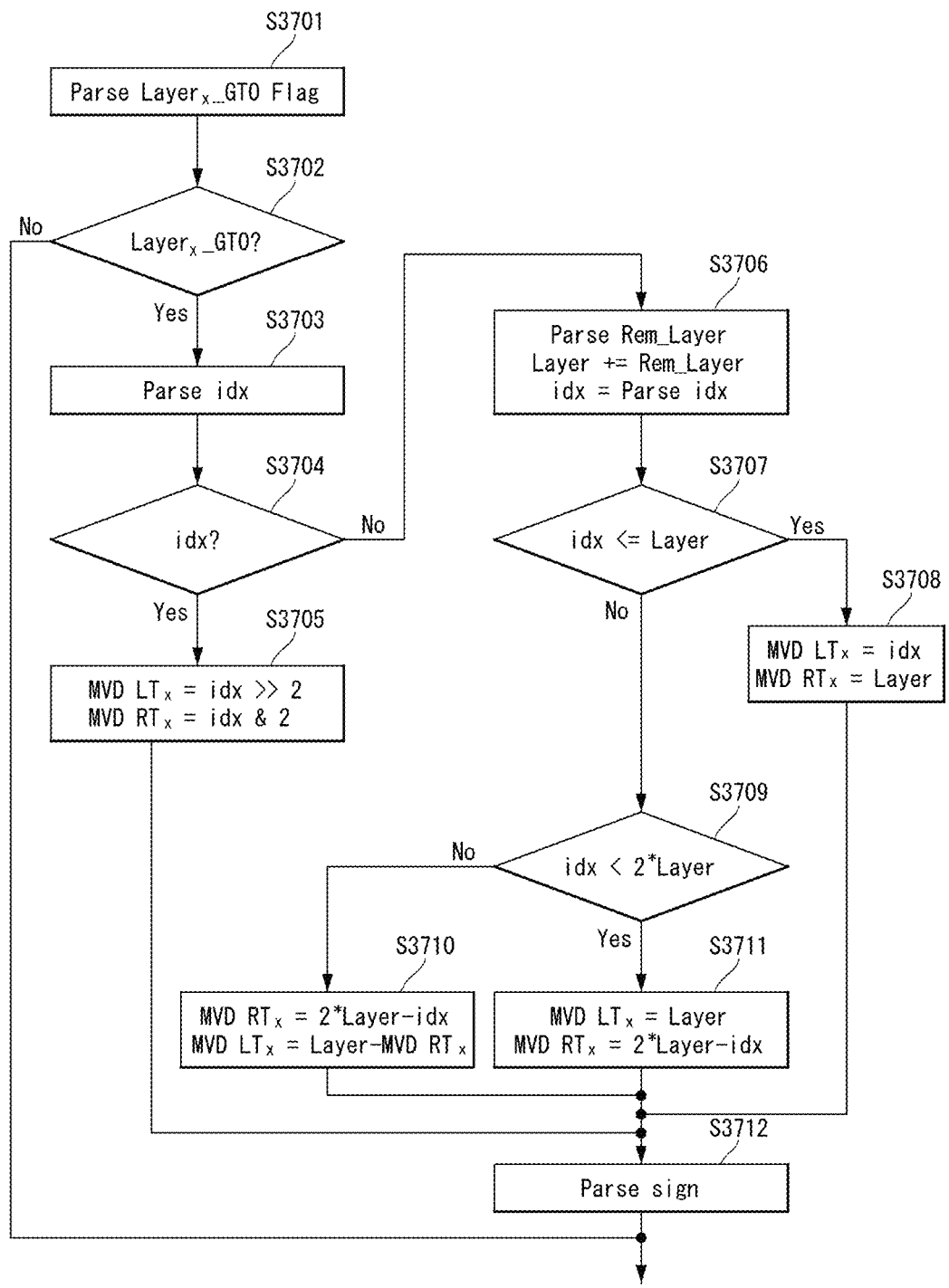

[Fig. 38]
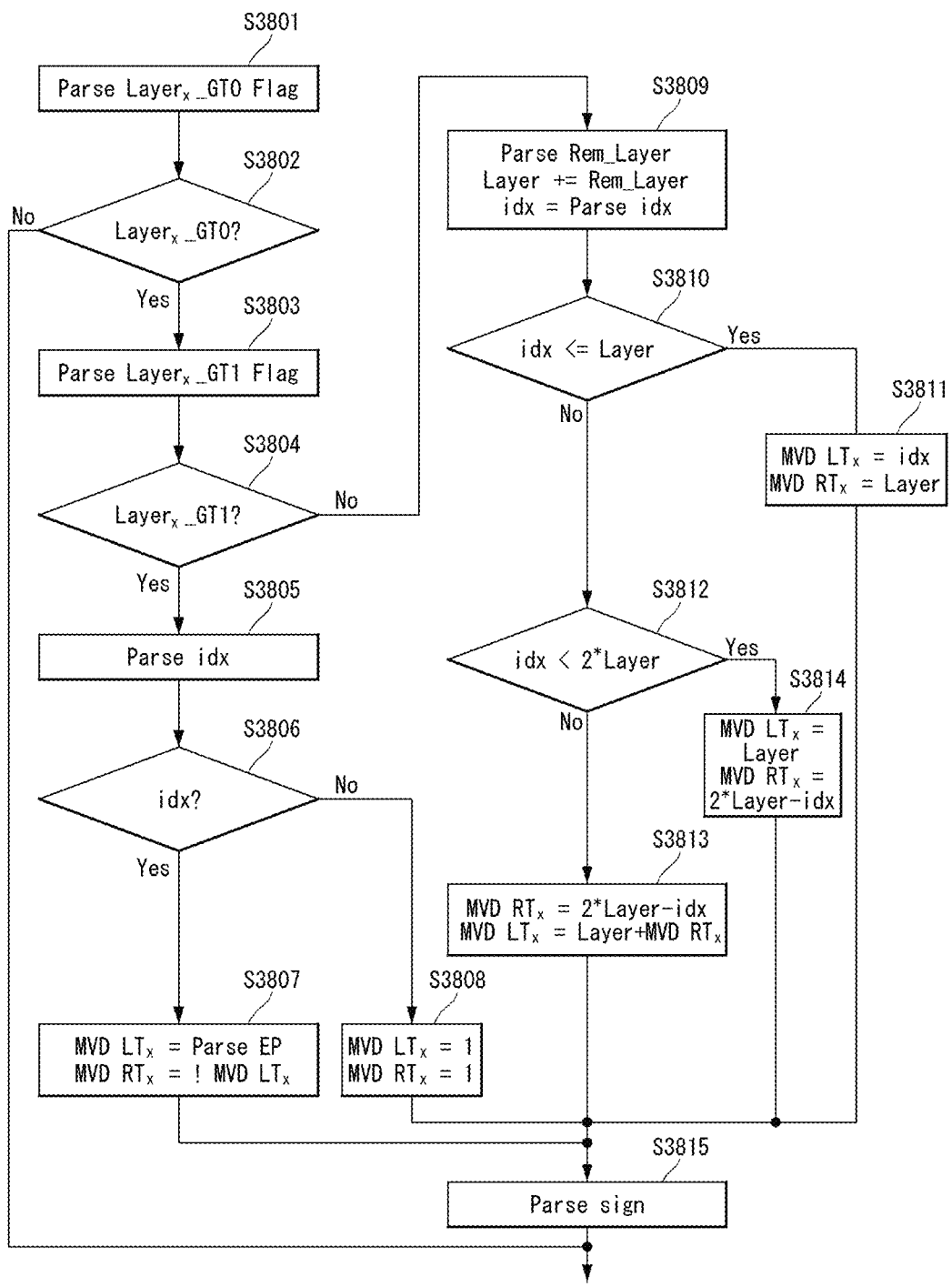

[Fig. 39]
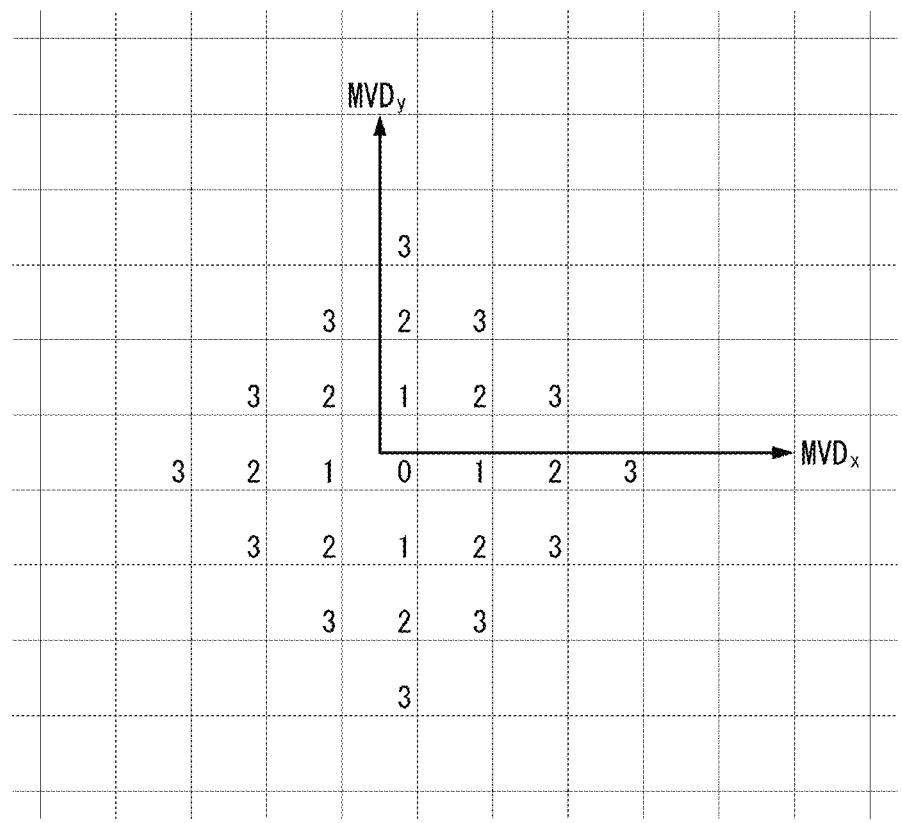

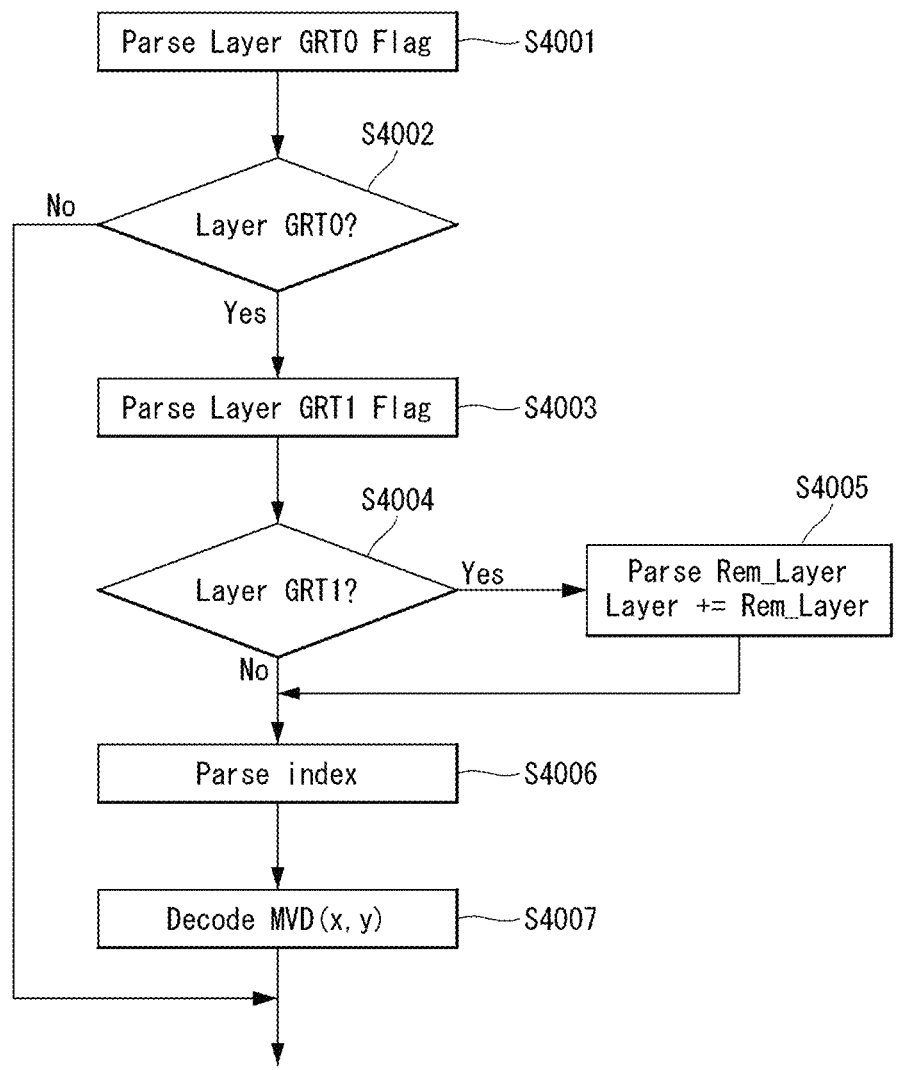

[Fig. 41]
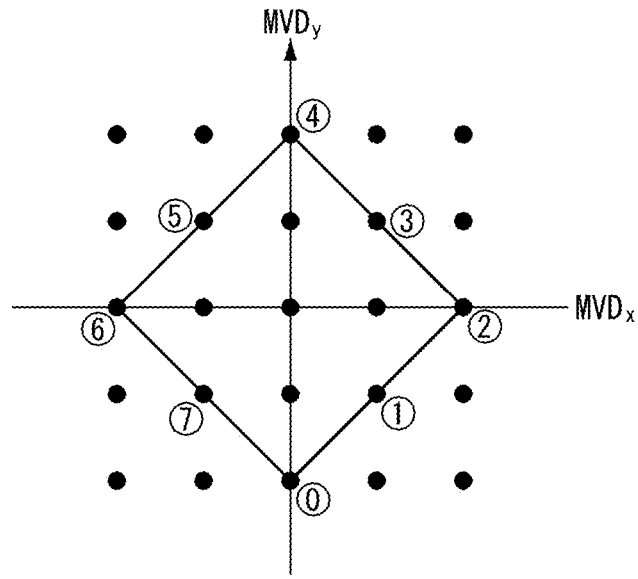
[Fig. 42]
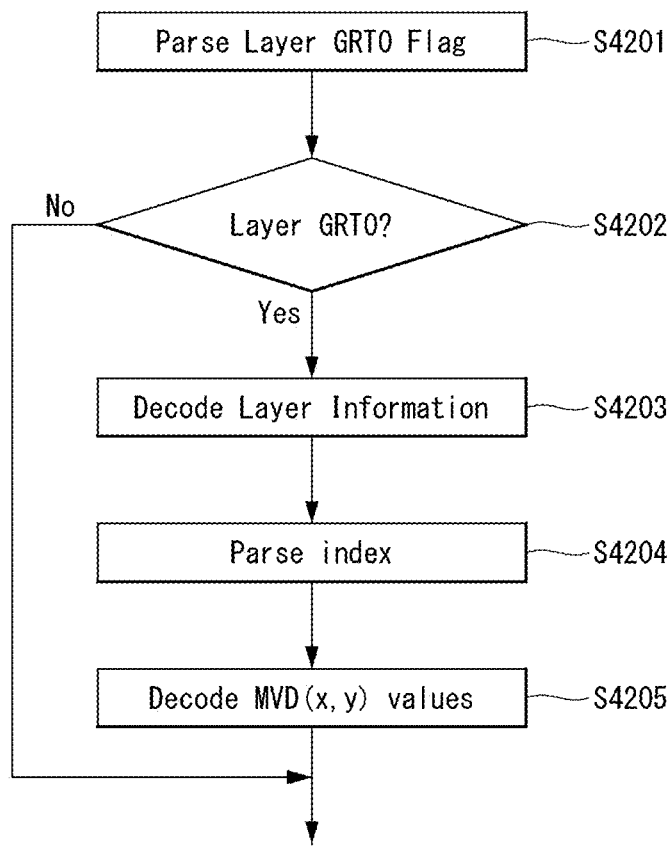

[Fig. 43]
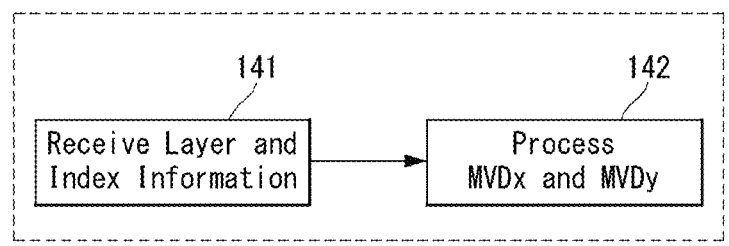
[Fig. 44]
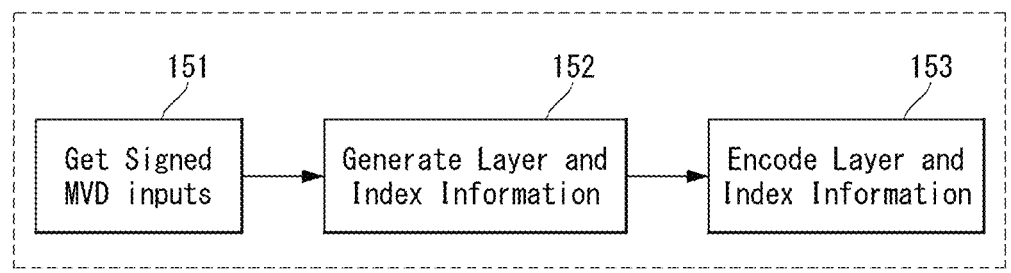

[Fig. 45]
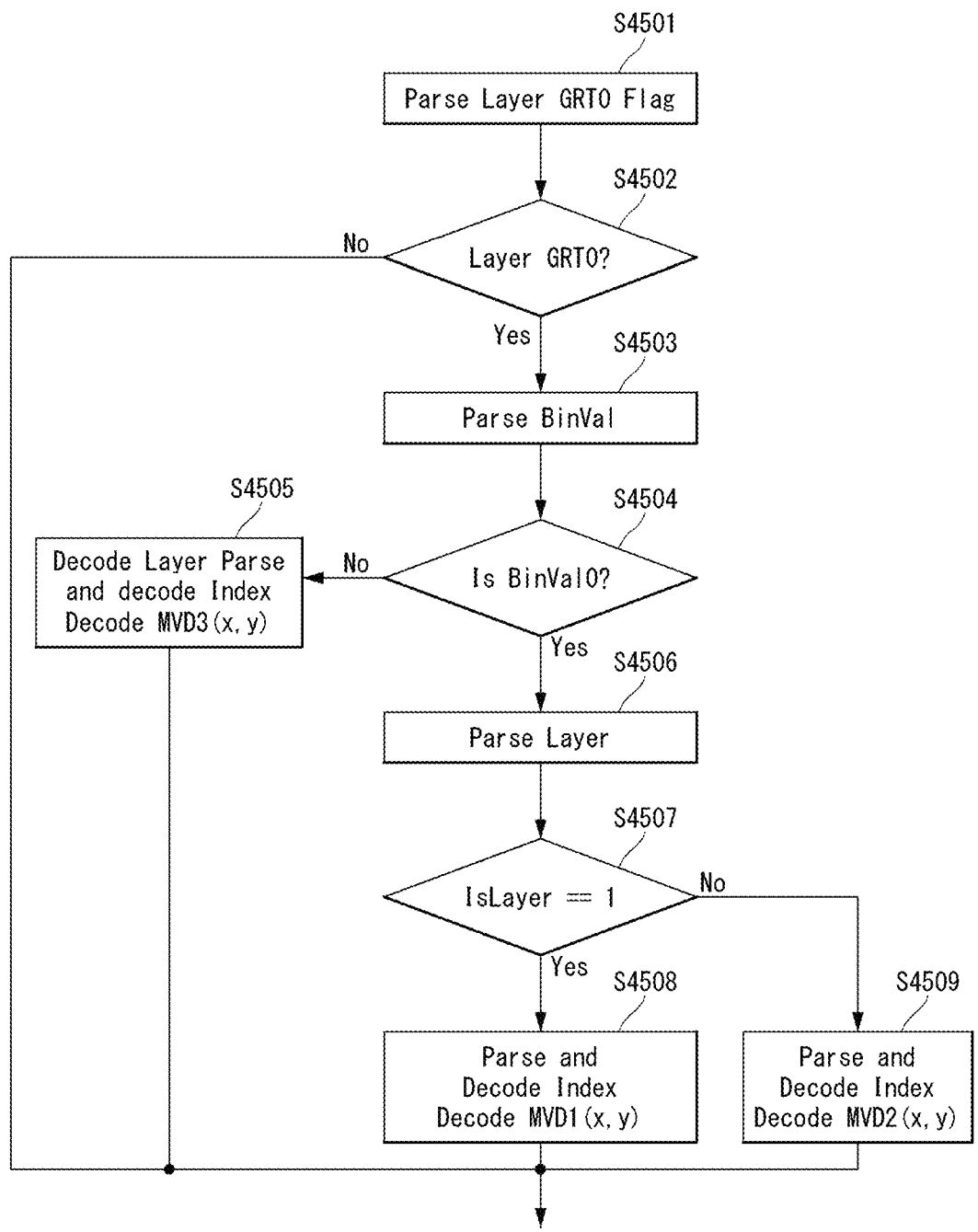

[Fig. 46]
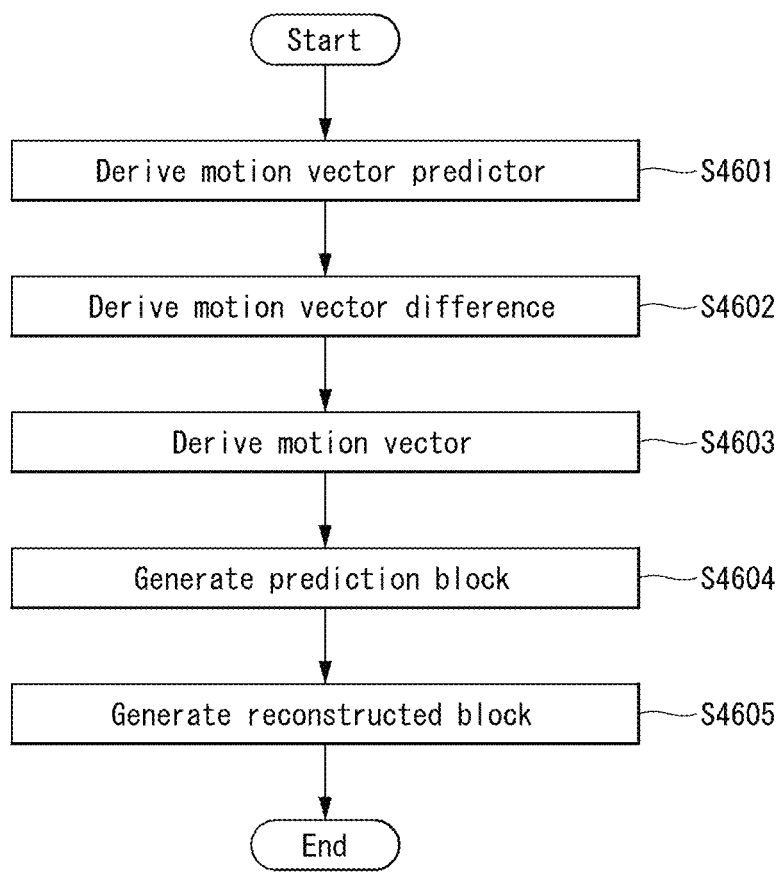

[Fig. 47]
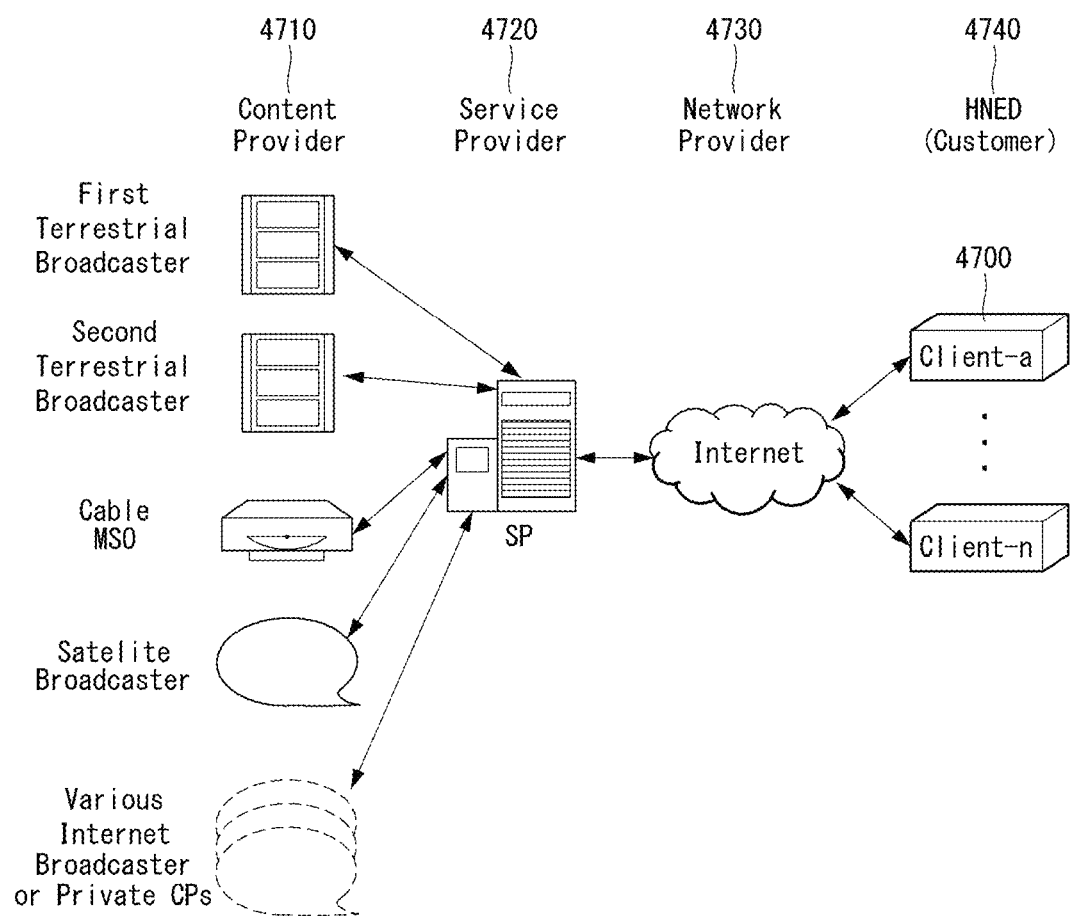

[Fig. 48]
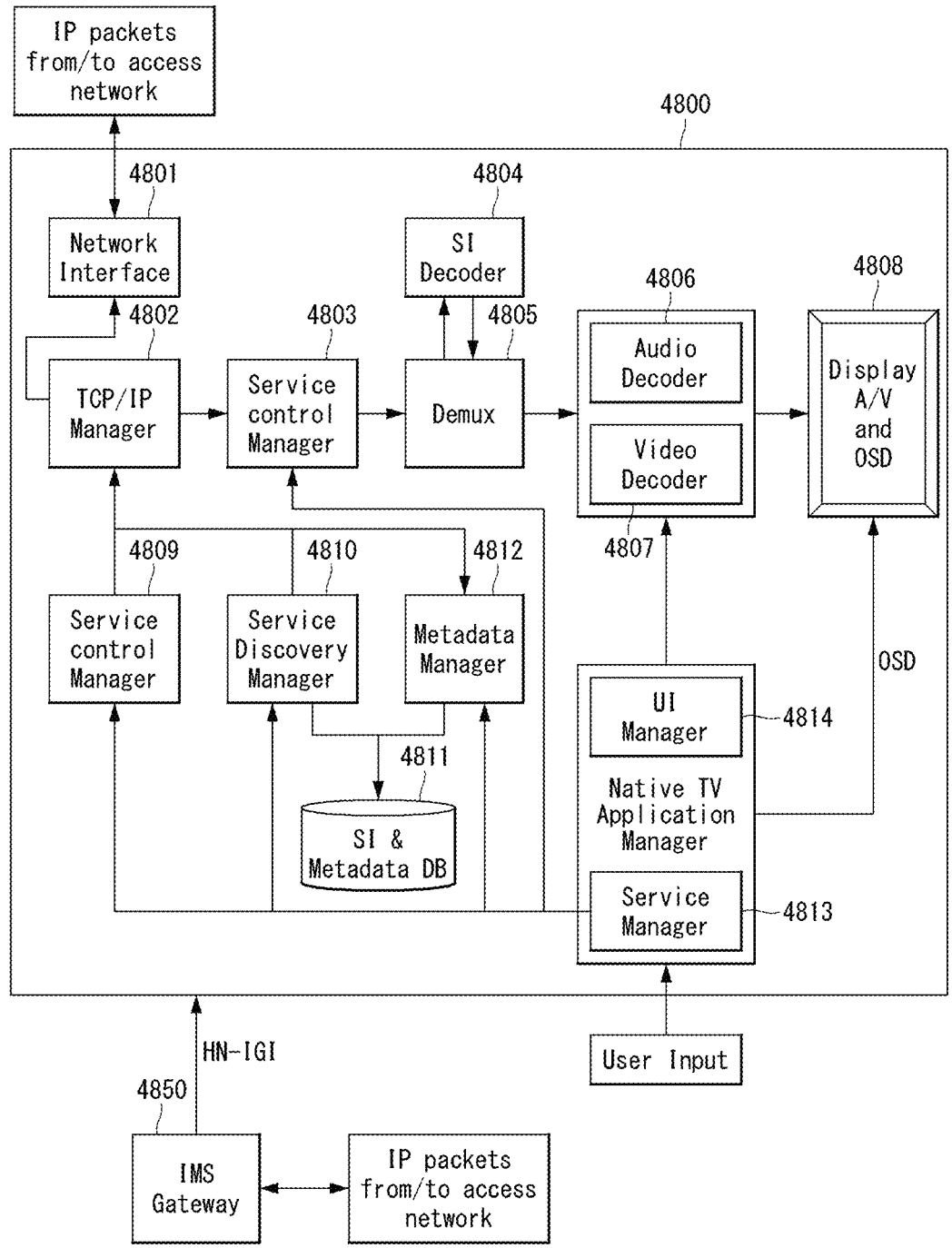

[Fig. 49]
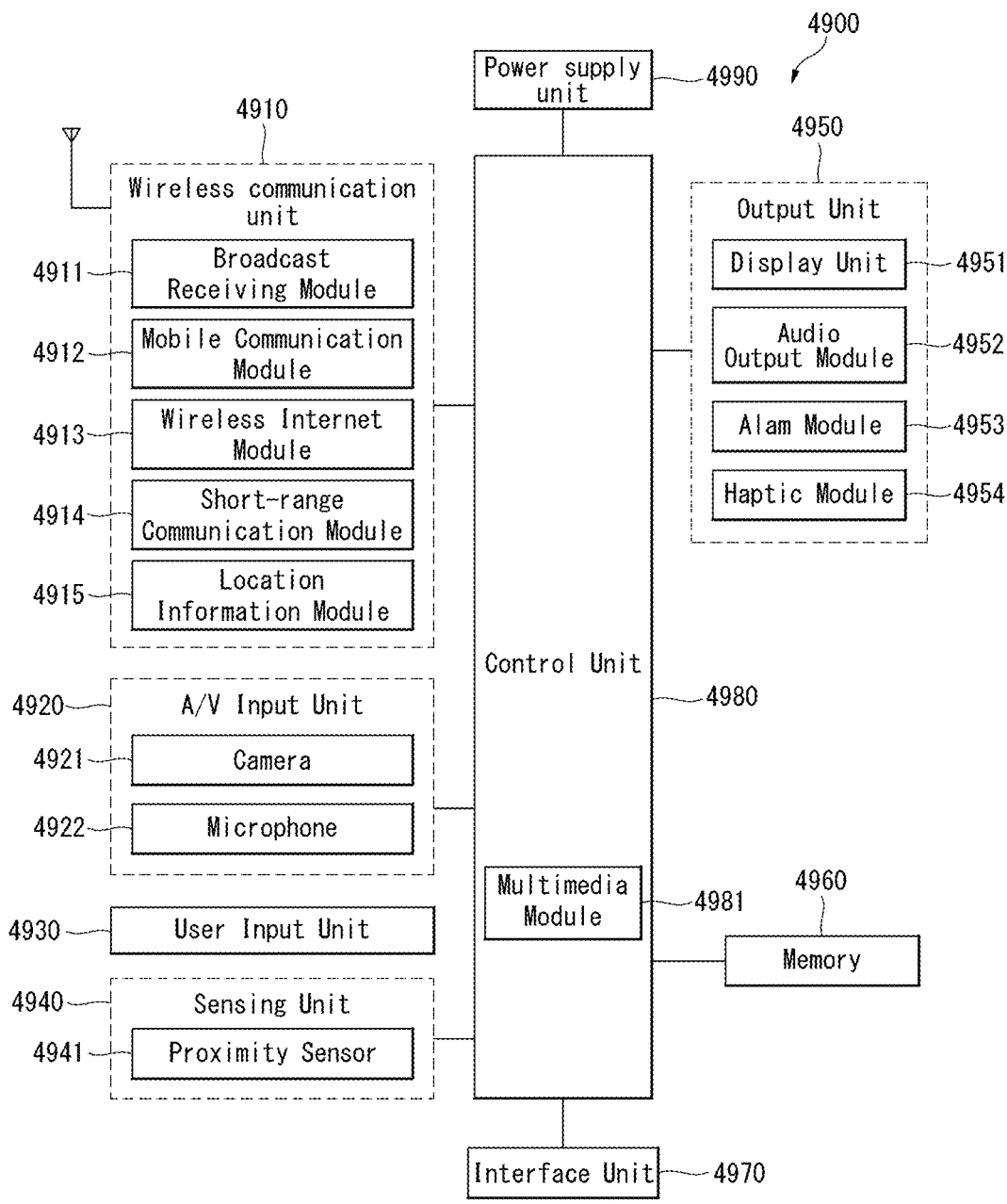

[Fig. 50]
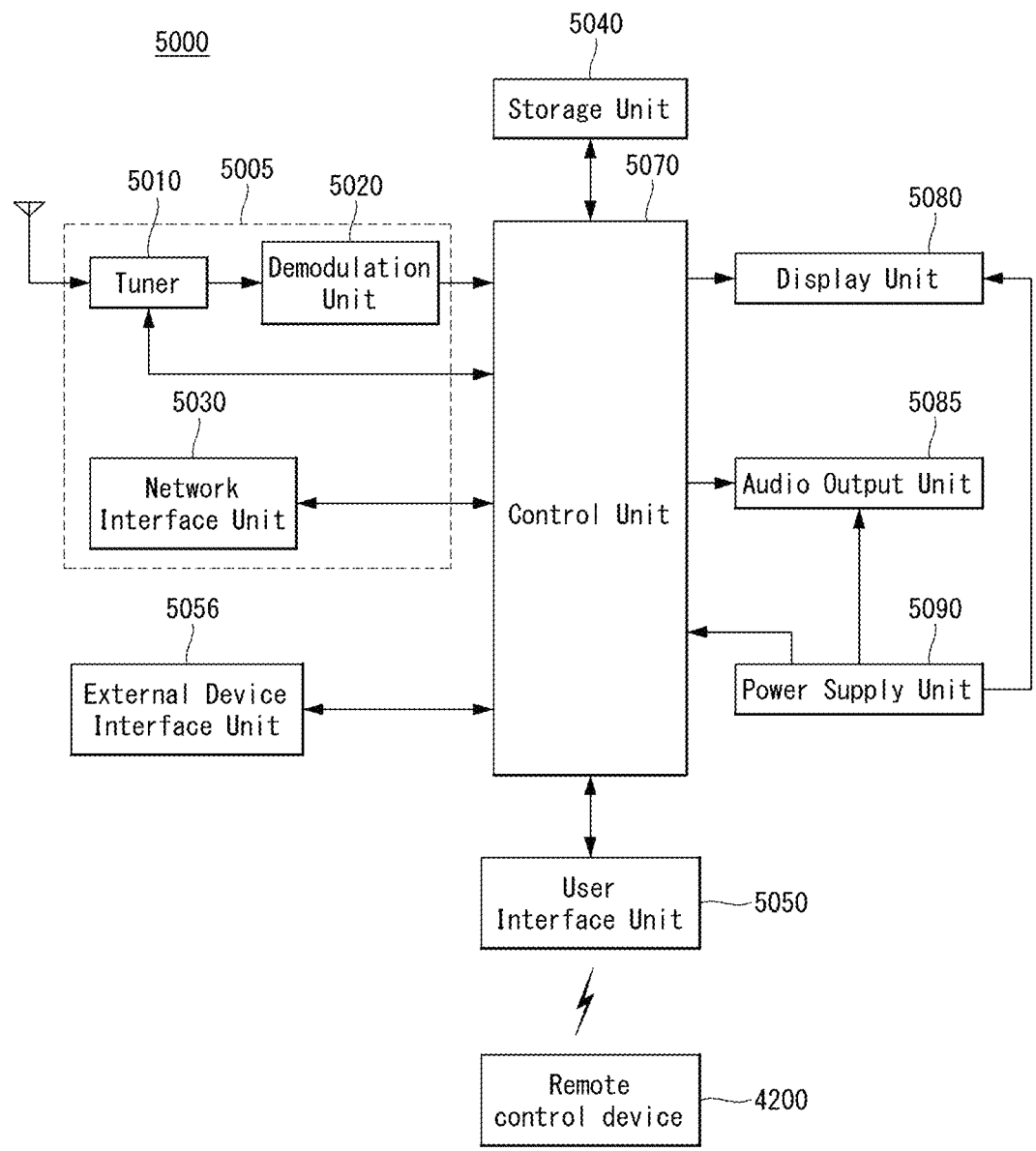

[Fig. 51]
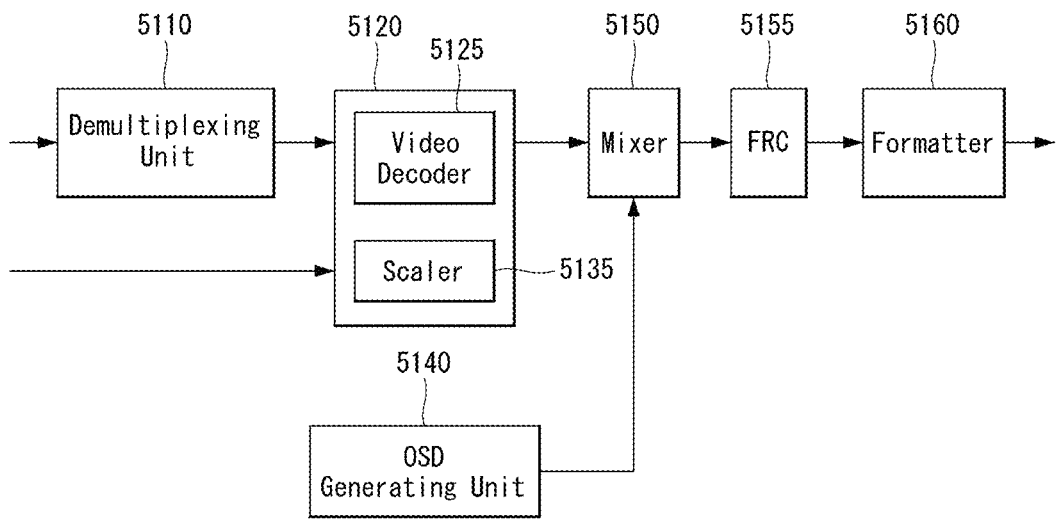
[Fig. 52]
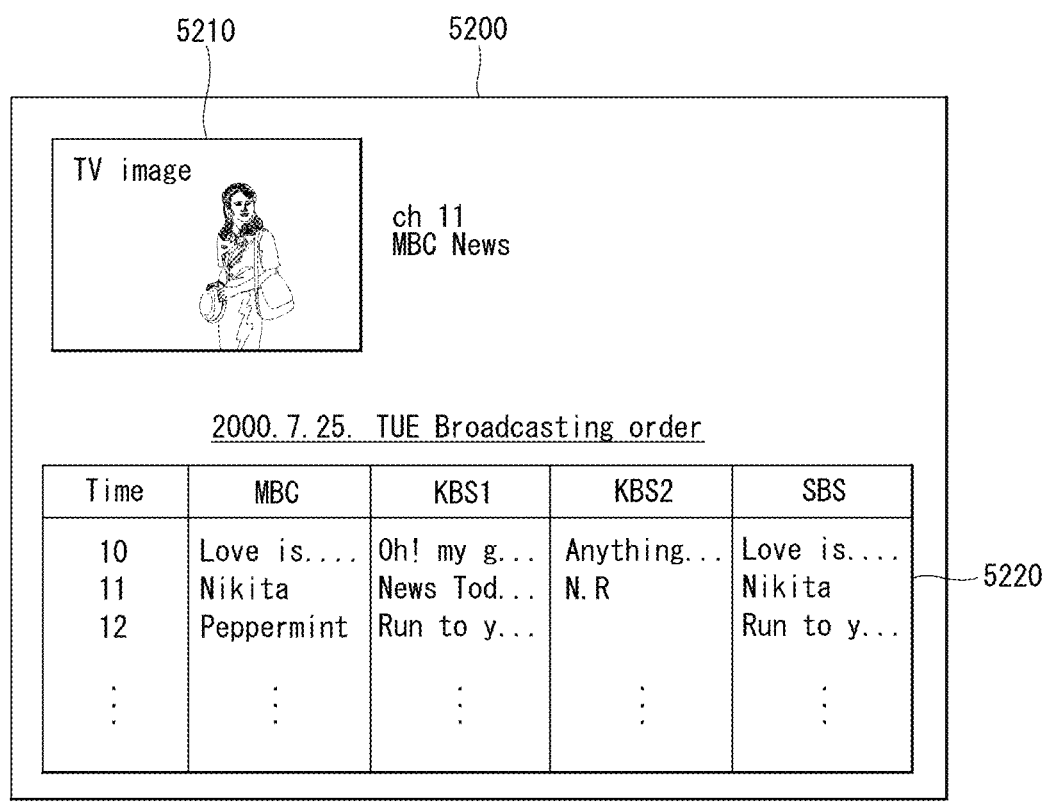

METHOD AND APPARATUS FOR PROCESSING VIDEO SIGNAL ON BASIS OF INTER PREDICTION

CROSS-REFERENCE TO RELATED APPLICATIONS

This application is a continuation of U.S. application Ser. No. 17/419,869, filed on Jun. 30, 2021, which is the National Stage filing under 35 U.S.C. 371 of International Application No. PCT/KR2019/018792, filed on Dec. 31, 2019, which claims the benefit of U.S. Provisional Application No. 62/787,357, filed on Jan. 1, 2019, the contents of which are all hereby incorporated by reference herein in their entirety.

TECHNICAL FIELD

Embodiments of the disclosure relate to a method and device for processing video signals based on inter prediction, and more particularly, to a method for vector-coding a motion vector difference used for inter prediction and a device therefor.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

Embodiments of the disclosure propose a vector coding technique for coding horizontal and vertical components of a motion vector difference efficiently using the correlation between motion vector differences.

The technical objects to be achieved by the present disclosure are not limited to those that have been described hereinabove merely by way of example, and other technical objects that are not mentioned can be clearly understood from the following descriptions by those skilled in the art, to which the present disclosure pertains.

Technical Solution

In one aspect of the present disclosure, there is provided a method of processing a video signal based on inter prediction, the method comprising: deriving a motion vector predictor based on motion information of a neighboring block of a current block; deriving a motion vector difference of the current block based on layer information and index information, wherein the layer information represents a current layer, which the motion vector difference used for the inter prediction of the current block belongs to, in a predefined layer structure in which at least one combination of horizontal and vertical components of the motion vector difference is divided into a plurality of layers, and the index information represents a specific combination of vertical and horizontal components of the motion vector difference within the current layer; deriving a motion vector of the current block based on the motion vector predictor and the motion vector difference; generating a prediction block of the current block based on the motion vector of the current block; and generating a reconstructed block of the current block based on the prediction block and a residual block of the current block, wherein the layer information includes at least one syntax element indicating a layer group to which the current layer belongs.

Preferably, the deriving the motion vector difference may further comprise: obtaining a first syntax element representing whether an ID (identification) of the current layer is greater than 0; obtaining a second syntax element indicating whether the current layer belongs to a first layer group when the ID of the current layer is greater than 0; and obtaining a third syntax element indicating whether the ID of the current layer is 1 or 2 when the current layer belongs to the first layer group.

Preferably, the ID of the current layer may be determined as 3 when the current layer does not belong to the first layer group.

Preferably, the deriving the motion vector difference may further comprise: obtaining a first syntax element indicating whether an identification (ID) of the current layer is greater than 0; and obtaining ID information indicating the ID of the current layer when the ID of the current layer is greater than 0.

Preferably, the ID information may be binarized based on an exponential Golomb code with order 1.

Preferably, the index information may be binarized based on a truncated binarization scheme.

In another aspect of the present disclosure, there is provided an apparatus for decoding a video signal based on inter prediction, the apparatus comprising: a memory configured to store the video signal; and a processor coupled with the memory, wherein the processor is configured to: derive a motion vector predictor based on motion information of a neighboring block of a current block; derive a motion vector difference of the current block based on layer information and index information, wherein the layer information represents a current layer, which the motion vector difference used for the inter prediction of the current block belongs to, in a predefined layer structure in which at least one combination of horizontal and vertical components of the motion vector difference is divided into a plurality of layers, and the index information represents a specific combination of vertical and horizontal components of the motion vector difference within the current layer; derive a motion vector of the current block based on the motion vector predictor and the motion vector difference; generate a prediction block of the current block based on the motion vector of the current block; and generate a reconstructed block of the current block based on the prediction block and a residual block of the current block, wherein the layer information includes at least one syntax element indicating a layer group to which the current layer belongs.

Preferably, the processor may be configured to: obtain a first syntax element representing whether an ID (identification) of the current layer is greater than 0; obtain a second syntax element indicating whether the current layer belongs to a first layer group when the ID of the current layer is greater than 0; and obtain a third syntax element indicating whether the ID of the current layer is 1 or 2 when the current layer belongs to the first layer group.

Preferably, the ID of the current layer may be determined as 3 when the current layer does not belong to the first layer group.

Preferably, the processor may be configured to: obtain a first syntax element indicating whether an identification (ID) of the current layer is greater than 0; and obtain ID information indicating the ID of the current layer when the ID of the current layer is greater than 0.

Preferably, the ID information may be binarized based on an exponential Golomb code with order 1.

Preferably, the index information may be binarized based on a truncated binarization scheme.

Technical Effects

According to conventional video compression techniques, the horizontal component and the vertical component of the MVD are individually encoded/decoded. However, as described above, according to data analysis based on frequency analysis, the horizontal component and the vertical component of the MVD may have a mutual correlation and are highly likely to belong to the same layer in the layer structure according to an embodiment of the disclosure.

Accordingly, according to an embodiment of the disclosure, the MVD coding efficiency may be significantly increased by coding the horizontal and vertical components of the MVD together based on layer information and index information.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates an example of a video coding system according to an embodiment of the disclosure.

FIG. 2 is an embodiment to which the disclosure is applied, and is a schematic block diagram of an encoding apparatus for encoding a video/image signal.

FIG. 3 is an embodiment to which the disclosure is applied, and is a schematic block diagram of a decoding apparatus for decoding a video/image signal.

FIG. 4 shows an example of a structural diagram of a content streaming system according to an embodiment of the disclosure.

FIG. 5 shows an example of a block diagram of an apparatus for processing a video signal according to an embodiment of the disclosure.

FIG. 6 is an example of a block splitting structure according to an embodiment of the disclosure, FIGS. 6*a* to 6*d* respectively illustrate the examples of block splitting structures according to a quad tree (QT), a binary tree (BT), a ternary tree (TT) and an asymmetric tree (AT).

FIGS. 7 and 8 are respectively an inter prediction-based video/image encoding procedure and an inter predictor within an encoding apparatus according to an embodiment of the disclosure.

FIGS. 9 and 10 are respectively an inter prediction-based video/image decoding procedure and an inter predictor within a decoding apparatus according to an embodiment of the disclosure.

FIG. 11 illustrates an example of constructing spatial merge candidates for a current block.

FIG. 12 is a flowchart illustrating a method of configuring a merge candidate list according to an embodiment to which the disclosure is applied.

FIG. 13 is a flowchart illustrating a method of configuring a prediction candidate list (MVP candidate list) according to an embodiment to which the disclosure is applied.

FIG. 14 illustrates an example of motion models according to an embodiment of the disclosure.

FIG. 15 illustrates an example of a control point motion vector for an affine motion prediction according to an embodiment of the disclosure.

FIG. 16 illustrates an example of a motion vector for each sub-block of a block to which an affine motion prediction according to an embodiment of the disclosure has been applied.

FIG. 17 illustrates an example of neighboring blocks used for an affine motion prediction in an affine merge mode according to an embodiment of the disclosure.

FIG. 18 illustrates an example of a block on which an affine motion prediction is performed using neighboring blocks to which an affine motion prediction according to an embodiment of the disclosure has been applied.

FIG. 19 is a diagram for describing a method of generating a merge candidate list using a neighbor affine coding block according to an embodiment of the disclosure.

FIGS. 20 and 21 are diagrams for describing a method of constructing an affine merge candidate list using a neighboring block coded by an affine prediction according to an embodiment of the disclosure.

FIG. 22 illustrates an example of neighboring blocks used for an affine motion prediction in an affine inter mode according to an embodiment of the disclosure.

FIG. 23 illustrates an example of neighboring blocks used for an affine motion prediction in an affine inter mode according to an embodiment of the disclosure.

FIGS. 24 and 25 are diagrams illustrating a method of deriving a motion vector candidate using motion information of a neighboring block in an affine inter mode according to an embodiment of the disclosure.

FIG. 26 illustrates an example of an affine motion vector field of a sub-block unit according to an embodiment of the disclosure.

FIG. 27 illustrates an overall coding structure for deriving a motion vector according to an embodiment of the disclosure.

FIG. 28 shows an example of an MVD coding structure according to an embodiment of the disclosure.

FIG. 29 shows an example of an MVD coding structure according to an embodiment of the disclosure.

FIG. 30 shows an example of an MVD coding structure according to an embodiment of the disclosure.

FIG. 31 shows an example of an MVD coding structure according to an embodiment of the disclosure.

FIG. 32 is a view illustrating a method for deriving affine motion vector difference information according to an embodiment of the disclosure.

FIG. 33 is a view illustrating a method for deriving motion vector difference information based on a threshold according to an embodiment of the disclosure.

FIG. 34 is a view illustrating a vector coding method for an affine motion vector difference according to an embodiment of the disclosure.

FIG. 35 is a view illustrating a vector coding method for an affine motion vector difference according to an embodiment of the disclosure.

FIG. 36 is a parsing flowchart for MVD components according to an embodiment of the disclosure.

FIG. 37 is a view illustrating a coding structure of a motion vector difference performed based on vector coding according to an embodiment of the disclosure.

FIG. 38 is a view illustrating a coding structure of a motion vector difference performed based on vector coding according to an embodiment of the disclosure.

FIG. 39 is a view illustrating a vector coding method for a motion vector difference according to an embodiment of the disclosure.

FIG. 40 is a view illustrating a vector coding method for a motion vector difference based on a layer structure according to an embodiment of the disclosure.

FIG. 41 illustrates a vector coding method for an affine motion vector difference according to an embodiment of the disclosure.

FIG. 42 illustrates a coding structure of a motion vector difference performed based on vector coding according to an embodiment of the disclosure.

FIG. 43 illustrates a structure of a decoder device according to an embodiment to which the present disclosure is applied.

FIG. 44 illustrates a structure of an encoder device according to an embodiment to which the present disclosure is applied.

FIG. 45 illustrates a coding structure of a motion vector difference performed based on vector coding according to an embodiment of the disclosure.

FIG. 46 is a flowchart illustrating a method of processing a video signal based on inter prediction according to an embodiment to which the present disclosure is applied.

FIG. 47 is a diagram schematically showing an example of a service system including a digital device.

FIG. 48 is a block diagram illustrating a digital device according to an embodiment.

FIG. 49 is a configuration block diagram illustrating another embodiment of a digital device.

FIG. 50 is a block diagram illustrating a digital device according to another embodiment.

FIG. 51 is a block diagram illustrating a detailed configuration of the control unit of FIGS. 48 to 50.

FIG. 52 is a diagram illustrating an example in which a screen of a digital device displays a main image and a sub image simultaneously, according to an embodiment.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art. In some cases, in order to prevent the technical concept of the disclosure from being unclear, structures or devices which are publicly known may be omitted, or may be depicted as a block diagram centering on the core functions of the structures or the devices.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a slice, a tile, a frame, a block, etc may be properly replaced and interpreted in each coding process.

Hereinafter, in this specification, a "processing unit" means a unit in which an encoding/decoding processing process, such as prediction, a transform and/or quantization, is performed. A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), a coding block (CB), a prediction block (PB) or a transform block (TB) for a luma component. Alternatively, a processing unit may correspond to a coding tree block (CTB), a coding block (CB), a prediction block (PB) or a transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, a coefficient (a transform coefficient or a transform coefficient after a first order transformation) etc. are generally called a sample. Furthermore, to use a sample may mean to use a pixel value, a picture element value, a transform coefficient or the like.

FIG. 1 illustrates an example of a video coding system according to an embodiment of the disclosure.

The video coding system may include a source device 10 and a receive device 20. The source device 10 may transmit encoded video/image information or data to the receive device 20 in a file or streaming format through a storage medium or a network.

The source device 10 may include a video source 11, an encoding apparatus 12, and an transmitter 13. The receive device 20 may include a receiver 21, a decoding apparatus 22 and a renderer 23. The source device may be referred to as a video/image encoding apparatus and the receive device may be referred to as a video/image decoding apparatus. The transmitter 13 may be included in the encoding apparatus 12. The receiver 21 may be included in the decoding apparatus 22. The renderer may include a display and the display may be configured as a separate device or an external component.

The video source may acquire video/image data through a capture, synthesis, or generation process of video/image. The video source may include a video/image capturing device and/or a video/image generating device. The video/image capturing device may include, for example, one or more cameras, a video/image archive including previously captured video/images, and the like. The video/image generating device may include, for example, a computer, a tablet, and a smartphone, and may electronically generate video/image data. For example, virtual video/image data may be generated through a computer or the like, and in this case, a video/image capturing process may be replaced by a process of generating related data.

The encoding apparatus 12 may encode an input video/image. The encoding apparatus 12 may perform a series of procedures such as prediction, transforma, and quantization for compression and coding efficiency. The encoded data (encoded video/video information) may be output in a form of a bitstream.

The transmitter 13 may transmit the encoded video/video information or data output in the form of a bitstream to the receiver of the receive device through a digital storage medium or a network in a file or streaming format. The digital storage media may include various storage media such as universal serial bus USB, secure digital SD, compact disk CD, digital video disk DVD, bluray, hard disk drive HDD, and solid state drive SSD. The transmitter 13 may include an element for generating a media file through a predetermined file format, and may include an element for transmission through a broadcast/communication network. The receiver 21 may extract the bitstream and transmit it to the decoding apparatus 22.

The decoding apparatus 22 may decode video/image data by performing a series of procedures such as dequantization, inverse transform, and prediction corresponding to the operations of the encoding apparatus 12.

The renderer 23 may render the decoded video/image. The rendered video/image may be displayed through the display.

FIG. 2 is an embodiment to which the disclosure is applied, and is a schematic block diagram of an encoding apparatus for encoding a video/image signal.

Referring to FIG. 2, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may be configured with a hardware component (for example a memory or a digital storage medium) in an embodiment, and may include a decoded picture buffer (DPB).

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion information prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the DPB 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the DPB 170 may be used as a reference picture in the inter predictor 180. The encoding apparatus can avoid a prediction mismatch in the encoding apparatus 100 and a decoding apparatus and improve encoding efficiency if inter prediction is applied.

The DPB 170 may store a modified reconstructed picture in order to use the modified reconstructed picture as a reference picture in the inter predictor 180.

FIG. 3 is an embodiment to which the disclosure is applied, and is a schematic block diagram of a decoding apparatus for decoding a video/image signal.

Referring to FIG. 3, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 170 may be configured with a hardware component (for example a memory or a digital storage medium) in an embodiment, and may include a decoded picture buffer (DPB).

When a bitstream including video/image information is input, the decoding apparatus 200 may reconstruct an image in accordance with a process of processing video/image information in the encoding apparatus of FIG. 2. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the DPB 250. The various filtering methods may include deblocking filtering, a sample adaptive offset SAO, an adaptive loop filter ALF, and a bilateral filter, for example.

A reconstructed picture transmitted (modified) in the DPB 250 may be used as a reference picture in the inter predictor 260.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

FIG. 4 shows an example of a structural diagram of a content streaming system according to an embodiment of the disclosure.

The content streaming system to which the disclosure is applied may largely include an encoding server 410, a streaming server 420, a web server 430, a media storage 440, a user device 450, and a multimedia input device 460.

The encoding server 410 may compress the content input from multimedia input devices such as a smartphone, camera, camcorder, etc. into digital data to generate a bitstream and transmit it to the streaming server 420. As another example, when the multimedia input devices 460 such as the smartphone, camera, and camcorder directly generate a bitstream, the encoding server 410 may be omitted.

The bitstream may be generated by an encoding method or a bitstream generation method to which the disclosure is applied, and the streaming server 420 may temporarily store the bitstream in the process of transmitting or receiving the bitstream.

The streaming server 420 transmits multimedia data to the user device 450 based on a user request through the web server 430, and the web server 430 serves as an intermediary to inform the user of what service is present. When a user requests a desired service through the web server 430, the web server 430 delivers it to the streaming server 420, and the streaming server 420 transmits multimedia data to the user. At this time, the content streaming system may include a separate control server, in which case the control server serves to control commands/responses between devices in the content streaming system.

The streaming server 420 may receive content from the media storage 440 and/or the encoding server 410. For example, the streaming server 420 may receive content in real time from the encoding server 410. In this case, in order to provide a smooth streaming service, the streaming server 420 may store the bitstream for a predetermined time.

For example, the user device 450 may include a mobile phone, a smart phone, a laptop computer, a terminal for digital broadcasting, a personal digital assistant PDA, a portable multimedia player PMP, a navigation terminal, a slate PC, a tablet PC, an ultrabook, a wearable device (for example, a smart watch, a smart glass, a head mounted display HMD, a digital TV, a desktop computer, and digital signage.

Each server in the content streaming system may operate as a distributed server, and in this case, data received from each server may be processed in a distributed manner.

FIG. 5 shows an example of a block diagram of an apparatus for processing a video signal according to an embodiment of the disclosure. The video signal processing apparatus may correspond to the encoding apparatus 100 of FIG. 2 or the decoding apparatus 200 of FIG. 3.

The video signal processing apparatus 500 according to the embodiment of the disclosure may include a memory 520 for storing a video signal, and a processor 510 for processing the video signal while being combined with the memory 520.

The processor 510 according to an embodiment of the disclosure may be configured with at least one processing circuit for processing the video signal, and may process the video signal by executing instructions for encoding or decoding the video signal. That is, the processor 510 may encode the original video signal or decode the encoded video signal by executing the encoding or decoding methods described below.

FIG. 6 is an example of a block splitting structure according to an embodiment of the disclosure, FIGS. 6a to 6d respectively illustrate the examples of block splitting structures according to a quad tree (QT), a binary tree (BT), a ternary tree (TT) and an asymmetric tree (AT).

In video coding, one block may be split based on QT. Also, one sub-block split by QT may be further split recursively using QT. A leaf block that is no longer QT split may be split by at least one of BT, TT, or AT. BT may have two types of splitting: horizontal BT (2N×N, 2N×N) and vertical BT (N×2N, N×2N). T may have two types of splitting: horizontal TT (2N×1/2N, 2N×N, 2N×1/2N) and vertical TT (1/2N×2N, N×2N, 1/2N×2N). AT may have four types of splitting: horizontal-up AT (2N×1/2N, 2N×3/2N), horizontal-down AT (2N×3/2N, 2N×1/2N), vertical-left AT (1/2N×2N, 3/2N×2N), vertical-right AT (3/2N×2N, 1/2N×2N). Each BT, T, AT may be further split recursively using BT, TT, AT.

FIG. 6A shows an example of QT partitioning. The block A may be split into four sub-blocks A0, A1, A2 and A3 by QT. The sub-block A1 may be split into four sub-blocks B0, B1, B2, and B3 again by QT.

FIG. 6B shows an example of BT partitioning. The block B3, which is no longer split by QT, may be split into vertical BT (C0, C1) or horizontal BT (D0, D1). As the block C0, each sub-block may be further split recursively in a form of horizontal BT (E0, E1) or vertical BT (F0, F1).

FIG. 6C shows an example of TT partitioning. The block B3, which is no longer split by QT, may be split into vertical TT (C0, C1, C2) or horizontal TT (D0, D1, D2). As the block C1, each sub-block may be further recursively split into a form of horizontal TT (E0, E1, E2) or vertical TT (F0, F1, F2).

FIG. 6D shows an example of AT partitioning. The block B3, which is no longer split by QT, may be split into vertical AT (C0, C1) or horizontal AT (D0, D1). As the block C1, each sub-block may be further recursively split in a form of horizontal AT (E0, E1) or vertical TT (F0, F1).

Meanwhile, BT, TT and AT partitionings may be combined. For example, a sub-block split by BT may be split by T or AT. In addition, the sub-block split by T may be split by BT or AT. The sub-block split by AT may be split by BT or T. For example, after horizontal BT splitting, each sub-block may be split into verti-cal BT, or after vertical BT splitting, each sub-block may be split into horizontal BT. The two types of splitting methods have different splitting order, but final split shapes are same.

Furthermore, when a block is split, the order in which the block are searched may be variously defined. In general, the search operation is performed from left to right and from top to bottom. Searching a block may mean an order of determining whether to further split each split sub-block, or an encoding order of respective sub-blocks when the block is no longer split, or a search order when sub-blocks refer to information of other neighboring blocks.

FIGS. 7 and 8 are respectively an inter prediction-based video/image encoding procedure and an inter predictor within an encoding apparatus according to an embodiment of the disclosure.

The encoding apparatus 100 performs inter prediction on a current block (S710). The encoding apparatus 100 may derive an inter prediction mode and motion information of a current block, and may generate the prediction samples of the current block. In this case, the inter prediction mode determination, motion information derivation and prediction sample generation procedure may be performed at the same time, and any one procedure may be performed prior to another procedure. For example, the inter predictor 180 of the encoding apparatus 100 may include a prediction mode determination unit 181, a motion information derivation unit 182, and a prediction sample derivation unit 183. The prediction mode determination unit 181 may determine a prediction mode for a current block. The motion information derivation unit 182 may derive motion information of the current block. The prediction sample derivation unit 183 may derive prediction samples of the current block. For example, the inter predictor 180 of the encoding apparatus 100 may search a given area (search area) of reference pictures for a block similar to a current block through motion estimation, and may derive a reference block having a minimum difference or a difference of a given reference or less with respect to the current block. The inter predictor 180 may derive a reference picture index indicating a reference picture in which a reference block is located based on the reference block, and may derive a motion vector based on a location difference between the reference block and the current block. The encoding apparatus 100 may determine a mode applied to the current block among various prediction modes. The encoding apparatus may compare RD costs for the various prediction modes, and may determine an optimal prediction mode for the current block.

For example, if a skip mode or merge mode is applied to the current block, the encoding apparatus 100 may configure a merge candidate list to be described later, and may derive a reference block having a minimum difference or a difference of a given reference or less with respect to the current block among reference blocks indicated by merge candidates included in a merge candidate list. In this case, a merge candidate associated with the derived reference block may be selected. Merge index information indicating the selected merge candidate may be generated and signaled to the decoding apparatus 200. Motion information of the current block may be derived using motion information of the selected merge candidate.

For another example, if an (A)MVP mode is applied to the current block, the encoding apparatus may configure an (A)MVP candidate list to be described later, and may use a motion vector of a motion vector predictor (mvp) candidate, selected among mvp candidates included in the (A)MVP candidate list, as the mvp of the current block. In this case, for example, a motion vector indicating the reference block derived by the motion estimation may be used as the motion vector of the current block. An mvp candidate including a motion vector having the smallest difference with respect to the motion vector of the current block, among the mvp candidates, may become the selected mvp candidate. A motion vector difference (MVD), that is, a difference obtained by subtracting the mvp from the motion vector of the current block, may be derived. In this case, information on the MVD may be signaled to the decoding apparatus 200. Furthermore, if an (A)MVP mode is applied, a value of the reference picture index may be configured as reference picture index information and may be separately signaled to the decoding apparatus.

The encoding apparatus 100 may derive residual samples based on the prediction samples (S720). The encoding apparatus 100 may derive the residual samples through a comparison between the original samples of the current block and the prediction samples.

The encoding apparatus 100 encodes image information including prediction information and residual information (S730). The encoding apparatus may output the encoded image information in a bitstream form. The prediction information may include information on prediction mode information (e.g., skip flag, merge flag or mode index) and motion information as information related to the prediction procedure. The information related to motion information may include candidate selection information (e.g., merge index, mvp flag or mvp index), that is, information for deriving a motion vector. Furthermore, the information related to motion information may include information on the MVD and/or reference picture index information. Furthermore, the information related to motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus over a network.

Meanwhile, as described above, the encoding apparatus may generate a reconstructed picture (including reconstructed samples and reconstructed block) based on the reference samples and the residual samples. This is for deriving, in the encoding apparatus 100, the same prediction results as those performed in the decoding apparatus 200. Accordingly, coding efficiency can be improved. Accordingly, the encoding apparatus 100 may store the reconstructed picture (or reconstructed samples and reconstructed block) in the memory, and may use the reconstructed picture as a reference picture for inter prediction. As described above, an in-loop filtering procedure may be further applied to the reconstructed picture.

FIGS. 9 and 10 are respectively an inter prediction-based video/image decoding procedure and an inter predictor within a decoding apparatus according to an embodiment of the disclosure.

The decoding apparatus 200 may perform an operation corresponding to an operation performed in the encoding apparatus 100. The decoding apparatus 200 may perform prediction on a current block based on received prediction information, and may derive prediction samples.

Specifically, the decoding apparatus 200 may determine a prediction mode for the current block based on received prediction information (S910). The decoding apparatus 200 may determine which inter prediction mode is applied to the current block based on prediction mode information within the prediction information.

For example, the decoding apparatus 200 may determine whether the merge mode or (A)MVP mode is applied to the current block based on the merge flag. Alternatively, the decoding apparatus 200 may select one of various inter prediction mode candidates based on the mode index. The inter prediction mode candidates may include a skip mode, a merge mode and/or an (A)MVP mode or may include various inter prediction modes to be described later.

The decoding apparatus 200 derives motion information of the current block based on the determined inter prediction mode (S920). For example, if a skip mode or merge mode is applied to the current block, the decoding apparatus 200 may configure a merge candidate list to be described later and select one of merge candidates included in the merge candidate list. The selection of the merge candidate may be performed based on the merge index. Motion information of the current block may be derived from the motion information of the selected merge candidate. The motion information of the selected merge candidate may be used the motion information of the current block.

For another example, if an (A)MVP mode is applied to the current block, the decoding apparatus 200 may configure an (A)MVP candidate list to be described later, and may use a motion vector of a motion vector predictor (mvp) candidate, selected among mvp candidates included in the (A)MVP candidate list, as the mvp of the current block. The selection may be performed based on the selection information (mvp flag or mvp index). In this case, the decoding apparatus 200 may derive the MVD of the current block based on information on the MVD. The decoding apparatus may derive the motion vector of the current block based on the mvp of the current block and the MVD. Furthermore, the decoding apparatus may derive the reference picture index of the current block based on the reference picture index information. A picture indicated by the reference picture index within a reference picture list regarding the current block may be derived as a reference picture referred for the inter prediction of the current block.

Meanwhile, as will be described later, motion information of the current block may be derived without a candidate list configuration. In this case, motion information of the current block may be derived according to a procedure disclosed in a prediction mode to be described later. In this case, a candidate list configuration, such as that described above, may be omitted.

The decoding apparatus 200 may generate prediction samples for the current block based on the motion information of the current block (S930). In this case, the decoding apparatus 200 may derive a reference picture based on the reference picture index of the current block, and may derive the prediction samples of the current block indicated on the reference picture by the motion vector of the current block. In this case, as will be described later, a prediction sample filtering procedure may be further performed on some of or all the prediction samples of the current block according to circumstances.

For example, the inter predictor 260 of the decoding apparatus 200 may include a prediction mode determination unit 261, a motion information derivation unit 262, and a prediction sample derivation unit 263. The decoding apparatus 200 may determine a prediction mode of the current block based on prediction mode information received from the prediction mode determination unit 261, may derive motion information (motion vector and/or the reference picture index) of the current block based on information related to motion information received from the motion information derivation unit 262. The prediction sample derivation unit 263 may derive the prediction samples of the current block.

The decoding apparatus 200 generates residual samples for the current block based on the received residual information (S940). The decoding apparatus 200 may generate reconstructed samples for the current block based on the prediction samples and the residual samples, and may generate a reconstructed picture based on the reconstructed samples (S950). Thereafter, as described above, an in-loop filtering procedure may be further applied to the reconstructed picture.

As described above, the inter prediction procedure may include an inter prediction mode determination step, a motion information derivation step according to a determined prediction mode, and a prediction execution (prediction sample generation) step based on derived motion information.

Determination of Inter Prediction Mode

Various inter prediction modes may be used for the prediction of a current block within a picture. For example, various modes, such as a merge mode, a skip mode, an MVP mode, and an affine mode, may be used. A decoder side motion vector refinement (DMVR) mode, an adaptive motion vector resolution (AMVR) mode, etc. may be further used as additional modes. The affine mode may be referred to as an affine motion prediction mode. The MVP mode may be referred to as an advanced motion vector prediction (AMVP) mode.

Prediction mode information indicating an inter prediction mode of a current block may be signaled from an encoding apparatus to a decoding apparatus. The prediction mode information may be included in a bitstream and received by the decoding apparatus. The prediction mode information may include index information indicating one of multiple candidate modes. Alternatively, an inter prediction mode may be indicated through the hierarchical signaling of flag information. In this case, the prediction mode information may include one or more flags. For example, a flag may be further signaled in order to indicate whether a skip mode is applied by signaling a skip flag, to indicate whether a merge mode is applied by signaling a merge flag if a skip mode is not applied, and to indicate that an MVP mode is applied if a merge mode is not applied or for an additional identification. The affine mode may be signaled as an independent mode or may be signaled as a mode dependent on a merge mode or MVP mode. For example, the affine mode may be configured as one of a merge candidate list or MVP candidate list, as will be described later.

Derivation of Motion Information According to Inter Prediction Mode

The encoding apparatus 100 or the decoding apparatus 200 may perform inter prediction using motion information of a current block. The encoding apparatus 100 may derive optimal motion information for a current block according to a motion estimation procedure. For example, the encoding apparatus 100 may search a reference block having a similar correlation using the original block within the original picture for a current block in a fraction pixel unit within a determined search range within a reference picture. Accordingly, the encoding apparatus may derive motion information. The similarity of a block may be derived based on a difference between phase-based sample values. For example, the similarity of a block may be calculated based on a SAD (Sum of Absolute Difference) between a current block (or the template of the current block) and a reference block (or the template of the reference block). In this case, motion information may be derived based on a reference block having the smallest SAD within a search area. The derived motion information may be signaled to the decoding apparatus using several methods based on an inter prediction mode.

Merge Mode and Skip Mode

If a merge mode is applied, motion information of a current prediction block is not directly transmitted, and motion information of the current prediction block is derived using motion information of a neighboring prediction block. Accordingly, the encoding apparatus 100 may indicate the motion information of the current prediction block by transmitting flag information to notify that a merge mode has been used and a merge index to notify which neighboring prediction block has been used.

The encoding apparatus 100 should search a merge candidate block used to derive motion information of a current prediction block in order to perform a merge mode. For example, a maximum of up to 5 merge candidate blocks may be used, but the disclosure is not limited thereto. Furthermore, a maximum number of merge candidate blocks may be transmitted in a slice header, and the disclosure is not limited thereto. After searching merge candidate blocks, the encoding apparatus 100 may generate a merge candidate list, and may select a merge candidate block having the smallest cost, among the merge candidate blocks, as the final merge candidate block.

An embodiment of the disclosure provides various embodiments of merge candidate blocks constructing a merge candidate list.

The merge candidate list may use 5 merge candidate blocks, for example. For example, 4 spatial merge candidates and 1 temporal merge candidate may be used.

FIG. 11 illustrates an example of constructing spatial merge candidates for a current block.

Referring to FIG. 11, for prediction of a current block, at least one of a left neighboring block A1, a bottom-left neighboring block A2, a top-right neighboring block B0, an upper neighboring block B1, and a top-left neighboring block B2 may be used. The merge candidate list for the current block may be configured based on the procedure shown in FIG. 12.

FIG. 12 is a flowchart illustrating a method of configuring a merge candidate list according to an embodiment to which the disclosure is applied.

A coding apparatus (the encoding apparatus 100 or the decoding apparatus 200) searches spatial neighboring blocks of a current block and inserts derived spatial merge candidates into a merge candidate list (S1210). For example, the spatial neighboring blocks may include the bottom left corner neighboring block, left neighboring block, top right corner neighboring block, top neighboring block, and top left corner neighboring block of the current block. In this case, this is an example, and additional neighboring blocks, such as a right neighboring block, a bottom neighboring block, and a bottom right neighboring block, in addition to the spatial neighboring blocks may be further used as the spatial neighboring blocks. The coding apparatus may detect available blocks by searching the spatial neighboring blocks based on priority, and may derive motion information of the detected blocks as the spatial merge candidates. For example, the encoding apparatus 100 or the decoding apparatus 200 may search the 5 blocks illustrated in FIG. 11 in the sequence of A1, B1, B0, A0, and B2, and may configure a merge candidate list by sequentially indexing available candidates.

The coding apparatus searches a temporal neighboring block of the current block and inserts a derived temporal merge candidate into the merge candidate list (S1220). The temporal neighboring block may be located on a reference picture, that is, a picture different from a current picture in which the current block is located. A reference picture in which the temporal neighboring block is located may be called a co-located picture or a col-picture. The temporal neighboring block may be searched in the sequence of the bottom right corner neighboring block and bottom right center block of a co-located block for the current block on the col-picture. Meanwhile, if motion data compression is applied, specific motion information may be stored in the col-picture as representative motion information for each given storage unit. In this case, it is not necessary to store motion information for all blocks within the given storage unit, and thus a motion data compression effect can be obtained. In this case, the given storage unit may be predetermined as a 16×16 sample unit or an 8×8 sample unit, for example, or size information for the given storage unit may be signaled from the encoding apparatus 100 to the decoding apparatus 200. If the motion data compression is applied, motion information of the temporal neighboring block may be substituted with representative motion information of the given storage unit in which the temporal neighboring block is located. That is, in this case, in an implementation aspect, after an arithmetic right shift is performed by a given value based on the coordinates (top left sample position) of the temporal neighboring block not a prediction block in which the coordinates of the temporal neighboring block are located, the temporal merge candidate may be derived based on motion information of a prediction block that covers the arithmetic left-shifted location. For example, if the given storage unit is a 2n×2n sample unit, assuming that the coordinates of the temporal neighboring block are (xTnb, yTnb), motion information of a prediction block located in ((xTnb>>n)<<n), (yTnb>>n)<<n)), that is, a modified location, may be used for the temporal merge candidate. Specifically, for example, if the given storage unit is a 16×16 sample unit, assuming that the coordinates of the temporal neighboring block are (xTnb, yTnb), motion information of a prediction block located in ((xTnb>>4)<<4), (yTnb>>4)<<4)), that is, a modified location, may be used for the temporal merge candidate. Alternatively, for example, if the given storage unit is an 8×8 sample unit, assuming that the coordinates of the temporal neighboring block are (xTnb, yTnb), motion information of a prediction block located in ((xTnb>>3)<<3), (yTnb>>3)<<3)), that is, a modified location, may be used for the temporal merge candidate.

The coding apparatus may check whether the current number of merge candidates is smaller than a maximum number of merge candidates (S1230). The maximum number of merge candidates may be pre-defined or may be signaled from the encoding apparatus 100 to the decoding apparatus 200. For example, the encoding apparatus 100 may generate information on the maximum number of merge candidates, may encode the information, and may transmit the information to the decoding apparatus 200 in a bitstream form. If the maximum number of merge candidates is filled, a candidate addition process may not be performed.

If, as a result of the check, the current number of merge candidates is smaller than the maximum number of merge candidates, the coding apparatus inserts an added merge candidate into the merge candidate list (S1240). The added merge candidate may include an ATMVP (Adaptive Temporal Motion Vector Prediction), a combined bi-predictive merge candidate (if the slice type of a current slice is a B type) and/or a zero vector merge candidate, for example.

FIG. 13 is a flowchart illustrating a method of configuring a prediction candidate list (MVP candidate list) according to an embodiment to which the disclosure is applied.

If a motion vector prediction (MVP) mode is applied, a motion vector predictor (mvp) candidate list may be generated based on a motion vector of a reconstructed spatial neighboring block (e.g., the neighboring block described in FIG. 11) and/or a motion vector corresponding to a temporal neighboring block (or Col block). That is, the motion vector of the reconstructed spatial neighboring block and/or the motion vector of the temporal neighboring block may be used as a motion vector predictor candidate. The information on prediction may include selection information (e.g., MVP flag or MVP index) indicating an optimal motion vector predictor candidate selected among motion vector predictor candidates included in the list. In this case, the predictor may select the motion vector predictor of a current block, among motion vector predictor candidates included in a motion vector candidate list, using the selection information. The predictor of the encoding apparatus 100 may calculate a motion vector difference (MVD) between the motion vector of the current block and the motion vector predictor, may encode the MVD, and may output the encoded MVD in a bitstream form. That is, the MVD may be calculated as a value obtained by subtracting the motion vector predictor from the motion vector of the current block. In this case, the predictor of the decoding apparatus may obtain a motion vector difference included in the information on prediction, and may derive the motion vector of the current block through the addition of the motion vector difference and the motion vector predictor. The predictor of the decoding apparatus may obtain or derive a reference picture index indicating a reference picture from the information on prediction. For example, a motion vector predictor candidate list may be configured as illustrated in FIG. 13.

Referring to FIG. 13, the coding apparatus searches for a spatial candidate block for motion vector prediction and inserts it into a prediction candidate list (S1310). For example, the coding apparatus may search for neighboring blocks according to a predetermined search order, and add information of the neighboring block satisfying the condition for the spatial candidate block to the prediction candidate list (MVP candidate list).

After constructing the spatial candidate block list, the coding apparatus compares the number of spatial candidates included in the prediction candidate list with a preset reference number (eg, 2) (S1320). If the number of the spatial candidates included in the prediction candidate list is greater than or equal to the reference number (eg, 2), the coding apparatus may end the construction of the prediction candidate list.

But if the number of spatial candidate lists included in the prediction candidate list is less than the reference number (eg, 2), the coding apparatus searches for a temporal candidate block and inserts it into the prediction candidate list (S1330), and when the temporal candidate block is unavailable, adds a zero motion vector to the prediction candidate list (S1340).

Generation of Prediction Sample

A predicted block for a current block may be derived based on the motion information derived according to a prediction mode. The predicted block may include prediction samples (prediction sample array) of the current block. When the motion vector of the current block indicates a fractional sample unit, an interpolation procedure may be performed, and through this prediction samples of the current block may be derived based on the reference samples in a fractional sample unit in a reference picture. When affine inter prediction is applied to the current block, prediction samples may be generated based on a motion vector in a sample/subblock unit. When bi-direction prediction is applied, final prediction samples may be derived through weighted (according to the phase) sums of prediction samples derived based on first direction prediction (eg, I0 prediction) and prediction samples derived based on second direction prediction. Reconstruction samples and reconstruction pictures may be generated based on the derived prediction samples, and as described above, a procedure such as in-loop filtering may be performed afterwards.

Affine Motion Prediction

FIG. 14 illustrates an example of motion models according to an embodiment of the disclosure.

In a conventional image compression technology (e.g., high efficiency video coding (HEVC)), one motion vector is used to represent a motion of an encoding block. Although an optimal motion of a block unit may be represented using a method using one motion vector for each block, it may not be an actual optimal motion of each picture element. Accordingly, if an optimal motion vector is determined in a picture element unit, encoding efficiency may be increased. Accordingly, an embodiment of the disclosure describes a motion prediction method of encoding or decoding a video signal using a multi-motion model. In particular, a motion vector may be represented in each picture element unit of a block or a sub-block unit using the motion vector at 2 to 4 control points. A prediction scheme using the motion vector of a plurality of control points may be referred to as affine motion prediction or affine prediction.

An affine motion model according to an embodiment of the disclosure may represent 4 motion models, such as those illustrated in FIG. 14. An affine motion model to represent three motions (translation, scale, and rotate) among motions which may be represented by the affine motion model is called a similarity (or simplified) affine motion model. In describing embodiments of the disclosure, the similarity (or simplified) affine motion model is basically described for convenience of description, but the disclosure is not limited thereto.

FIG. 15 illustrates an example of a control point motion vector for an affine motion prediction according to an embodiment of the disclosure.

As shown in FIG. 15, in affine motion prediction, the motion vector of a picture element location (or sub-block) included in a block may be determined using a two-control point motion vector (CPMV) pair v_0 and v_1. In this case, a set of the motion vectors may be referred to as an affine motion vector field (MVF). In this case, the affine motion vector field may be determined using Equation 1.

$$\begin{cases} v_x = \dfrac{(v_{1x} - v_{0x})}{w} * x - \dfrac{(v_{1y} - v_{0y})}{w} * y + v_{0x} \\ v_y = \dfrac{(v_{1y} - v_{0y})}{w} * x - \dfrac{(v_{1x} - v_{0x})}{w} * y + v_{0y} \end{cases} \quad \text{[Equation 1]}$$

In Equation 1, v_0(v_0={v_0x,v_0y}) indicates a motion vector CPMV0 at the first control point of the top left location of a current block 1500. v_1(v_1={v_1x,v_1y}) indicates a motion vector CPMV1 at the second control point of the top right location of the current block 1500. Furthermore, w indicates the width of the current block 1500. v(v={v_x,v_y}) indicates a motion vector at a {x,y} location. A motion vector of a sub-block (or picture element) unit may be derived using Equation 1. In one embodiment, motion vector accuracy may be rounded as 1/16 accuracy.

FIG. 16 illustrates an example of a motion vector for each sub-block of a block to which an affine motion prediction according to an embodiment of the disclosure has been applied.

Referring to FIG. 16, in an encoding or decoding process, an affine motion vector field (MVF) may be determined in a picture element unit or block unit. That is, in affine motion prediction, the motion vector of a current block may be derived in a picture element unit or a sub-block unit.

If an affine motion vector field is determined in a picture element unit, a motion vector may be obtained based on each picture element value. In the case of a block unit, the motion vector of a corresponding block may be obtained based on a center picture element value of the block. In this document, it is assumed that an affine motion vector field (MVF) is determined in a 4*4 block unit as in FIG. 16. In this case, this is for convenience of description, and an embodiment of the disclosure is not limited thereto. FIG. 16 illustrates an example of a case where an encoding block is configured with 16*16 samples and an affine motion vector field (MVF) is determined in a block unit of a 4*4 size.

Affine motion prediction may include an affine merge mode (or AF_MERGE) and an affine inter mode (or AF_INTER). The AF_INTER mode may include an AF_4_INTER mode using a 4 parameter-based motion model and an AF_6_INTER mode using a 6 parameter-based motion model.

Affine Merge Mode

AF_MERGE determines a control point motion vector (CPMV) based on the affine motion model of a neighboring block coded as affine motion prediction. A neighboring block affine-coded in a search sequence may be used for AF_MERGE. When one or more neighboring blocks are coded as affine motion prediction, a current block may be coded as AF_MERGE.

That is, if an affine merge mode is applied, the CPMVs of a current block may be derived using the CPMVs of a neighboring block. In this case, the CPMVs of the neighboring block may be used as the CPMVs of the current block without any change, and the CPMVs of the neighboring block may be modified based on the size of the neighboring block and the size of the current block and may be used as the CPMVs of the current block.

FIG. 17 illustrates an example of neighboring blocks used for an affine motion prediction in an affine merge mode according to an embodiment of the disclosure.

In the affine merge (AF_MERGE) mode, the encoder may perform encoding as in the following process.

Step-1: Scan the neighboring blocks A to E 1710, 1720, 1730, 1740, and 1750 of a current encoding block 1700 in sequence of the alphabet, and determine a block, first encoded according to an affine prediction mode based on the scanning sequence, as the candidate block of affine merge (AF_MERGE)

Step-2: Determine an affine motion model using the control point motion vector (CPMV) of the determined candidate block Step-3: Determine the control point motion vector (CPMV) of the current block 1700 based on the affine motion model of the candidate block and determine the MVF of the current block 1700

FIG. 18 illustrates an example of a block on which an affine motion prediction is performed using neighboring blocks to which an affine motion prediction according to an embodiment of the disclosure has been applied.

For example, as in FIG. 18, if a block A 1820 has been encoded according to an affine mode, after the block A 1820 is determined as a candidate block, an affine motion model may be derived using the control point motion vectors (CPMVs) (e.g., v2 and v3) of the block A 1820, and the control point motion vectors (CPMVs) v0 and v1 of the current block 1800 may be determined. The affine motion vector field (MVF) of the current block 1800 may be determined based on the control point motion vectors (CPMVs) of the current block 1800, and encoding may be performed.

FIG. 19 is a diagram for describing a method of generating a merge candidate list using a neighbor affine coding block according to an embodiment of the disclosure.

Referring to FIG. 19, if a CPMV pair is determined using an affine merge candidate, candidates, such as those illustrated in FIG. 19, may be used. In FIG. 19, it is assumed that the scan sequence of a candidate list has been set as A, B, C, D, and E. In this case, the disclosure is not limited thereto, and various sequences may be preset.

In an embodiment, if the number of candidates (hereinafter referred to as affine candidates) encoded according to an affine mode (or an affine prediction) available in the neighboring blocks (i.e., A, B, C, D, E) is 0, the affine merge mode of a current block may be skipped. If the number of available affine candidates is one (e.g., A), the motion model of the corresponding candidate may be used to derive the control point motion vectors (CPMV_0 and CPMV_1) of a current block. In this case, an index indicating the corresponding candidate may not be required (or coded). If the number of available affine candidates is two or more, two candidates on the scanning sequence may be configured as a candidate list for AF_MERGE. In this case, candidate selection information, such as an index indicating a candidate selected within the candidate list, may be signaled. The selection information may be a flag or index information, and may be referred to as AF_MERGE_flag or AF_merge_idx.

In an embodiment of the disclosure, a motion compensation for a current block may be performed based on the size of a sub-block. In this case, the sub-block size of an affine block (i.e., current block) is derived. If each of the width and height of a sub-block are larger than 4 luma samples, a motion vector for each sub-block may be derived, and a DCT-IF-based motion compensation (1/16 pel for luma and 1/32 for chroma) may be performed on the sub-block. If not, an enhanced bi-linear interpolation filter based motion compensation may be performed on all affine blocks.

In an embodiment of the disclosure, if a merge/skip flag is true and both the width and height of a CU is greater than or equal to 8, in a CU level, an affine flag is signaled through a bitstream indicating whether an affine merge mode is used. When a CU is coded as AF_MERGE, a merge candidate index having a maximum value of '5' is signaled to designate that a motion information candidate is used for the CU in an affine merge candidate list.

FIGS. 20 and 21 are diagrams for describing a method of constructing an affine merge candidate list using a neighboring block coded by an affine prediction according to an embodiment of the disclosure.

Referring to FIG. 20, an affine merge candidate list is configured by the following steps.

1) Insertion of Model-Based Affine Candidate

A model-based affine candidate means that a candidate is derived from a valid neighboring reconstructed block coded according to an affine mode. As illustrated in FIG. 20, a scan sequence for a candidate block from the left A, the top B, the top right C and the bottom left D to the top left E.

If the neighboring bottom left block A is coded in a 6-parameter affine mode, the motion vectors (v_4, v_5, v_6) of the top left corner, top right corner, and bottom left corner of a CU including the block A are obtained. The motion vectors (v_0, v_1, v_2) of the top left corner of the current block are calculated based on the motion vectors (v_4, v_5, and v_6) according to the 6-parameter affine model.

If the neighboring bottom left block A is coded in a 4-parameter affine mode, the a motion vectors (v_4, v_5) of the top left corner and top right corner of the CU including the block A are obtained. The motion vectors (v_0, v_1) of the top left corner on the current block are calculated based on the motion vectors (v_4, v_5) according to the 4-parameter affine model.

2) Insertion of Control Point-Based Affine Candidates

Referring to FIG. 20, a control point-based candidate means that a candidate is configured by combining neighboring motion information of control points.

Motion information of control points are first derived from designated spatial neighboring blocks and temporal neighboring block illustrated in FIG. 20. CP_k (k=1, 2, 3, 4) indicates a k-th control point. Furthermore, A, B, C, D, E, F and G are spatial location for predicting CP_k (k=1, 2, 3), and H is a temporal location for predicting CP4.

The coordinates of CP_1, CP_2, CP_3 and CP_4 are (0, 0), (W, 0), (H, 0) and (W, H), respectively. In this case, W and H are the width and height of the current block Motion information of each control point is obtained based on the following priority.

With respect to CP_1, checking priority is A→B→C, and A is used if A is available. If not and if B is available, B is used. If both A and B are not available, C is used. If all the three candidates are not available, motion information of CP_1 cannot be obtained.

With respect to CP_2, checking priority is E→D.
With respect to CP_3, checking priority is G→F.
With respect to CP_4, H is used.

Second, combinations of control points are used to configure a motion model.

Motion vectors of two control points are necessary to calculate transform parameters in a 4-parameter affine model. The two control points may be selected from one of the following 6 combinations {CP_9, CP_4}, {CP_2, CP_3}, {CP_1, CP_2}, {CP_2, CP_4}, {CP_1, CP_3}, and {CP_3, CP_4}. For example, to use the CP_1 and CP_2 control points in constructing the 4-parameter affine motion model is marked as "affine (CP_1, CP_2)."

Motion vectors of three control points are necessary to calculate transform parameters in a 6-parameter affine model. The three control points may be selected from one of the following 4 combinations {CP_1, CP_2, CP_4}, {CP_1, CP_2, CP_3}, {CP_2, CP_3, CP_4}, and {CP_1, CP_3, CP_4}. For example, to use the CP_1, CP_2 and CPv3 control points in constructing the 6-parameter affine motion model is marked as "affine (CP_1, CP_2, CP_3)."

Furthermore, in an embodiment of the disclosure, if an affine merge candidate is present in an affine merge mode, this may be always considered as a 6-parameter affine mode.

Affine Inter Mode

FIG. 22 illustrates an example of neighboring blocks used for an affine motion prediction in an affine inter mode according to an embodiment of the disclosure.

Referring to FIG. 22, affine motion prediction may include an affine merge mode (or AF_MERGE) and an affine inter mode (or AF_INTER). In the affine inter mode (AF_INTER), after 2-control point motion vector prediction (CPMVP) and CPMV are determined, a control point motion vector difference (CPMVD) corresponding to a difference may be transmitted from an encoder to a decoder. A detailed encoding process of the affine inter mode (AF_INTER) may be the same as that described below.

Step-1: Determine a two-CPMVP pair candidate
Step-1.1: Determine a maximum of 12 CPMVP candidate combinations (refer to Equation 2)

$$\{(v_0, v_1, v_2) \mid v_0 = \{v_A, v_B, v_c\}, v_1 = \{v_D, v_E\}, v_2 = \{v_F, v_G\}\} \quad \text{[Equation 2]}$$

In Equation 2, v_0 indicates a motion vector CPMV0 at the top left control point 2210 of a current block 2200. v_1 indicates a motion vector CPMV1 at the top right control point 2211 of the current block 2200. v_2 indicates a motion vector CPMV2 at a control point 2212 on the bottom left side of the current block 2200. v_A indicates the motion vector of a neighboring block A 2220 neighboring the top left of the top left control point 2210 of the current block 2200. v_B indicates the motion vector of a neighboring block B 2222 neighboring the top of the top left control point 2210 of the current block 2200. v_C indicates the motion vector of a neighboring block C 2224 neighboring the left of the top left control point 2210 of the current block 2200. v_D is the motion vector of a neighboring block D 2226 neighboring the top of the top right control point 2211 of the current block 2200. v_E indicates the motion vector of a neighboring block E 2228 neighboring the top right of the top right control point 2211 of the current block 2200. v_F indicates the motion vector of a neighboring block F 2230 neighboring the left of the bottom left control point 2212 of the current block 2200. v_G indicates the motion vector of a neighboring block G 2232 neighboring the left of the bottom left control point 2212 of the current block 2200.

Step-1.2: Sort CPMVP candidate combinations based on a value having a small difference value (DV) and use top two candidates (refer to Equation 3 below)

$$DV = |(v_{1x} - v_{0x}) * h - (v_{2y} - v_{0y}) * w| + \\ |(v_{1y} - v_{0y}) * h + (v_{2x} - v_{0x}) * w| \quad \text{[Equation 3]}$$

v_0x indicates the x-axis element of the motion vector (V0 or CPMV0) at the top left control point 2210 of the current block 2200. v_1x indicates the x-axis element of the motion vector (V1 or CPMV1) at the top right control point 2211 of the current block 2200. v_2x indicates the x-axis element of the motion vector (V_2 or CPMV_2) at the bottom left control point 2212 of the current block 2200. v_0y indicates the y-axis element of the motion vector (V_0 or CPMV_0) at the top left control point 2210 of the current block 2200. v_1y indicates the y-axis element of the motion vector (V_1 or CPMV_1) at the top right control point 2211 of the current block 2200. v_2y indicates the y-axis element of the motion vector (V_2 or CPMV_2) at the bottom left control point 2212 of the current block 2200. w indicates the width of the current block 2200. h indicates the height of the current block 2200.

Step-2: Use an AMVP candidate list when a control point motion vector predictor (CPMVP) pair candidate is smaller than 2

Step-3: Determine the control point motion vector predictor (CPMVP) of each of two candidates and optimally selects a candidate having a smaller value by comparing RD costs and a CPMV Step-4: Transmit an index corresponding to the optimal candidate and a control point motion vector difference (CPMVD)

In an embodiment of the disclosure, a process of constructing a CPMVP candidate in AF_INTER is provided. Identically with the AMVP, the number of candidates is 2, and an index indicating the location of a candidate list is signaled.

A process of constructing a CPMVP candidate list is as follows.

1) Whether neighboring blocks are coded as affine motion prediction is checked by scanning the neighboring blocks. If the scanned blocks are coded as affine prediction, the motion vector pair of a current block is derived from the affine motion model of the scanned neighboring block until the number of candidates becomes 2.

2) If the number of candidates is smaller than 2, a candidate configuration process is performed. Furthermore, in an embodiment of the disclosure, a 4-parameter (2-control point) affine inter mode is used to predict the motion model of zoom-in/out and rotate and content. As illustrated in FIG. 15, the affine motion field of a block is described by two control point motion vectors.

The motion vector field (MVF) of a block is described by Equation 1 described above.

In a conventional technology, an advanced motion vector prediction (AMVP) mode is necessary to scan a motion vector prediction (MVP) index and motion vector differences (MVDs). When the AMVP mode is applied to the disclosure, an affine flag (affine_flag) is signaled to indicate whether affine prediction is used. If the affine prediction is applied, the syntaxes of inter_dir, ref_idx, mvp_index, and two MVDs (mvd_x and mvd_y) are signaled. An affine MVP pair candidate list including two affine MVP pairs is generated. The signaled mvp_index is used to select one of the two affine MVP pairs. The affine MVP pair is generated by two types of affine MVP candidates. One is a spatial inherited affine candidate, and the other is a corner-derived affine candidate. If neighboring CUs are coded in an affine mode, spatial inherited affine candidates may be generated. The affine motion model of a neighboring affine-coded block is used to generate the motion vectors of a 2-control point MVP pair. The MVs of the 2-control point MVP pair of a spatial inherited affine candidate are derived using the following equations.

$$V0x = \quad \text{[Equation 4]}$$
$$VB0x + (VB2\_x - VB0x) * (posCurCU\_Y - posRefCU\_Y) /$$
$$RefCU\_height + (VB1x - VB0x) *$$
$$(posCurCU\_X - posRefCU\_X) / RefCU\_width$$

$$V0y = \quad \text{[Equation 5]}$$
$$VB0y + (VB2\_y - VB0y) * (posCurCU\_Y - posRefCU\_Y) /$$
$$RefCU\_height + (VB1y - VB0y) *$$
$$(posCurCU\_X - posRefCU\_X / RefCU\_width$$

If V_B0, V_B1, and V_B2 may be substituted with the top left MV, top right MV, and bottom left MV of a given reference/neighboring CU, (posCurCU_X, posCurCU_Y) are the location of the top left sample of a current CU for the top left sample of a frame. (posRefCU_X, posRefCU_Y) is the location of the top left sample of a reference/neighboring CU for the top left sample of a frame.

$$V1x = VB0x + (VB1x - VB0x) * CU\_width / RefCU\_width \quad \text{[Equation 6]}$$

$$V1y = VB0y + (VB1y - VB0y) * CU\_width / RefCU\_width \quad \text{[Equation 7]}$$

FIG. 23 illustrates an example of neighboring blocks used for an affine motion prediction in an affine inter mode according to an embodiment of the disclosure.

Referring to FIG. 23, when the number of MVP pairs is smaller than 2, a corner-derived affine candidate is used. As illustrated in FIG. 23, neighboring motion vectors are used to derive an affine MVP pair. With respect to a first corner-derived affine candidate, a first available MV in a set A (A0, A1 and A2) and a first available MV in a set B (B0 and B1) are used to configure a first MVP pair. With respect to a second corner-derived affine candidate, the first available MV in the set A and a first available MV in a set C (C0 and C1) are used to calculate the MV of a top right control point. The first available MV in the set A and a calculated top right control point MV are a second MVP pair.

In an embodiment of the disclosure, two candidate sets, including two (three) candidates {mv_0, mv_1} ({mv_0, mv_1, mv_2) are used to predict two (three) control points of an affine motion model. Given motion vector differences (mvd_0, mvd_1, mvd_2) and control points are calculated using the following equations.

$$mv_0 = \overline{mv}_0 + mvd_0 \quad \text{[Equation 8]}$$
$$mv_1 = \overline{mv}_1 + mvd_1 + mvd_0$$
$$mv_2 = \overline{mv}_2 + mvd_2 + mvd_0$$

FIGS. 24 and 25 are diagrams illustrating a method of deriving a motion vector candidate using motion information of a neighboring block in an affine inter mode according to an embodiment of the disclosure.

In the affine candidate list, an affine motion is extended from spatial neighboring blocks (extrapolated affine candidates), and the affine candidate list is appended by a combination of motion vectors from the spatial neighboring blocks (virtual affine candidates). Candidate sets are set as follows:

1. A maximum of two different affine MV predictor sets are derived from an affine motion of neighboring blocks. Neighboring blocks A0, A1, B0, B1, and B2 are checked as illustrated in FIG. 24. If a neighboring block is encoded by an affine motion model and a corresponding reference frame is the same as the reference frame of a current block, two control points (for a 4-parameter affine model) of the current block or three control points (for a 6-parameter affine model) of the current block are derived from the affine model of neighboring blocks.

2. FIG. 25 illustrates neighboring blocks used to generate a virtual affine candidate set. Neighboring MVs are divided into three groups: S_0={mv_A, mv_B, mv_C}, S_1={mv_D, mv_E}, and S_2={mv_F, mv_G}. mv_0 is the first MV that refers to the same reference picture as that of a current block in S0. mv_2 is the first MV that refers to the same reference picture as that of a current block in S1.

If mv_0 and mv_1 are given, mv_2 may be derived by Equation 9 below.

$$\overline{mv}_2^x = \overline{mv}_0^x - h\frac{(\overline{mv}_1^y - \overline{mv}_0^y)}{w},$$

$$\overline{mv}_2^y = \overline{mv}_0^y + h\frac{(\overline{mv}_1^x - \overline{mv}_0^x)}{w},$$

[Equation 9]

In Equation 9, a current block size is W×H.

If only mv_0 and mv_2 are given, mv_1 may be derived by Equation 10 below.

$$\overline{mv}_1^x = \overline{mv}_0^x + h\frac{(\overline{mv}_2^y - \overline{mv}_0^y)}{w},$$

$$\overline{mv}_1^y = \overline{mv}_0^y - h\frac{(\overline{mv}_2^x - \overline{mv}_0^x)}{w}.$$

[Equation 10]

In an embodiment of the disclosure, affine inter prediction may be performed according to the following sequence.

Input: affine motion parameters, reference picture samples
Output: the prediction block of a CU
Processor
Derive the sub-block size of an affine block
If both the width and height of a sub-block are larger than 4 luma samples,
With respect to each sub-block,
Derive the motion vector of a sub-block
Perform a motion compensation (1/16 pel for luma and 1/32 pel for chroma) based on DCT-IF on sub-blocks (invoked)
If not, a compensation based on an enhanced bi-linear interpolation filter is performed (invoked) on all affine blocks Furthermore, in an embodiment of the disclosure, if a merge/skip flag is false and the width and height of a CU are larger than or equal to 8, an affine flag is signaled in order to indicate whether an affine inter mode will be used in a CU level. If a CU is coded in an affine inter mode, a model flag is signaled in order to indicate whether a 4-parameter or 6-parameter affine model is applied to the CU. If the model flag is true, an AF_6_INTER mode (6-parameter affine model) is applied and MVDs are parsed. If not, an AF_4_INTER mode (4-parameter affine model) is applied, and two MVDs are parsed.

In the AF_4_INTER mode, similarly to the affine merge mode, motion vector pairs extrapolated from neighboring blocks coded by the affine mode are generated and preferentially inserted into a candidate list.

Thereafter, if the size of the candidate list is smaller than 4, candidates having a motion vector pair {(v_0,v_1) |v0={v_A,v_B,v_c},v_1={v_D, v_E}} are generated using neighboring blocks. As illustrated in FIG. 25, v_0 is selected from the motion vectors of the blocks A, B, and C. A motion vector from a neighboring block is scaled based on the relation between a reference list, a POC for reference to the neighboring block, a POC for reference to a current CU, and the current CU. Furthermore, an approach method of selecting v_1 from neighboring blocks D and E is similar. When the candidate list is larger than 4, candidates are first sorted based on the consistency of neighboring motion vectors (similar to two motion vectors in a candidate pair), and the first 4 candidates are preserved.

If the number of candidate lists is smaller than 4, the list is padded by a motion vector pair by duplicating AMVP candidates.

In the AF_6_INTER mode, similar to the affine merge mode, motion vector triples (affine motion vector triples) extrapolated from neighboring blocks coded in the affine merge mode are generated and preferentially inserted into a candidate list.

Thereafter, when the size of the candidate list is smaller than 4, candidates including motion vector triples {(v_0, v_1, v_2)|v0={v_A, v_B, v_c}, v1={v_D, v_E}, v2={v_G, v_H}} are generated using neighboring blocks. As illustrated in FIG. 25, v_0 is selected from the motion vectors of the block A, B, or C. A motion vector from a neighboring block is scaled based on the relation between a reference list, a POC for reference to the neighboring block, a POC for reference to a current CU, and the current CU. Furthermore, an approach for selecting v_1 from the neighboring blocks D and E is similar to the selection of v_2 from F and G. When the candidate list is larger than 4, candidates are sorted based on the consistency of neighboring motion vectors (similar to two motion vectors in three candidates), and the first 4 candidates are preserved.

When the number of candidate lists is smaller than 4, a list may be padded by motion vector triples configured by duplicating respective AMVP candidates.

After the CPMV of a current CU is derived, the MVF of the current CU is generated according to Equation 11 for a 4-parameter affine model and is generated according to Equation 12 for a 6-parameter affine model, based on the number of affine parameters.

$$\begin{cases} v_x = \frac{(v_{1x} - v_{0x})}{W}*x + \frac{(v_{1y} - v_{0y})}{W}*y + v_{0x} \\ v_y = \frac{(v_{1y} - v_{0y})}{W}*x - \frac{(v_{1x} - v_{0x})}{W}*y + v_{0y} \end{cases}$$

[Equation 11]

$$\begin{cases} v_x = \frac{(v_{1x} - v_{0x})}{W}*x + \frac{(v_{2x} - v_{0x})}{H}*y + v_{0x} \\ v_y = \frac{(v_{1y} - v_{0y})}{W}*x - \frac{(v_{2y} - v_{0y})}{H}*y + v_{0y} \end{cases}$$

[Equation 12]

In this case, a sub-block size M×N is derived in Equation 13, and MvPre is motion vector portion accuracy (1/16).

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases}$$

[Equation 13]

After derived by Equation 12, M and N need to be down adjusted, if necessary, in order to make them the divisor of w and h. When M or N is smaller than 8, a WIF is applied. If not, an affine motion compensation based on a sub-block is applied.

FIG. 26 illustrates an example of an affine motion vector field of a sub-block unit according to an embodiment of the disclosure.

Referring to FIG. 26, in order to derive the motion vector of each M×N sub-block, the motion vector of the center sample of each sub-block, such as that illustrated in FIG. 26, is calculated according to Equation 11 or Equation 12, and is rounded with 1/16 portion accuracy. SHVC up-sampling interpolation filters are used to generate the prediction of each sub-block using a derived motion vector.

The SHVC up-sampling interpolation filters having the same filter length and normalization factor as HEVC motion compensation interpolation filters may be used as motion compensation interpolation filters for additional fractional pel positions. Chroma component motion vector accuracy is a 1/32 sample. The additional interpolation filters of 1/32 pel portion locations are derived using averages of the filters of two neighboring 1/16 pel portion locations.

The AF_MERGE mode may be selected on the encoder side using the same method of selecting a common merge mode. A candidate list is preferentially generated, and a minimum RD-cost is selected in the candidates for a comparison with the RD-costs of other inter modes. A result of the comparison is a determination of whether AF_MERGE is applied or not.

For the AF_4_INTER mode, the check of an RD cost is used to determine whether a motion vector pair candidate is selected as the control point motion vector prediction (CPMVP) of a current CU. After the CPMVP of a current affine CU is determined, affine motion estimation is applied, and a control point motion vector (CPMV) is obtained. Accordingly, a difference between the CPMV and the CPMVP is determined.

On the encoder side, the AF_6_INTER mode is identified only when the AF_MERGE or AF_4_INTER mode is determined as an optimal mode in a previous mode selection stage.

In an embodiment of the disclosure, the affine inter (affine AMVP) mode may be performed as follows:
1) AFFINE_MERGE_IMPROVE: instead of searching the first neighboring block in an affine mode, an improvement is to search a neighboring block having a maximum coding unit size as an affine merge candidate.
2) AFFINE_AMVL_IMPROVE: neighboring blocks in the affine mode is added to an affine AMVP candidate list similarly to a common AMVP procedure.

A detailed process of generating the affine AMVP candidate list is as follows.

First, whether a neighboring block at the bottom left uses an affine motion model and has the same reference index as a current reference index is identified. If the neighboring block is not present, a left neighboring block is identified using the same method. If the neighboring block is not present, whether a neighboring block at the bottom left uses an affine motion model and has a different reference index is identified. If the neighboring block is present, a scaled affine motion vector is added to a reference picture list. If the neighboring block is not present, a left neighboring block is identified using the same method.

Second, a top right neighboring block, a top neighboring block, and a top left neighboring block are identified using the same method.

After the processes, if two candidates are retrieved, the process of generating an affine AMVP candidate list is terminated. If two candidates are not retrieved, an original operation within JEM software is performed to generate affine AMVP candidate lists.

3) AFFINE_SIX_PARAM: in addition to the 4-parameter affine motion model, a 6-parameter affine motion model is added as an additional model.

The 6-parameter affine motion model is derived through Equation 14.

$$\begin{cases} MV_x = ax + by + c \\ MV_y = dx + ey + f \end{cases} \quad \text{[Equation 14]}$$

Three motion vectors at the top left location MV_0, the top right location MV_1, and the bottom left location MV_2 are necessary to determine a model because 6-parameters are present in the motion model. Three motion vectors may be determined using a method similar to the method of two motion vectors in the 4-parameter affine motion model. The affine model merge is always set as a 6-parameter affine motion model.

4) AFFINE_CLIP_REMOVE: motion vector constraints for all affine motion vectors are removed. Motion compensation processes are made to control the motion vector constraints themselves.

Affine Motion Model

As described above, various affine motion models may be used or considered in affine inter prediction. For example, an affine motion model may represent four motions as in FIG. 14. An affine motion model capable of representing three motions (translation, scale, and rotate), among motions capable of being represented by the affine motion model, may be called a similarity (or simplified) affine motion model. The number of CPMVs and/or a method of deriving the sample/sub-block unit MV of a current block may be different depending on which one of the affine motion models is used.

In an embodiment of the disclosure, adaptive four and six parameter motion models are used. In AF_INTER, a 6-parameter motion model is proposed in addition to the 4-parameter motion model present in JEM. The 6-parameter affine motion model is described like Equation 15.

$$x' = a*x + b*y + c \quad \text{[Equation 15]}$$
$$y' = d*x + e*y + f$$

In this case, coefficients a, b, c, d e, and f are affine motion parameters. (x,y) and (x',y') are coordinates at pixel locations before and after the transform of an affine motion model. In video coding, in order to use the affine motion model, if CPMV0, CPMV1, and CPMV2 are MVs for CP0 (top left), CP1 (top right), and CP2 (bottom left), Equation 16 may be described as follows.

$$\begin{cases} v_x = \dfrac{(v_{1x} - v_{0x})}{w} * x + \dfrac{(v_{2x} - v_{0x})}{h} * y + v_{0x} \\ v_y = \dfrac{(v_{1y} - v_{0y})}{w} * x - \dfrac{(v_{2y} - v_{0y})}{h} * y + v_{0y} \end{cases} \quad \text{[Equation 16]}$$

In this case, CPMV_0={v_0x,v_0y}, CPMV_1={v_1x, v_1y}, CPMV_2={v_2x,v_2y}, and w and h are the width and height of each coding block. Equation 16 is the motion vector field (MVF) of the block.

A flag is parsed in a CU level in order to indicate whether a 4-parameter or 6-parameter affine motion model is used when neighboring blocks are coded as affine prediction. If a neighboring block coded as affine prediction is not present, the flag is omitted and the 4-parameter model is used for affine prediction. In other words, the 6-parameter model is considered in the condition in which one or more neighboring blocks are coded in an affine motion model. In relation to the number of CPMVDs, each of two or three CPMVDs is signaled with respect to the 4-parameter and 6-parameter affine motion models.

Furthermore, in an embodiment of the disclosure, pattern-matched motion vector refinement may be used. In the pattern-matched motion vector derivation (PMMVD, hereinafter abbreviated as a PMVD in the JEM encoder description) of JEM, the decoder needs to evaluate some motion vectors (MVs) in order to determine a start MV candidate for CU-level search. In sub-CU-level search, some MV candidates are added in addition to an optimal CU-level MV. The decoder needs to evaluate such MV candidates in order to search for an optimal MV. This requires a great memory band. In the proposed pattern-matched motion vector refinement (PMVR), the concepts of template matching and bilateral matching in PMVD are adopted in JEM. When a skip mode or merge mode is selected to indicate whether the PMVR is available, one PMVR_flag is signaled. In order to meaningfully reduce the memory bandwidth requirement compared to the PMVD, an MV candidate list is generated. If the PMVR is applied, a start MV candidate index is explicitly signaled.

A candidate list is generated using the merge candidate list generation process, but sub-CU merge candidates, for example, affine candidates and ATMVP candidates are excluded. For bilateral matching, only a uni-prediction MV candidate is included. A bi-prediction MV candidate is divided into two unit-prediction MV candidates. Furthermore, similar MV candidates (having MV differences smaller than a predefined threshold) are also removed. For CU-level search, diamond search MV refinement is performed starting from a signaled MV candidate.

Sub-CU-level search is available only in the bilateral matching merge mode. A search window for the sub-CU-level search for all sub-CUs is the same as a search window for CU-level search. Accordingly, an additional bandwidth is not necessary in the sub-CU-level search.

In order to refine an MVP in a mode, template matching is also used. In the AMVP mode, two MVPs are generated using an HEVC MVP generation process, and one MVP index is signaled to select one of the two MVPs. The selected MVP is further refined using template matching in PMVR. If adaptive motion vector resolution (AMVR) is applied, the MVP is rounded with corresponding accuracy prior to the template matching refinement. Such a refinement process is named pattern-matched motion vector predictor refinement (PMVPR). In the remainder of this document, PMVR includes template matching PMVR, bi-direction matching PMVR, and PMVPR unless specially defined otherwise.

In order to reduce a memory bandwidth requirement, PMVR is unavailable for 4×4, 4×8, and 8×4 CUs. In order to reduce the amount of a required additional memory bandwidth, the search range of {template matching, bi-direction matching} for a CU area equal to 64 may be reduced to {±2, ±4}. The search range of {template matching, bi-direction matching} for a CU area larger than 64 may be reduced to {±6, ±8}. Compared to the worst case in HEVC, a required memory bandwidth was reduced from 45.9× in PMVD of JEM-7.0 to 3.1× in PMVR using all the methods described in the PMVR section of this document.

MVD Coding

The current state-of-the-art video coding technology uses motion vectors and its motion vector predictors to generate motion vector differences (MVD). The MVD can be more formally defined as the difference between the motion vector and the motion vector predictor. Similar to the motion vector, the MVD has an x 0 and y component that correspond to the motion in x (horizontal) and y (vertical) directions. The MVD may be an attribute that is available only when the coding unit is encoded using the (Advanced) Motion Vector Prediction ((A)MVP) mode.

Once the MVD is determined, it is then encoded or decoded based on entropy techniques. Encoder or decoder may reuse the redundancy in motion vectors and increase the compression efficiency through MVD techniques. At the decoder, the motion vector difference (MVD) may be decoded before the motion vectors of the coding unit are decoded. Encoding MVD over encoding the actual motion vectors may serve to exploit the redundancy between the motion vectors and its predictors and in so doing enhance the compression efficiency.

The input to the MVD coding stage at the decoder is just the coded MVD bins that have been parsed for decoding. The inputs to the MVD coding stage at the encoder are the actual MVD values and additionally a flag (for example "imv" flag) that indicates the resolution for the MVD encoding. The flag may be used to decide if the MVD should be expressed as 1-pel (or pixel), 4-pel or as quarter-pel.

FIG. 27 illustrates an overall coding structure for deriving a motion vector according to an embodiment of the disclosure.

Referring to FIG. 27, the coding unit is initially checked if it is the Merge Mode (S2701).

If the coding unit is in Merge mode, an affine flag and merge index are parsed to proceed with the decoding (S2702).

If the merge mode is not applied to the coding unit, then the AMVP mode may be applied to the current block. In the AMVP mode, the list information is first parsed, i.e., if List 0 or List 1 or both the lists are to be used (S2703). Then, the affine flag is parsed (S2704). Following this, the parsed Affine flag is checked if it is true or false (S2705).

If true, then parse_MVD_LT and parse_MVD_RT corresponding to the left (LT) and right (RT) MVDs are processed (S2706). If the Affine flag is false, then the MVD is processed (S2707). Affine motion modeling in the special case of AMVP will be described in detail below.

FIG. 28 shows an example of an MVD coding structure according to an embodiment of the disclosure.

Referring to FIG. 28, first and foremost, the MVD greater than zero flags for the horizontal (MVDxGT0) and vertical (MVDYGT0) components are parsed (S2801).

Following this, the parsed data for the horizontal component is checked if it's greater than zero (i.e., MVDxGT0) (S2802). If the MVDxGT0 flag is true (i.e. MVDxGT0 is equal to '1'), then the horizontal component greater than one is parsed (i.e., MVDxGT1) (S2802). If the MVDxGT0 is not true (i.e. MVDxGT0 is equal to '0'), then the MVDxGT1 data may not be parsed.

The decoder perform a substantially same procedure for the vertical component (S2803, S2804).

Following this, the parsed MVD data can be processed further in the blocks labelled MVDx_Rem_Level and MVDy_Rem_Level in order to obtain the reconstructed MVDs (S2805, S2806).

FIG. 29 shows an example of an MVD coding structure according to an embodiment of the disclosure.

Referring to FIG. 29, how the decoder decodes the MVDx component in the MVDx_Rem_Level process of the step s2805 of FIG. 28. If the decoded flag indicating that the parsed data would be greater than zero (i.e., MVDxGT0) is true (S2901) and the decoded flag indicating the parsed data would be greater than one (i.e., MVDxGT1) is true (S2902), then the bins corresponding to the parsed MVDx component are decoded using Exponential Golomb (EG) Code with order one (S2903). The inputs to the EG would be the bins containing the absolute min two (i.e., Abs-2) MVD values and the Golomb order of one.

And then, the sign information is then parsed by decoding the bypass bin containing the information (S2904). If the decoded bypass bin has a value of 1, then a negative sign is appended to the decoded MVDx. If however, the decoded bypass bin has a value of 0, then the decoded MVD is indicated as a positive value. If MVDxGR0 is true but the MVDxGR1 is not true, then this indicates that the absolute value of the MVDx being decoded is 1. The sign information may be then parsed and updated. However, if the MVDxGR0 is false, then the reconstructed MVDx is 0.

A similar process is used to decode the MVDy (i.e., MVDy_Rem_Level) at the decoder is shown in the FIG. 42 below.

FIG. 30 shows an example of an MVD coding structure according to an embodiment of the disclosure.

Referring to FIG. 30, if the decoded flag indicating that the parsed MVDy greater than zero (i.e., MVDyGT0) is true (S3001), then the flag MVDyGR1 is checked (S3002).

If both MVDyGR0 and MVDyGR1 are true, then the parsed MVD data is decoded using EG Code with inputs being the bins containing the absolute minus two (Abs-2) MVD and order one (S3003). Following this, the sign information is parsed and decoded to obtain the decoded MVDy (S3004). If MVDyGR0 is true but MVDyGR1 is false then, the absolute vertical value may be determined (or inferred) to be either +1/−1. The sign information may be then parsed and decoded in a similar manner as explained above. The decoder may obtain the decoded MVDy. If the MVDyGR0 flag is false, MVDy may be zero.

FIG. 31 shows an example of an MVD coding structure according to an embodiment of the disclosure.

Referring to FIG. 31, at the encoder the signed MVD values may be encoded. Similar to the FIG. 41, the greater than zero bins are encoded for the x and y components (S3101, S3111), i.e., MVDxGR0 and MVDyGR0 by checking the absolute values of the horizontal and vertical components. Then the greater than one flags may be encoded for the horizontal and vertical components (S3102, S3112), i.e., MVDxGR1 and MVDyGR1. Following this the absolute MVD values are encoded similar to the decoder, the horizontal and vertical components may be encoded sequentially.

For the horizontal MVD encoding, if the absolute horizontal MVD component is greater zero (i.e., MVDxGR0) and if it is greater than one (i.e., MVDxGR1), then the (absolute value −2) is encoded using the EG Code with order one (S3103). Following this the sign information is encoded using bypass bin (S3104). If MVDxGR0 was true and MVDxGR1 was not true, then only the sign information may be encoded. If MVDxGR0 is not true, then the MVDx may be zero. The same process may be repeated to encode MVDy (S3113, S3114).

Affine Coding

Prior video coding standards have only considered translational motion model. However, the underlying motion may incorporate effects such as zooming, rotation, panning and other irregular motions. In order to capture this nature of motion, the latest video coding standard introduced Affine motion coding, where by the irregular characteristics of the motion information can be captured using either a 4-parameter or a 6-parameter Affine motion model.

If a 4 parameter model is used, then 2 control points may be generated and if the 6-parameter model is used 3 control points are used. FIG. 16, previously described, illustrates the concept of affine motion more clearly. By using the 4-parameter model, the current block may be encoded using two control point motion vectors given by v_0 (cpmv_0) and v1 (cpmv_1).

Once these control points are derived, the MVF for each of the 4×4 sub-blocks is described by the following equation 17.

$$\begin{cases} v_x = \frac{(v_{1x} - v_{0x})}{w} * x + \frac{(v_{1y} - v_{0y})}{w} y + v_{0x} \\ v_y = \frac{(v_{1y} - v_{0y})}{w} * x - \frac{(v_{1x} - v_{0x})}{w} y + v_{0y} \end{cases} \quad \text{[Equation 17]}$$

Where (v_0x, v_0y) is motion vector of the top-left corner control point, and (v_1x, v_1y) is motion vector of the top-right corner control point. The motion vector of each 4×4 sub-block may be calculated by deriving the motion vector of the center sample of each sub-block as illustrated in the FIG. 26, previously described.

In an embodiment of the disclosure, there is proposed a method for removing redundancy by utilizing the correlation between motion vector differences (MVDs) of control points based on differences between control points.

In the disclosure, for convenience of description, a case where an affine motion model using four parameters is applied, that is, a case where an inter prediction is performed by using the upper left and upper right control points for affine motion prediction, is mainly described, but the disclosure is limited thereto. Even when a motion model using six parameters is applied, or when three or more control points are used through other cases, the MVD difference transmission method between control points proposed in the disclosure can be applied in substantially the same/similar manner.

That is, in the embodiment of the disclosure, the encoder/decoder may use the correlation between the upper left and upper right control points and redundancy between MVDs by coding any one control point (e.g., the upper right control point) using the MVD difference between the upper left and upper right control points.

According to an embodiment, the decoder may restore (or derive) the MVD of the upper right control point by decoding the MVD of the upper left control point according to a conventional MVD coding method, decoding the difference between the MVDs of the upper left and upper right control points to the MVD of the upper left control point, and adding the difference between the MVDs of the upper left and upper right control points to the MVD of the upper left control point.

According to the disclosure, the MVD difference between the upper left control point and the upper right control point may be shortly referred to as an MVD difference (or difference MVD), but the disclosure is not limited thereto.

FIG. 32 is a view illustrating a method for deriving affine motion vector difference information according to an embodiment of the disclosure.

Referring to FIG. 32, the following description focuses primarily on a decoder for convenience of description, but the disclosure is not limited thereto, and the method of signaling MVD information according to an embodiment of the disclosure may be performed in an encoder and a decoder in substantially the same manner. Although it is described above in connection with FIG. 32 that two control points at the upper left and upper right sides are used for affine prediction, the disclosure is not limited thereto. For example, although three control points at the lower left, upper left, and upper right sides are used, the same may be applied likewise.

According to an embodiment of the disclosure, the encoder/decoder may encode/decode the MVD of the upper right control point using the difference between the MVDs of the upper left and upper right control points.

The decoder identifies whether affine prediction (or affine motion prediction) is applied to the current block (S3201). When affine prediction is not applied to the current block, the decoder parses the MVD of the current block (S3202).

When affine prediction is applied to the current block, the decoder parses the MVD difference flag (S3203) and identifies whether the MVD difference is used in the current block based on the MVD difference flag (S3204). If the MVD difference is not used in the current block, the decoder parses the MVDs for the upper left and upper right control points in the same way as conventional (S3205).

When the MVD difference is used in the current block, the decoder parses the MVD of the upper left control point and parses the MVD difference (S3206). The decoder may restore (or derive or obtain) the MVD of the upper right control point by adding the MVD difference to the MVD of the upper left control point.

In one embodiment, a syntax element may be transmitted through a bit stream to achieve the proposed method. For example, a flag (or syntax element), e.g., is_delta_affine_MVD, indicating that the MVD difference has been used (or whether the MVD difference is activated) may be transmitted through the bit stream. Further, a flag (or syntax element) that is used at a slice, coding tree unit, or coding unit level and indicates whether the MVD difference is used in a corresponding level unit may be transmitted from the encoder to the decoder. Table 1 below shows possible use of a high-level syntax in a bit stream when the MVD difference flag is used.

TABLE 1

| | Description |
|---|---|
| high_level_parameter_set( ) { | |
| ... | |
|    is_delta_affine_MVD | u(1) |
| ... | |

In Table 1, when is_delta_affine_MVD is 1, it indicates that is_delta_affine_MVD is present in a slice header of a non-IDR picture of a coded video sequence (CVS). When is_delta_affine_MVD is 0, it indicates that is_delta_affine_MVD does not exist in the slice header and that the adaptive difference MVD according to the present embodiment is not used in CVS.

Further, in an embodiment, a syntax element for indicating whether the difference MVD according to the present embodiment is applied at a slice, coding tree unit, or coding unit level may be additionally signaled. For example, a syntax structure according to Table 2 below may be defined.

TABLE 2

| | Description |
|---|---|
| slice_segment_header( ) { | |
| ... | |
|   if(is_delta_affine_MVD) | |
|     slice_delta_mvd | u(1) |
| ... | |
| } | |
| ... | |

In Table 2, if slice_delta_mvd is 0, it indicates that the current CU (or current slice) does not use the MVD difference (or MVD difference function), and if slice_delta_mvd is 1, it indicates that the CU uses the MVD difference. Further, in Table 6, it is assumed that a syntax element indicating whether to apply the MVD difference is included in the slice segment header, but the disclosure is not limited thereto and may be included in syntax of various levels. For example, a syntax element indicating whether to apply the MVD difference may be included in the coding tree unit syntax and the coding unit syntax.

Further, in another embodiment, the MVD difference may always be applied (or used) without signaling whether to use.

Also, in an embodiment of the disclosure, a method for determining whether to use the MVD difference based on a threshold is proposed to control the use of the MVD difference technique. This ensures a higher level of correlation between the upper left MVD and the upper right MVD prior to applying the proposed method, thereby increasing the flexibility and further enhancing the accuracy of the embodiment described above. As an example, the threshold may be determined in various ways. For example, the threshold may adopt an empirical value or may be derived from basic data statistics. An example in which the threshold is used is described below with reference to the drawings.

FIG. 33 is a view illustrating a method for deriving motion vector difference information based on a threshold according to an embodiment of the disclosure.

Referring to FIG. 33, the following description focuses primarily on a decoder for convenience of description, but the disclosure is not limited thereto, and the method of signaling MVD information according to an embodiment of the disclosure may be performed in an encoder and a decoder in substantially the same manner. Although it is described above in connection with 33 that two control points at the upper left and upper right sides are used for affine prediction, the disclosure is not limited thereto. For example, although three control points at the lower left, upper left, and upper right sides are used, the same may be applied likewise.

According to an embodiment of the disclosure, the encoder/decoder may encode/decode the MVD of the upper right control point using the difference between the MVDs of the upper left and upper right control points and, in this case, a threshold may be used.

The decoder identifies whether affine prediction (or affine motion prediction) is applied to the current block (S3301). When affine prediction is not applied to the current block, the decoder parses the MVD of the current block (S3302).

When affine prediction is applied to the current block, the decoder parses the MVD difference flag (S3303) and identifies whether the MVD difference is used in the current block based on the MVD difference flag (S3304). If the MVD difference is not used in the current block, the decoder parses the MVDs for the upper left and upper right control points in the same way as conventional (S3305).

When the MVD difference is used in the current block, the decoder parses the threshold (S3306). The decoder parses the MVD of the upper left control point based on the parsed threshold and parses the MVD difference (S3307). The decoder may restore (or derive or obtain) the MVD of the upper right control point by adding the MVD difference to the MVD of the upper left control point.

In one embodiment, the threshold may be used to compare a difference between the MVDs of the upper left control point and the upper right control point. That is, when the difference between the MVDs of the upper left control point and the upper right control point is greater than the threshold, the proposed MVD difference method may not be applied. If the difference between the MVDs of the upper left control point and the upper right control point is less than or equal to the threshold, the MVD difference method may be applied.

A different threshold may be set per picture, slice, CTU, or CU. In this case, the threshold may be transmitted in each header, or may be extended and transmitted in another header. Alternatively, the threshold may be kept fixed. In this case, syntax parsing or additional overhead signaling may not be required.

In an embodiment of the disclosure, other context models and binarization methods may be additionally applied to the above-described embodiments. That is, in the above-described embodiments 1 and 2, since the upper-right control point is coded based on a difference between the MVDs of the upper-left and upper-right control points, it is advantageous that it does not share the same context model with the upper left control point in performing entropy coding on MVDx_GR0, MVDy_GR0, and MVDx_GR1 and MVDy_GR1 flags. This is because there is a high possibility that the default probability of MVD is different from the probability obtained from coding on the upper right control point by using the difference MVD.

Here, MVDx_GR0 and MVDy_GR0 are flags indicating whether the horizontal and vertical components, respectively, of the MVD are greater than 0. MVDx_GR1 and MVDy_GR1 are flags indicating whether the horizontal and vertical components, respectively, of the MVD are greater than 1.

Accordingly, in an embodiment of the disclosure, the encoder/decoder may use different context models in performing entropy coding on syntax elements indicating MVD information for the upper right control point and the upper left control point. Further, in an embodiment, different binarization techniques for syntax elements indicating MVD information for the upper right control point and the upper left control point may be used to enhance compression performance.

In an embodiment of the disclosure, there is proposed a vector coding technique for jointly coding the MVDs of upper left and upper right control points for each of horizontal and vertical components. This embodiment independently derives the correlation between the upper left and upper right control points of the horizontal and vertical components by data statistics.

FIG. 34 is a view illustrating a vector coding method for an affine motion vector difference according to an embodiment of the disclosure.

FIG. 34 is derived from data statistics using frequency analysis. Although it is described above in connection with FIG. 34 that two control points at the upper left and upper right sides are used for affine prediction, the disclosure is not limited thereto. For example, although three control points at the lower left, upper left, and upper right sides are used, the same may be applied likewise. Further, in FIG. 34, a method for performing vector coding on the MVD of the horizontal component (i.e., the x-axis component) is described, and the same may be applied to the MVD of the vertical component (i.e., the y-axis component).

As an example, the MVD horizontal components on the upper left and upper right sides may be displaced and distributed in an elliptical shape as illustrated in FIG. 34. Here, the center point in the position (0, 0) which is not shaded indicates that the MVD horizontal components of the upper left and upper right control points correspond to 0. The center point corresponds to a MVD combination that occurs most frequently in the data set. FIG. 34 may be regarded as a grid having positive and negative MVD values.

Further, a block adjacent to the center point means an increase or decrease in MVD value at a single control point or both control points. Frequency analysis of data suggests that certain groups of MVD values occur with similar probabilities. That is, blocks illustrated in the same pattern in FIG. 34 may be classified into one group, and MVD values within each group may be generated with similar probabilities according to data frequency analysis.

Consequently, in the disclosure, a layer representing an MVD combination (or group) having a similar probability of occurrence is defined. In one embodiment, four layers may be defined as illustrated in FIG. 34. In another embodiment, it may be extended to incorporate several different layers. However, according to data analysis, it may be identified that most of the data may be processed by the layers illustrated in 34.

FIG. 35 is a view illustrating a vector coding method for an affine motion vector difference according to an embodiment of the disclosure.

Referring to FIG. 35, two layers as described above in connection with FIG. 34 are shown as an example. An unshaded first layer and a shaded second layer are shown.

The first layer includes a center point of the (0,0) position, and the second layer includes some of the coordinates adjacent to the center point.

Referring to FIGS. 34 and 35, the MVD value generally increases as each concentric circle (i.e., layer) increases. As described above, the vertical component of MVD also exhibits the same characteristics. Data analysis suggests that there is a high correlation between the affine MVDs of the upper left and upper right control points, which may be jointly used.

The method described above in connection with FIG. 27 may be applied to the coding structure according to an embodiment of the disclosure. Referring back to FIG. 27 described above, in step S2707, the decoder does not individually parse the MVD of the upper left control point and the MVD of the upper right control point, but parses the MVDs of the upper left and upper right control points together (or simultaneously).

In an embodiment, whether to use (or apply) a vector coding scheme may be activated/deactivated through a flag syntax. In this case, the decoder may perform an additional check to determine whether the CU should be coded in the vector coding mode.

FIG. 36 is a parsing flowchart for MVD components according to an embodiment of the disclosure.

Referring to FIG. 36, the encoder/decoder encodes/decodes the level for the horizontal component of the upper left and upper right control point MVDs (S3601) and encodes/decodes the level of the vertical component of the upper left and upper right control point MVDs. (S3602). That is, the encoder/decoder may parse the MVDs of the upper left and upper right control points together (or simultaneously).

As an embodiment, the encoder/decoder may determine (or derive) final MVD horizontal/vertical components by obtaining layer information for the horizontal/vertical components and then encoding/decoding index information indicating specific coordinates in the layer.

FIG. 37 is a view illustrating a coding structure of a motion vector difference performed based on vector coding according to an embodiment of the disclosure.

Referring to FIG. 37, the following description focuses primarily on a decoder for convenience of description, but the disclosure is not limited thereto, and the method of signaling affine motion vector difference information according to an embodiment of the disclosure may be performed in an encoder and a decoder in substantially the same manner.

In an embodiment of the disclosure, MVDs for upper left and upper right control points may be coded together based on vector coding. In FIG. 37, a method for performing vector coding on the MVD of the horizontal component (i.e., the x-axis component) is described, and the same may be applied to the MVD of the vertical component (i.e., the y-axis component). FIG. 37 may correspond to the MVDx_LT_MVDx_RT_Vector_Level processing step of step S3601 of FIG. 36.

The decoder parses a flag (i.e., Layerx_GT0) indicating whether the layer of the horizontal components of the MVDs of the upper left and upper right control points is larger than layer 0 (i.e., the first layer) (S3701). The layer 0 indicates a layer including the center point of the (0,0) position. If the flag is false, all of the horizontal components of the control points correspond to 0, and in this case, the decoder performs an MVDy_LT_MVDy_RT_Vector_Level analysis step (i.e., S4802 in FIG. 48).

If Layerx_GT0 is true, the decoder parses a first index indicating a bin coded with two contexts (S3702 and S3703). The first index may determine (i) whether the target MVDx combination is in layer 1 (i.e., the second layer), and if so, which index it corresponds to in the corresponding layer, or (ii) whether the decoding needs to perform a process for checking a subsequent layer (S3704). For example, the first index may have the results of {(0,0), (0,1), (1,0), (1,1)}. If the first index value is (0,0), it indicates that the target MVD combination does not exist in the current layer and a subsequent layer need be checked. The remaining three combinations represent index values indicating specific coordinates within the layer.

That is, if the first index value is not (0, 0), the MVD horizontal components of the upper left and upper right control points are derived (or obtained) based on the first index value (S3705). In one embodiment, the MVD horizontal component of the upper left control point may be derived by performing a right shift operation by 2 for the first index, and the MVD horizontal component of the upper right control point may be derived by performing an AND operation of the first index and 2.

If the first index value is (0, 0), the decoder increases the layer to a next layer (i.e., the third layer) and then parses layer and/or index information (S3706). In an embodiment, the layer and index information may be parsed using an exponential Golomb code having an exponential Golomb parameter of 1 (i.e., order of 1). Then, the decoder identifies whether it is included in the third layer based on the index information (S3707 and S3709) and determines an exact combination of MVDx based on the index information in the layer determined based thereupon (S3708, S3710, and S3711). The index information in step S3706 may be a first index or a second index that is additionally parsed in step S3706.

The decoder parses sign information for the final MVDx values of the upper left and upper right control points (S3712). When the above-described process is complete, the decoder derives the MVD vertical component by performing the step of determining MVDy_LT_MVDy_RT_Vector_Level (i.e., S4802 in FIG. 48).

To integrate a more general structure, a coding structure resultant from modifying the conventional structure by the above-described embodiments is described below.

FIG. 38 is a view illustrating a coding structure of a motion vector difference performed based on vector coding according to an embodiment of the disclosure.

Referring to FIG. 38, the following description focuses primarily on a decoder for convenience of description, but the disclosure is not limited thereto, and the method of signaling affine motion vector difference information according to an embodiment of the disclosure may be performed in an encoder and a decoder in substantially the same manner. No duplicate description related to FIG. 37 is given below.

In the embodiment of the disclosure, the decoder parses the Layerx_GT0 flag indicating whether it is larger than a first layer (the layer having a layer value of 0) (S3801) and, if the Layerx_GT0 flag is true (S3802), parses the Layerx_GT1 layer indicating whether it is larger than a second layer (the layer having a layer value of 1) (S5383).

If the value of Layerx_GT1 is 0 (i.e., when belonging to the first layer), the decoder parses a first index and decodes the horizontal component of the MVD based on the value of the index (S3804 to S3808). In this case, the value of the first index may have a value of 0 or 1. If it has a value of 0, the horizontal components of the MVDs of the upper left and upper right control points all may have a value of 1. Otherwise, it may be determined as a combination of (1, 0) or (0, 1).

If the value of Layerx_GT1 is 1, the decoder parses the remaining layer information indicating a specific layer among the subsequent layers and a second index (S3809). The remaining layer may have a value obtained by subtracting 2 from the current layer (or the final layer). In one embodiment, the decoder may decode the remaining layer information and/or the second index using an exponential Golomb code having an exponential Golomb parameter of 1 (i.e., order of 1) and/or truncated binarization (TB) (or truncated unary binarization). Further, the decoder may determine the current layer by adding the remaining layer to the first layer value.

The decoder identifies whether the second index is less than or equal to the current layer (S3810). Once the index is decoded, a combination of MVD values needs to be determined. To this end, an additional check may be performed to determine an exact MVD combination, i.e., whether the index is equal to or smaller than the layer ID. According to the result of the check, the MVD (LTx, RTx) having the second index smaller than or equal to the current layer may be determined to have a value equal to (index, Layer Id) (S3811).

The decoder identifies whether the second index is less than twice the current layer (S3812). If the index is less than twice the layer, MVD (LTx, RTx) may be determined to have the same value as (Layer Id, 2*Layer Id−index)

(S3813). Otherwise, the MVD (LTx, RTx) may be determined to have the same value as (Layer Id+2*Layer Id–index, 2*Layer Id–index) (S3814). Then, sign information is parsed (S3815). The layer information and index coding described above are examples, and the disclosure is not limited thereto.

As an embodiment of the disclosure, the following methods may be applied to the embodiments described above.
Context model may be varied
Different binarization techniques may be applied.
When exponential Golomb code is used, different Golomb orders may be used.
Layer information and index may be coded with only the exponential Golomb code.

Also, in an embodiment of the disclosure, a method for jointly coding MVDs for x and y components using vector coding techniques is proposed. In the above-described embodiment, the correlation between the horizontal and vertical components of the MVDs of the left (LT) and right (RT) control points is used only for the affine motion model. Hereinafter, a generalized MVD coding method that is not limited to the affine motion model and retains the previously described layer and index concept is proposed.

FIG. 39 is a view illustrating a vector coding method for a motion vector difference according to an embodiment of the disclosure.

FIG. 39 may be derived using data statistics using frequency analysis. Referring to FIG. 39, it is shown that when the x-MVD components (i.e., the horizontal direction components of the MVD) are divided for the y-MVD components, each layer may form a rhombus shape. In the structure illustrated in FIG. 39, the center point (i.e., the position where the value is 0) indicates the position where the MVDx and MVDy values are 0 (i.e., 0,0 marked next to FIG.).

The center point (0,0) corresponds to an MVD combination that most frequently occurs in the data set. In this case, FIG. 39 may be regarded as a grid having positive and negative MVD values, and in a block adjacent to the center point, the MVD value may increase or decrease along the horizontal or vertical axis.

According to the data frequency analysis, the MVD values of a specific group may occur with similar probabilities. As a result, according to an embodiment of the disclosure, a layer representing MVD combinations having similar probabilities may be defined. The layers illustrated in FIG. 39 are an example, and may be extended to include several other layers. Further, in this embodiment, sign information may not be separately coded, which may save signaling bits. As an embodiment, the MVD may be encoded/decoded using layer and index information.

FIG. 40 is a view illustrating a vector coding method for a motion vector difference based on a layer structure according to an embodiment of the disclosure.

Referring to FIG. 40, for convenience of description in applying an embodiment of the disclosure, the description focuses primarily on a decoder, but the MVD coding method according to an embodiment of the disclosure can be applied to an encoder in substantially the same manner.

Referring to FIG. 40, to decode the MVD of the current block, the decoder first parses a Layer GRT0 flag indicating whether the layer is greater than 0 (S4001). In the disclosure, the layer (or layer ID) may have an integer (i.e., 0, 1, 2, 3, 4, . . . ) in ascending order from 0. In the disclosure, when the layer is 0, the layer is a layer that comes first and may be referred to as the first layer, and similarly, when the layer is 1, the layer is a layer that comes second and may be referred to as the second layer. That is, a layer ID and a layer order may have a difference of 1 in value. When the Layer GRT0 flag is 0 (i.e., false), both the MVDx and MVDy values may be determined to be 0.

If the Layer GRT0 flag is true, the decoder parses the Layer GRT1 flag (S4002 and S4003). In the disclosure, the Layer GRT0 flag and the Layer GRT1 flag are not limited by their names. If the Layer GRT1 flag is true, the current layer is 2 or more, and the decoder parses Rem_Layer indicating the remaining layer information (S4005). The remaining layer (i.e., Rem_Layer) may be a value obtained by subtracting 2 from the current layer (or the final layer). In one embodiment, the decoder may decode the remaining layer information using an exponential Golomb code having an exponential Golomb parameter of 1 (i.e., order of 1) and/or truncated binarization (TB) (or truncated unary binarization). When the Layer GRT1 flag is true, the current layer is 1, and the index to be decoded may be placed in the second layer.

The decoder parses an index indicating a specific MVD combination in the determined current layer (S4006). In one embodiment, the decoder may decode the index using an exponential Golomb code having an exponential Golomb parameter of 1 (i.e., order of 1) and/or truncated binarization (TB) (or truncated unary binarization).

The decoder derives the MVD based on the determined current layer and index values (S4007).

According to conventional video compression techniques, the horizontal component (x) and the vertical component (y) of the MVD are individually encoded/decoded. However, as described above, according to data analysis based on frequency analysis, the horizontal component and the vertical component of the MVD may have a mutual correlation and are highly likely to belong to the same layer in the layer structure according to an embodiment of the disclosure.

Accordingly, according to an embodiment of the disclosure, the MVD coding efficiency may be significantly increased by coding the horizontal and vertical components of the MVD together based on layer information and index information.

Also, in one embodiment of the disclosure, a specific method for finally deriving MVD based on the index parsed is proposed. That is, in steps S4006 and S4007 of FIG. 40 described above, the MVD (x, y) value may be determined according to a method as described below. In the disclosure, for convenience of description, layer may be referred to as Lyr, and index may be referred to as idx.

First, when the layer (or layer index) is 1, MVDs in the horizontal and vertical directions may be determined according to Equation 23 below.

$$MVD_x = ((idx \leq Lyr) \: ? \: idx \: : \: (Lyr << 1) - idx) \quad \text{[Equation 18]}$$
$$MVD_y = ((idx \leq Lyr) \: ? \: ! \: idx \: : \: (idx == 2 \: ? \: -1 : 0))$$

In Equation 18, the operation (A?B:C) outputs B as an output value when A is true (that is, when A is 1) and outputs C as the output value when A is false (that is, when A is 0). Referring to Equation 18, when idx≤Lyr, MVD_x may be determined as idx, and when idx>Lyr, MVD_x may be determined as (Lyr<<1)−idx. Here, << denotes an operator of left shifting the left value by the right value. When idx≤Lyr, MVD_y may be determined as !idx, and when idx>Lyr, MVD_y may be determined as (idx==2?−1:0).

First, when the layer is larger than 1, MVDs in the horizontal and vertical directions may be determined according to Equation 24 below.

$$MVD_x = (idx \le Lyr?idx:$$ [Equation 19]

$$(idx \le ((Lyr<<1) + Lyr)?(Lyr<<1) - idx:idx - (Lyr<<2))$$

$$MVD_y = ((idx \le (Lyr<<1))? Lyr - idx:idx - ((Lyr<<1) + Lyr))$$

Referring to Equation 19, when idx≤Lyr, MVD_x may be determined as idx, and when idx>Lyr, MVD_x is (idx≤ ((Lyr<<1) Lyr)?(Lyr<<1)–idx:idx–(Lyr<<2). When idx≤ (Lyr<<1), MVD_y may be determined as Lyr–idx, and when idx>(Lyr<<1), MVD_y may be determined as idx– ((Lyr<<1) Lyr).

Likewise, the index within the layer may be determined according to a method as described below. As an embodiment, it may be determined by the encoder according to the following method, or it may be predefined in the encoder and the decoder in the same method.

First, when MVD_x and MVD_y are 0, the layer (or layer ID) may be determined as 0.

If the layer is 1, the index may be determined (or calculated) using Equation 25 below.

$$idx = (MVD_x \ge 0)?(Lyr - MVD_y):(Lyr<<1) - MVD_x)$$ [Equation 20]

Referring to Equation 20, when MVD_x is greater than or equal to 0, the index may be derived as Lyr-MVD_y, otherwise, the index may be derived as (Lyr<<1)–MVD_x.

If the layer is greater than 1, the index may be derived using Equation 26 below.

$$idx = (MVD_x \ge 0)?(Lyr - MVD_y):$$ [Equation 21]

$$((MVD_y \le 0)?((Lyr<<1) - MVD_x):$$

$$(((Lyr<<1) + Lyr) + MVD_y))$$

Referring to Equation 21, when MVD_x is greater than or equal to 0, the index may be derived as Lyr-MVD_y, otherwise, the index may be derived as (MVD_y≤0)? ((Lyr<<1)–MVD_x):((((Lyr<<1) Lyr)+MVD_y).

In one embodiment, Table 4 below illustrates a layer and index table according to a combination of horizontal and vertical components of the MVD. That is, the index value may be allocated according to a combination of the horizontal and vertical components of the MVD as shown in Table 4 below by applying the above-described methods.

TABLE 3

| $MVD_x$ | $MVD_y$ | Layer | Index |
|---|---|---|---|
| 0 | 0 | 0 | — |
| 0 | 1 | 1 | 0 |
| 1 | 0 | 1 | 1 |
| 0 | −1 | 1 | 2 |
| −1 | 0 | 1 | 3 |
| 0 | 2 | 2 | 0 |
| 1 | 1 | 2 | 1 |
| 2 | 0 | 2 | 2 |
| 1 | −1 | 2 | 3 |
| 0 | −2 | 2 | 4 |

TABLE 3-continued

| $MVD_x$ | $MVD_y$ | Layer | Index |
|---|---|---|---|
| −1 | −1 | 2 | 5 |
| −2 | 0 | 2 | 6 |
| −1 | 1 | 2 | 7 |
| ... | ... | ... | ... |

Also, an embodiment of the disclosure proposes another implementation of a MVD coding method in which indexes of combinations of MVD horizontal/vertical components are consecutively arranged.

FIG. 41 illustrates a vector coding method for an affine motion vector difference according to an embodiment of the disclosure.

With reference to FIG. 41, combinations of horizontal/ vertical (x, y) components of MVD belonging to a second layer (i.e., layer 2) are illustrated. As illustrated in FIG. 41, the encoder/decoder may assign consecutive index values of horizontal/vertical component combinations to the second layer for the MVD component. However, FIG. 41 illustrates merely an example, and embodiments of the present disclosure are not limited thereto. In FIG. 41, respective points representing combinations of horizontal/vertical components of MVD denote an increase or a decrease of the horizontal/vertical component by 1. In the present disclosure, for convenience of explanation, the combination of horizontal and vertical components of MVD may also be referred to as a MVD combination.

For example, an index 0 of the second layer denotes a MVD combination of (0, −2), and an index 1 of the second layer denotes MVD value of (1, −1), etc. Due to the symmetry structure, indexes 1 and 7; 6 and 2; 5 and 3 may be defined such that the vertical MVD components are the same and the horizontal MVD components are different.

FIG. 42 illustrates a coding structure of a motion vector difference performed based on vector coding according to an embodiment of the disclosure.

With reference to FIG. 42, the description is given focusing on the decoder for convenience of explanation, but the present disclosure is not limited thereto. The MVD vector coding method according to an embodiment of the disclosure can be substantially equally applied to the encoder.

The decoder parses a syntax element indicating whether a current layer, to which combinations of horizontal and vertical components of MVD used for inter prediction of a current block belong, is greater than 0, in S4201. The syntax element indicating whether the current layer is greater than 0 may be referred to as a layer GRT0 (greater than 0) flag. In an embodiment, the layer GRT0 flag may be context-coded.

The decoder checks a value of the layer GRT0 flag, in S4202. If the layer GRT0 flag is 0 (i.e., false), the combination of horizontal and vertical components of MVD may be determined as (0, 0). If the layer GRT0 flag is 1, the current layer may be a layer that has a minimum value of 1 and has a value greater than 0.

The decoder determines (or derives) the current layer by decoding layer information in S4203. The decoder parses an index indicating the combination of horizontal and vertical components of MVD used for inter prediction of the current block within the current layer in S4204, and the decoder decodes the combination of horizontal and vertical components of MVD in S4205. In an embodiment, the decoder may code the layer information or the indexes using an exponential Golomb code with an exponential Golomb parameter of a pre-defined constant k. For example, the pre-defined constant k may be 1. In an embodiment, in FIG. 42, the horizontal and vertical components of MVD may be determined based on Equation 24 described above.

FIG. 43 illustrates a structure of a decoder device according to an embodiment to which the present disclosure is applied.

A decoder device illustrated in FIG. 43 may be included in the decoding apparatus 200 of FIG. 2 above (or the inter predictor 260 and the motion information derivation unit 262 of FIG. 11).

A layer and index information receiver (or a component for reception) 141 may receive layer and index information. In this instance, the methods described in the embodiments 5 to 7 may be applied.

A MVDx (horizontal component of MVD) and MVDy (vertical component of MVD) processing unit (or a component for processing) 142 may decode MVDx and MVDy using the determined layer information and index information. For example, Equations 23 to 26 described above may be used to determine the MVDx and MVDy components.

FIG. 44 illustrates a structure of an encoder device according to an embodiment to which the present disclosure is applied.

An encoder device illustrated in FIG. 44 may be included in the encoding apparatus 100 of FIG. 1 above (or the inter predictor 180 and the motion information derivation unit 182 of FIG. 9).

The encoder device may perform an operation in reverse of the above-described operation of the decoder device.

First, an input receiver 151 receives MVD (x, y) with a sign as an input of entropy coding.

A layer and index information generator (or a component for generation) 152 generates layer information and index information. For example, Equations 23 to 26 described above may be used to determine the layer information and the index information.

Afterwards, an entropy encoding unit (or a component for entropy coding) 153 entropy-codes the determined layer information and index information.

Also, in embodiment of the disclosure proposes another implementation of a MVD coding method based on a layer structure. In the embodiment, an encoder/decoder can efficiently code a MVD by grouping some layers.

FIG. 45 illustrates a coding structure of a motion vector difference performed based on vector coding according to an embodiment of the disclosure.

With reference to FIG. 45, the description is given focusing on the decoder for convenience of explanation, but the present disclosure is not limited thereto. The MVD vector coding method according to an embodiment of the disclosure can be substantially equally applied to the encoder.

The decoder parses a first syntax element indicating whether a current layer, to which combinations of horizontal and vertical components of MVD used for inter prediction of a current block belong, is greater than 0, in S4501. The first syntax element indicating whether the current layer is greater than 0 may be referred to as a layer GRT0 (greater than 0) flag. In an embodiment, the layer GRT0 flag may be context-coded.

The decoder checks a value of the layer GRT0 flag, in S4502. If the layer GRT0 flag is 0 (i.e., false), the combination of horizontal and vertical components of MVD may be determined as (0, 0). If the layer GRT0 flag is 1, the current layer may be a layer that has a minimum value of 1 and has a value greater than 0.

The decoder parses a second syntax element indicating a group, to which the current layer belongs, among layer groups, in S4503. The second syntax element may be referred to as BinVal. The second syntax element may interpret the grouped layers. In an embodiment, layer 1 and layer 2 may be grouped together. Here, the layer 1 represents a first layer among layers other than a layer (i.e., layer 0) to which (0, 0) belongs, and the layer 2 represents a second layer among layers other than the layer (i.e., layer 0) to which (0, 0) belongs. For example, if BinVal is 1, it may indicate that the current layer belongs to layer 3, and if BinVal is 0, it may indicate that the current layer belongs to a group including the layer 1 and the layer 2. Here, the layer 3 represents a third layer among layers other than the layer (i.e., layer 0) to which (0, 0) belongs.

That is, if BinVal is 1, the decoder parses and decodes an index (or syntax element) indicating a combination of horizontal and vertical components of MVD of the current block within the layer 3, in S4505. If BinVal is 0, the decoder parses a third syntax element indicating the current layer among the layer 1 and the layer 2, in S4506. The third syntax element may be referred to as a layer variable. Specific layer information among the layer 1 and the layer 2 may be signalled via the third syntax element. The decoder determines the current layer depending on values of the third syntax element, and parses and decodes an index (or syntax element) indicating a combination of horizontal and vertical components of MVD of the current block within the determined layer, in S4507, S4508 and S4509.

In an embodiment, the decoder may code the indexes using an exponential Golomb code with an exponential Golomb parameter of a pre-defined constant k. For example, the pre-defined constant k may be 1. In an embodiment, in FIG. 45, the horizontal and vertical components of MVD may be determined based on Equation 19 described above.

In an embodiment, the horizontal and vertical components of MVD within the layer 1 may be derived using the following Equation 22.

$$MVD_x = ((idx \leq Lyr)?idx:(Lyr<<1)-idx) \quad \text{[Equation 22]}$$
$$MVD_y = ((idx \leq Lyr)?!idx:(idx == 2\ ?\ -1:0))$$

Referring to Equation 22, if an index value is less than or equal to a value of the current layer, MVD_x (horizontal component of MVD) may be determined as idx, and if not, MVD_x may be determined as value of (Lyr<<1)−idx. Further, if the index value is less than or equal to the value of the current layer, MVD_y (vertical component of MVD) may be determined as idx, and if not, MVD_y may be determined as value of (idx=2 ?−1?0). Here, (A?B:C) operation represents an operator that outputs B when A is true, and outputs C when A is false.

In addition, in an embodiment, the horizontal and vertical components of MVD within the layer 2 may be derived using the following Equation 23.

$$MVD_x = ((idx \leq Lyr)?idx: \quad \text{[Equation 23]}$$
$$(idx \leq ((Lyr<<1)+Lyr?(Lyr<<1)-idx:idx-(Lyr<<2)))$$
$$MVD_y = ((idx \leq Lyr<<1))?Lyr-idx:idx-((Lyr<<1)+Lyr))$$

Referring to Equation 23, idx is a variable representing an index value indicating a current MVD within the current layer, and Lyr is a variable representing a value of the current layer (or index, ID value of the current layer). And, (A?B:C) operation represents an operator that outputs B when A is true, and outputs C when A is false.

The embodiments of the present disclosure described above have been distinguished and described for convenience of explanation, but are not limited thereto. That is, the embodiments described above may be independently implemented, and one or more embodiments may be combined and implemented.

FIG. 46 is a flowchart illustrating a method of processing a video signal based on inter prediction according to an embodiment to which the present disclosure is applied.

Referring to FIG. 46, the description is given focusing on a decoder for convenience of explanation, but the present disclosure is not limited thereto. A method of processing a video signal based on inter prediction according to an embodiment of the present disclosure can be equally performed on an encoder and a decoder.

A decoder derives a motion vector predictor based on motion information of a neighboring block of the current block, in S4601.

The decoder derives a motion vector difference of the current block layer information and index information, in S4602. Here, the layer information may represent a current layer, which the motion vector difference used for inter prediction of the current block belongs to, in a predefined layer structure in which at least one combination of horizontal and vertical components of the motion vector difference is divided into a plurality of layers. And, the index information may represent a specific combination of vertical and horizontal components of the motion vector difference within the current layer.

The decoder derives a motion vector of the current block based on the motion vector predictor and the motion vector difference, in S4603.

The decoder generates a prediction block of the current block based on the motion vector of the current block, in S4604.

The decoder generates a reconstructed block of the current block based on the prediction block and a residual block of the current block, in S4605.

As described above, as an embodiment, the layer information may include at least on syntax element indicating a layer group to which the current layer belongs.

As described above, as an embodiment, the deriving the motion vector difference may further comprise: obtaining a first syntax element representing whether an ID (identification) of the current layer is greater than 0; obtaining a second syntax element indicating whether the current layer belongs to a first layer group when the ID of the current layer is greater than 0; and obtaining a third syntax element indicating whether the ID of the current layer is 1 or 2 when the current layer belongs to the first layer group.

described above, as an embodiment, the ID of the current layer may be determined as 3 when the current layer does not belong to the first layer group.

As described above, as an embodiment, the deriving the motion vector difference may further comprise obtaining a first syntax element indicating whether an identification (ID) of the current layer is greater than 0; and obtaining ID information indicating the ID of the current layer when the ID of the current layer is greater than 0.

As described above, in an embodiment, the layer information may be binarized based on an exponential Golomb code with order 1.

As described above, in an embodiment, the index information may be binarized based on a truncated binarization scheme.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

The decoding apparatus and the encoding apparatus to which the disclosure is applied may be included in a digital device. The term "digital device" includes all digital devices capable of performing at least one of transmission, reception, processing, and output, for example, of data, content, and services. Here, processing of data, content, service, etc. by a digital device includes an operation of encoding and/or decoding data, content, service, and the like. The digital device is paired or connected (hereinafter referred to as 'pairing') with other digital devices, external servers, etc. through a wired/wireless network to transmit and receive data, and converts it if necessary.

The digital device includes, for example, a fixed device (or a standing device) such as a network TV, an HBBTV (Hybrid Broadcast Broadband TV), a smart TV, an IPTV (internet protocol television), a PC, etc. and a mobile device (or a handheld device) such as a PDA (Personal Digital Assistant), a smart phone, a tablet PC, a laptop. In the disclosure described later, for convenience, FIG. 39 shows and describes a digital TV as an embodiment for the digital device and FIG. 40 shows and describes a mobile device as an embodiment of the digital device.

Meanwhile, the term "wired/wireless network" described herein refers to a communication network that supports various communication standards or protocols for interconnection and/or data transmission and reception between digital devices or between digital devices and external servers. These wired/wireless networks may include both current and future supported communication networks and communication protocols for them, and may be formed by a communication standard or protocols for wired connection, such as USB (Universal Serial Bus), CVBS (Composite Video Banking Sync), Component, S-Video (Analog), DVI (Digital Visual Interface), HDMI (High Definition Multimedia Interface), RGB, D-SUB and the like and formed by a communication standards for wireless connection such as Bluetooth, Radio Frequency Identification (RFID), Infrared Data Association (IrDA), Ultra Wideband (UWB), ZigBee, Digital Living Network Alliance (DLNA), Wireless LAN (WLAN) (Wi-Fi)), Wibro (Wireless broadband), Wimax (World Interoperability for Microwave Access), HSDPA (High Speed Down-link Packet Access), LTE (Long Term Evolution), Wi-Fi Direct (Direct), etc.

Hereinafter, in the case of simply referring to a digital device in the disclosure, it may mean a fixed device or a mobile device or include both depending on context.

Meanwhile, the digital device is, for example, an intelligent device that supports a broadcast reception function, a computer function, and at least one external input, and may support e-mail, web browsing, banking, game, and application through the wired/wireless network described above. In addition, the digital device may include an interface for supporting at least one input or control means (hereinafter referred to as an input means) such as a hand-operated input device, a touch screen, and a space remote control. The digital device may use a standardized general-purpose operating system (OS). For example, the digital device may add, delete, modify, and update various applications on a general-purpose OS kernel, and may configure and provide a more user-friendly environment through them.

Meanwhile, the external input described in the disclosure includes external input devices, that is, all input means or digital devices that are wired/wirelessly connected to the above-described digital devices and transmit/receive related data therethrough. Here, the external input may include all devices such as a high-definition multimedia interface (HDMI), a game device such as a play station or an X-Box, a smart phone, a tablet PC, a printer, or a smart TV.

And, the term "server" described in the disclosure includes a client, that is, all digital devices or systems that supply data to the digital devices described above, and is called a processor. Examples of such the server include a portal server that provides a web page or web content, an advertising server that provides advertising data, a content server that provides content, and a social media service (SNS) server, a service server or manufacturing server provided by a manufacturer, etc.

Furthermore, "channel" described herein means a path, means, etc. for transmitting and receiving data, and may be exemplified by a broadcasting channel. Here, the broadcast channel is expressed in terms of a physical channel, a virtual channel, and a logical channel according to the activation of digital broadcasting. The broadcast channel may be called a broadcast network. As described above, the broadcast channel refers to a channel for providing or accessing broadcast content provided by a broadcasting station, and the broadcast content is mainly based on real-time broadcasting and is also called a live channel. However, recently, the medium for broadcasting has become more diversified, and non-real time broadcasting is also activated in addition to real-time broadcasting. It may also be understood as a term meaning the entire channel. So, the live channel may be understood as a term meaning not only real-time broadcasting but also the entire broadcasting channel including non-real-time broadcasting in some cases.

In the disclosure, "arbitrary channel" is further defined in relation to a channel other than the above-described broadcast channel. The arbitrary channel may provide a service guide such as an electronic program guide (EPG) along with a broadcast channel. A service guide, a GUI (Graphic User Interface), or an OSD screen (On-Screen Dis-play screen) may be configured/provided with only the arbitrary channel.

Meanwhile, unlike a broadcast channel having a predetermined channel number between transceivers, the arbitrary channel is a channel randomly allocated in a receiver, and a channel number that is not basically overlapped with channel numbers for expressing the broadcast channels is allocated to the arbitrary channel. For example, when a specific broadcast channel is tuned, the receiver receives a broadcast signal that transmits broadcast content and signaling information therefor through the tuned channel. Here, the receiver parses channel information from the signaling information, and configures a channel browser, an EPG, and the like based on the parsed channel information and provides it to a user. When the user makes a channel change request through the input means, the receiver responds accordingly.

As described above, since the broadcast channel is promised in advance between transmitting and receiving terminals, when the arbitrary channel is allocated to a broadcast channel in an overlapped manner, it may cause confusion to the user or there may be a possibility of confusion, so it is preferable not to allocate duplicates as described above. Meanwhile, even if the arbitrary channel number is not overlapped with the broadcast channel number as described above, there is still a confusion in the channel surfing process of the user, and it is required to allocate the arbitrary channel number in consideration of this. This is because the arbitrary channel according to the disclosure may also be implemented to be accessed in response to a user's request for channel switching through an input means in the same way as a conventional broadcast channel. Accordingly, the arbitrary channel number may be defined and displayed in a form in which characters are written in parallel, such as arbitrary channel-1, arbitrary channel-2, and the like, rather than in a numeric form like a broadcast channel, for the convenience of user access to the arbitrary channel and for convenience in distinguishing or discriminating from the broadcasting channel number. In this case, although the display of an arbitrary channel number may be realized in the form in which characters are written as in arbitrary channel-1, the receiver may recognize and implement the arbitrary channel in a numeric form as the number of the broadcast channel internally. Also, the arbitrary channel number may be provided in the form of a number, such as a broadcast channel, and it is also possible to define and display channel numbers in various ways that can be distinguished from broadcast channels, such as video channel-1, title-1, and video-1.

The digital device executes a web browser for a web service, and provides various types of web pages to the user. Here, the web page includes a web page including a video content, and in the disclosure the video is processed separately or independently from the web page. And, the separated video may be allocated to the arbitrary channel as described above, and provided through a service guide, or the like, and output according to a channel switching request in a process of viewing a service guide or a broadcast channel. Further, for services such as broadcast content, games, and applications in addition to web services, predetermined content, images, audio, items, etc. are separately processed from the broadcast content, games, and applications themselves, and the arbitrary channel number may be assigned for its reproduction, processing, and the like, and may be implemented as described above.

FIG. 47 is a diagram schematically showing an example of a service system including a digital device.

Service systems including digital devices include a content provider CP 4710, a service provider SP 4720, a network provider NP 4730, and a home network end user HNED (Customer) 4740. Here, the HNED 4740 is, for example, a client 4700, that is, a digital device. The content provider 4710 produces and provides various content. As shown in FIG. 47, as such the content provider 4710, a terrestrial broadcaster, a cable SO (System Operator) or an MSO (Multiple SO), a satellite broadcaster, various Internet broadcasters, Private CPs, and the like may be exemplified. Meanwhile, the content provider 4710 provides various applications in addition to broadcast content.

The service provider 4720 provides the content provided by the content provider 4710 as a service package to the HNED 4740 by packaging the content. For example, the service provider 4720 of FIG. 47 packages the first terrestrial broadcast, the second terrestrial broadcast, cable MSO, satellite broadcast, various Internet broadcasts, applications, etc., and provides them to the HNED 4740.

The service provider 4720 provides services to the client 300 in a uni-cast or multi-cast manner. And, the service provider 4720 may transmit data to a plurality of pre-registered clients 4700 at a time, and for this an Internet Group Management Protocol IGMP protocol may be used.

The above-described content provider 4710 and service provider 4720 may be identical or single entities. For example, the content provided by the content provider 4710 may be service packaged and provided to the HNED 4740, so the functions of the service provider 4720 together or vice versa are performed.

The network provider 4730 provides a network for data exchange between the content provider 4710 or/and the service provider 4720 and the client 4700.

The client 4700 may establish a home network to transmit and receive data.

Meanwhile, the content provider 4710 or/and the service provider 4720 in the service system may use conditional access or content protection means to protect transmitted content. In this case, the client 300 may use processing means such as a CableCARD (POD: Point of De-ployment), DCAS (Downloadable CAS), etc. in response to the restriction reception or content protection.

In addition, the client 4700 may also use a bidirectional service through a network (or communication network). In this case, the client 4700 may rather perform the function of the content provider, and the existing service provider 4720 may receive it and transmit it back to another client.

FIG. 48 is a block diagram illustrating a digital device according to an embodiment. Here, FIG. 48, for example, may correspond to a client 4700 of FIG. 47, and refer to the digital device described above.

The digital device 4800 includes a network interface 4801, a TCP/IP manager 4802, a service delivery manager 4803, an SI decoder 4804, a Demultiplexer (demux) 4805, an audio decoder 4806, a video decoder 4807, a display module (display A/V and OSD) 4808, a service control manager 4809, a service discovery manager 4810, SI & metadata database 4811, a metadata manager 4812, a service manager 4813, an UI manager 4814 and the like.

The network interface 4801 receives or transmits IP packets through the network. That is, the network interface 4801 receives services, content, and the like from the service provider 4720 through the network.

TCP/IP manager 4802 get involved in packet transmission between a source and a destination for IP packets received by the digital device 4800 and IP packets transmitted by the digital device 4800. And the TCP/IP manager 4802 classifies the received packets to correspond to an appropriate protocol and outputs the classified packets the service delivery manager 4805, the service discovery manager 4810, the service control manager 4809, the metadata manager 4812, etc. The service delivery manager 4803 is responsible for controlling received service data. For example, the service delivery manager 4803 may use RTP/RTCP when controlling real-time streaming data. When the real-time streaming data is transmitted using RTP, the service delivery manager 4803 parses the received data packet according to the RTP and transmits it to the demultiplexer 4805 or stores it in the SI & metadata database 4811 under the control of the service manager 4813. And, the service delivery manager 4803 uses the RTCP to feed back the network reception information to a server providing a service. The demultiplexer 4805 demultiplexes the received packets into audio, video, and system information SI data, and transmits them to the audio/video decoder 4806/4807 and the SI decoder 4804, respectively.

The SI decoder 4804 decodes service information such as program specific information PSI, program and system information protocol PSIP, and digital video broadcasting-service information DVB-SI.

And, the SI decoder 4804 stores the decoded service information in the SI & metadata database 4811, for example. The service information stored in this way may be read and used by a corresponding configuration, for example, by a user's request.

The audio/video decoder 4806/4807 decodes each audio data and video data demultiplexed by the demultiplexer 4805. Thus decoded audio data and video data are provided to the user through the display module 4808.

The application manager may include, for example, the UI manager 4814 and the service manager 4813. The application manager manages the overall state of the digital device 4800, provides a user interface, and manages other managers.

The UI manager 4814 provides a graphical user interface GUI for a user using an on-screen display OSD or the like, and receives key input from a user to perform device operation according to the input. For example, when the UI manager 4814 receives a key input regarding channel selection from a user, the UI manager 4814 transmits the key input signal to the service manager 4813.

The service manager 4813 controls managers associated with a service, such as the service delivery manager 4803, the service discovery manager 4810, the service control manager 4809, and the metadata manager 4812.

And, the service manager 4813 creates a channel map and selects a channel using the channel map according to a key input received from the user interface manager 4814. And, the service manager 4813 receives the channel service information from the SI decoder 4804 and sets the audio/video packet identifier PID of the selected channel to the demultiplexer 4805. The PID set in this way is used in the demultiplexing process described above. Therefore, the demultiplexer 4805 filters the audio data, video data, and SI data using the PID.

The service discovery manager 4810 provides information necessary to select a service provider providing a service. When a signal regarding channel selection is received from the service manager 4813, the service discovery manager 4810 finds a service using the information.

The service control manager 4809 is responsible for selecting and controlling services. For example, the service control manager 4809 uses IGMP or RTSP or the like when the user selects a live broadcasting service such as a conventional broadcasting method, and uses RTSP to select and control the service when selecting a service such as VOD (video on demand). The RTSP protocol may provide a trick mode for real-time streaming. And, the service control manager 4809 may initialize and manage a session through the IMS gateway 4850 using an IP multimedia subsystem IMS and a session initiation protocol SIP. The protocol is one embodiment, and other protocols may be used according to implementation examples.

The metadata manager 4812 manages metadata associated with a service and stores the metadata in the SI & metadata database 4811.

The SI & metadata database 4811 stores service information decoded by the SI decoder 4804, metadata managed by the metadata manager 4812, and information necessary to select a service provider provided by the service discovery manager 4810. And, the SI & metadata database 4811 may store set-up data and the like for the system.

The SI & metadata database 4811 may be implemented using a non-volatile RAM NVRAM, a flash memory, or the like.

Meanwhile, the IMS gateway 4850 is a gateway that collects functions necessary for accessing an IMS-based IPTV service.

FIG. 49 is a configuration block diagram illustrating another embodiment of a digital device. In particular, FIG. 49 illustrates a block diagram of a mobile device as another embodiment of a digital device.

Referring to FIG. 49, the mobile device 4900 may include a wireless communication unit 4910, an audio/video A/V input unit 4920, a user input unit 4930, a sensing unit 4940, an output unit 4950, a memory 4960, an interface unit 4970, a control unit 4980 and a power supply unit 4990. The components shown in FIG. 49 are not essential, so a mobile device with more or fewer components may be implemented.

The wireless communication unit 4910 may include one or more modules that enable wireless communication between the mobile device 4900 and the wireless communication system or between the mobile device and the network where the mobile device is located. For example, the wireless communication unit 4910 may include a broadcast receiving module 4911, a mobile communication module 4912, a wireless Internet module 4913, a short-range communication module 4914, and a location information module 4915.

The broadcast receiving module 4911 receives a broadcast signal and/or broadcast-related information from an external broadcast management server through a broadcast channel. Here, the broadcast channel may include a satellite channel and a terrestrial channel. The broadcast management server may mean a server that generates and transmits broadcast signals and/or broadcast-related information or a server that receives previously generated broadcast signals and/or broadcast-related information and transmits them to a terminal. The broadcast signal may include a TV broadcast signal, a radio broadcast signal, and a data broadcast signal, and may also include a combined signal in which the data broadcast signal is combined with the TV broadcast signal or the radio broadcast signal.

The broadcast related information may mean information related to a broadcast channel, broadcast program, or broadcast service provider. Broadcast-related information may also be provided through a mobile communication network. In this case, it may be received by the mobile communication module 4912.

Broadcast-related information may exist in various forms, for example, an electronic program guide EPG or an electronic service guide ESG.

The broadcast receiving module 4911 may receive a digital broadcast signal using a digital broadcast system such as, for example, ATSC, digital video broadcasting-terrestrial DVB-T, satellite DVB-S, media forward link only Media-FLO, handheld DVB-H, integrated services digital broadcast-terrestrial ISDB-T and the like. Of course, the broadcast receiving module 4911 may be configured to be suitable for other broadcasting systems as well as the digital broadcasting system described above.

The broadcast signal and/or broadcast-related information received through the broadcast receiving module 4911 may be stored in the memory 4960.

The mobile communication module 4912 transmits and receives a radio signal to and from at least one of a base station, an external terminal, and a server on a mobile communication network. The wireless signal may include various types of data according to transmission and reception of a voice signal, a video call signal, or a text/multimedia message.

The wireless Internet module 4913 includes a module for wireless Internet access, and may be built in or external to the mobile device 4900. As wireless Internet technology, wireless LAN (WLAN) (Wi-Fi), wireless broadband Wibro, world interoperability for microwave access Wimax, and high speed downlink packet access HSDPA may be used.

The short-range communication module 4914 refers to a module for short-range communication. Short-range communication Bluetooth, RFID (radio frequency Identification), infrared communication (IrDA, infrared data association), UWB (ultra wideband), ZigBee, RS-232, RS-485, etc. may be used.

The location information module 4915 is a module for obtaining location information of the mobile device 4900, and may use a global positioning system GPS module as an example.

The A/V input unit 4920 is for audio or/and video signal input, and may include a camera 4921, a microphone 4922, and the like. The camera 4921 processes image frames such as still images or moving pictures obtained by an image sensor in a video call mode or a shooting mode. The processed image frame may be displayed on a display unit 4951.

The image frames processed by the camera 4921 may be stored in the memory 4960 or transmitted to the outside through the wireless communication unit 4910. Two or more cameras 4921 may be provided depending on the use environment.

The microphone 4922 receives an external sound signal by a microphone in a call mode or a recording mode, a voice recognition mode, etc., and processes it as electrical voice data. The processed voice data may be converted and output in a form that can be transmitted to the mobile communication base station through the mobile communication module 4912 in the call mode. The microphone 4922 may be implemented with various noise reduction algorithms for removing noise generated in the process of receiving an external sound signal.

The user input unit 4930 generates input data for the user to control the operation of the terminal. The user input unit 4930 may be configured by a key pad, a dome switch, a touch pad (pressure type/capacitive type), a jog wheel, a jog switch, or the like.

The sensing unit 4940 displays the current state of the mobile device 4900, such as the open/closed state of the mobile device 4900, the location of the mobile device 4900, the presence or absence of user contact, the orientation of the mobile device, and acceleration/deceleration of the mobile device. It senses and generates a sensing signal for controlling the operation of the mobile device 4900. For example, when the mobile device 4900 is moved or tilted, the position or tilt of the mobile device may be sensed. And, whether power is supplied to the power supply unit 4990 or whether external devices are coupled to the interface unit 4970 may be sensed. Meanwhile, the sensing unit 4940 may include a proximity sensor 4941 including near field communication NFC.

The output unit 4950 is for generating output related to vision, hearing, or tactile sense, and may include a display unit 4951, an audio output module 4952, an alarm unit 4953, and a haptic module 4954.

The display unit 4951 displays or outputs information processed by the mobile device 4900. For example, when the mobile device is in a call mode, a user interface UI or a graphic user interface GUI related to the call is displayed. When the mobile device 4900 is in a video call mode or a shooting mode, the photographed and/or received video, UI or GUI is displayed.

The display portion 4951 may include a liquid crystal display LCD, a thin film transistor-liquid crystal display TFT LCD, an organic light-emitting diode OLED, and a flexible display, and a 3D display.

Some of these displays may be of a transparent type or a light transmissive type so that the outside can be seen through them. This may be called a transparent display, and a typical example of the transparent display is a transparent OLED TOLED. The rear structure of the display unit 4951 may also be configured as a light transmissive structure. With this structure, the user can view objects located behind the terminal body through the area occupied by the display unit 4951 of the terminal body.

Two or more display units 4951 may be present depending on the implementation form of the mobile device 4900. For example, a plurality of display units may be spaced apart from one surface or integrally disposed in the mobile device 4900, or may be respectively disposed on different surfaces.

When the display unit 4951 and a sensor detecting a touch operation (hereinafter referred to as a 'touch sensor') form a mutual layer structure (hereinafter referred to as a 'touch screen'), the display unit 4951 may be used as an input device in addition to an output device. The touch sensor may have a form of, for example, a touch film, a touch sheet, or a touch pad.

The touch sensor may be configured to convert a change in pressure applied to a specific portion of the display unit 4941 or capacitance generated in a specific portion of the display unit 4951 into an electrical input signal. The touch sensor may be configured to detect not only the touched position and area, but also the pressure at the time of touch.

If there is a touch input to the touch sensor, the corresponding signals are sent to the touch controller. The touch controller processes the signals and then transmits corresponding data to the controller 4980. Accordingly, the control unit 4980 may know which area of the display unit 4951 has been touched, and the like.

The proximity sensor 4941 may be disposed in an inner area of the mobile device surrounded by the touch screen or near the touch screen. The proximity sensor refers to a sensor that detects the presence or absence of an object approaching a predetermined detection surface or an object in the vicinity using mechanical force or infrared light without mechanical contact. The proximity sensors have a longer lifespan and higher utilization than contact sensors.

Examples of the proximity sensor include a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, and an infrared proximity sensor. When the touch screen is capacitive, it is configured to detect the proximity of the pointer due to a change in electric field according to the proximity of the pointer. In this case, the touch screen (touch sensor) may be classified as a proximity sensor.

Hereinafter, for convenience of description, the act of causing the pointer to be recognized as being positioned on the touch screen without being touched by the pointer on the touch screen is referred to as a "proximity touch", and the act of actually touching the pointer on the touch screen is referred to as "contact touch". The location on the touch screen that is a proximity touch with a pointer means a location where the pointer corresponds vertically to the touch screen when the pointer is touched close.

The proximity sensor detects a proximity touch and a proximity touch pattern (eg, proximity touch distance, proximity touch direction, proximity touch speed, proximity touch time, proximity touch position, proximity touch movement state, etc.). Information corresponding to the sensed proximity touch operation and the proximity touch pattern may be output on the touch screen.

The audio output module 4952 may output audio data received from the wireless communication unit 4910 in a call signal reception, call mode or recording mode, voice recognition mode, broadcast reception mode, or the like or audio data stored in the memory 4960. The audio output module 4952 may also output audio signals related to functions (for example, call signal reception sound, message reception sound, etc.) performed in the mobile device 4900. The audio output module 4952 may include a receiver, a speaker, and a buzzer.

The alarm module 4953 outputs a signal for notifying the occurrence of the event of the mobile device 4900. Examples of events generated in the mobile device include call signal reception, message reception, key signal input, and touch input. The alarm unit 4953 may output a signal for notifying the occurrence of an event by other forms, for example, vibration, in addition to a video signal or an audio signal.

The video signal or the audio signal may also be output through the display unit 4951 or the audio output module 4952, so that the display unit and the audio output modules 4951 and 4952 may be classified as part of the alarm module 4953.

The haptic module 4954 generates various tactile effects that the user can feel. Vibration is a typical example of the tactile effect generated by the haptic module 4954. The intensity and pattern of vibration generated by the haptic module 4954 are controllable. For example, different vibrations may be synthesized and output or sequentially output.

In addition to vibration, the haptic module 4954 may generate various tactile effects including the effects of stimulation such as a pin arrangement that vertically moves with respect to the contact surface of the skin, the ejection force or inhalation force of the air through the ejection or intake, grazing on a skin surface, contact with the electrode, electrostatic force and the like, and the effect by reproducing a feeling of cold and warm using an element capable of absorbing heat or generating heat.

The haptic module 4954 may not only deliver the tactile effect through direct contact, but also implement it so that the user can feel the tactile effect through muscle sensations such as fingers or arms. Two or more haptic modules 4954 may be provided according to a configuration aspect of the mobile device 4900.

The memory 4960 may store a program for the operation of the control unit 4980, and may temporarily store input/output data (eg, a phone book, message, still image, video, etc.). The memory 4960 may store data related to various patterns of vibration and sound output when a touch is input on the touch screen.

The memory 4960 may include a storage medium of at least one of a flash memory type, a hard disk type, a multimedia card micro type, a card type memory (for example, SD or XD memory, etc.), a random access memory RAM, a static random access memory SRAM, a read-only memory ROM, an electrically erasable programmable read-only memory EEPROM, a programmable read-only memory PROM, a magnetic memory, an optical disk. The mobile device 4900 may operate in connection with a web storage that performs a storage function of the memory 4960 on the Internet.

The interface unit 4970 serves as a passage with all external devices connected to the mobile device 4900. The interface unit 4970 receives data from an external device, receives power, and transmits data to each component inside the mobile device 4900, or allows data inside the mobile device 4900 to be transmitted to the external device. For example, a wired/wireless headset port, an external charger port, a wired/wireless data port, a memory card port, a port for connecting devices equipped with an identification module, an audio input/output port, a video I/O port, an earphone port, and the like may be included in the interface unit 4970.

The identification module is a chip that stores various information for authenticating the usage rights of the mobile device 4900, and may include a user identification module UIM, a subscriber identity module SIM, a universal subscriber identity module USIM, and the like. The device equipped with the identification module (hereinafter referred to as 'identification device') may be manufactured in a smart card format. Therefore, the identification device may be connected to the terminal 4900 through the port.

When the mobile terminal 4900 is connected to an external cradle, the interface unit 4970 may become a passage through which power from the cradle is supplied to the mobile terminal 4900, or a passage though which various command signals input from the cradle by the user. Various command signals or power input from the cradle may be operated as a signal for recognizing that the mobile terminal is correctly mounted on the cradle.

The control unit 4980 typically controls the overall operation of the mobile device. For example, it performs control and processing related to voice calls, data communication, video calls, and the like. The control unit 4980 may include a multimedia module 4981 for multimedia playback. The multimedia module 4981 may be implemented in the control unit 4980, or may be implemented separately from the control unit 4980. The control unit 4980, in particular the multimedia module 4981, may include the encoding device 100 and/or the decoding device 200 described above.

The control unit 4980 may perform a pattern recognition process capable of recognizing handwriting input or picture drawing input performed on a touch screen as characters and images, respectively.

The power supply unit 4990 receives external power and internal power under control of the control unit 4980 and supplies power required for the operation of each component.

The various embodiments described herein may be implemented in a computer or similar device-readable recording medium using, for example, software, hardware, or a combination thereof.

According to the hardware implementation, embodiments described herein i may be implemented using at least one of application specific integrated circuits ASICs, digital signal processors DSPs, digital signal processing devices DSPDs, programmable logic devices PLDs, field programmable gate arrays FPGAs, processors, controllers, microcontrollers, microprocessors, and electrical units for performing functions. In some cases, the embodiments described herein may be implemented by the control unit 4980 itself.

According to the software implementation, embodiments such as procedures and functions described herein may be implemented as separate software modules. Each of the software modules may perform one or more functions and operations described herein. Software code may be implemented in a software application written in an appropriate programming language. Here, the software code is stored in the memory 4960 and may be executed by the control unit 4980.

FIG. 50 is a block diagram illustrating a digital device according to another embodiment.

Another example of the digital device 5000 may include a broadcast receiving unit 5005, an external device interface unit 5056, a storage unit 5040, a user input interface unit 5050, a control unit 5070, a display unit 5080, audio output unit 5085, a power supply unit 5090 and a photographing unit (not shown). Here, the broadcast receiving unit 5005 may include at least one tuner 5010, a demodulation unit 5020, and a network interface unit 5030. However, depending on the case, the broadcast receiving unit 5005 may include a tuner 5010 and a demodulator 5020, but may not include the network interface unit 5030, and vice versa. Also, although not shown, the broadcast receiving unit 5005 may be equipped with a multiplexer to multiplex the signal tuned by the tuner 5010 and then demodulated by the demodulation unit 5020 and the signal received through the network interface unit 5030. Also, although not shown, the broadcast receiving unit 5005 may be equipped with a demultiplexer to demultiplexed the multiplexed signal, the demodulated signal or the signal that has passed through the network interface unit 5030.

The tuner 5010 receives an RF broadcast signal by tuning a channel selected by a user or all pre-stored channels among radio frequency RF broadcast signals received through an antenna. And, the tuner 5010 converts the received RF broadcast signal into an intermediate frequency IF signal or a baseband signal.

For example, if the received RF broadcast signal is a digital broadcast signal, it is converted into a digital IF signal DIF, and if it is an analog broadcast signal, it is converted into an analog baseband video or audio signal CVBS/SIF. That is, the tuner 5010 may process both digital broadcast signals or analog broadcast signals. The analog baseband video or audio signal CVBS/SIF output from the tuner 5010 may be directly input to the controller 5070.

The tuner 5010 may receive a single carrier RF broadcast signal according to an advanced television system committee ATSC scheme or a RF broadcast signal with multiple carriers according to a digital video broadcasting DVB scheme.

Meanwhile, the tuner 5010 may sequentially tune and receive RF broadcast signals of all broadcast channels stored through a channel storage function among RF broadcast signals received through an antenna, and convert them into an intermediate frequency signal or a baseband signal.

The demodulation unit 5020 receives and demodulates the digital IF signal DIF converted by the tuner 5010. For example, when the digital IF signal output from the tuner 5010 is an ATSC system, the demodulation unit 5020 performs 8-vestigal side band 8-VSB demodulation, for example. Also, the demodulation unit 5020 may perform channel decoding. To this end, the demodulation unit 5020 may include a trellis decoder, a deinterleaver, a Reed-Solomon decoder, and the like, and perform trellis decoding, deinterleaving, and Reed Soloman decoding.

For example, when the digital IF signal output from the tuner 5010 is a DVB method, the demodulation unit 5020 performs coded orthogonal frequency division modulation COFDMA demodulation, for example. Further, the demodulation unit 5020 may perform channel decoding. To this end, the demodulation unit 5020 may include a convolution decoder, a deinterleaver, and a lead-soloman decoder, and perform convolution decoding, deinterleaving, and read soloman decoding.

The demodulation unit 5020 may output a stream signal TS after demodulation and channel decoding. In this case, the stream signal may be a signal in which a video signal, an audio signal or data are multiplexed. For example, the stream signal may be an MPEG-2 transport stream TS in which an MPEG-2 standard video signal, a Dolby AC-3 standard audio signal, and the like are multiplexed. Specifically, the MPEG-2 TS may include a header of 4 bytes and a payload of 184 bytes.

Meanwhile, it is possible for the above-described demodulation unit 5020 to be provided separately according to the ATSC method and the DVB method. That is, the digital device may separately include an ATSC demodulator and a DVB demodulator.

The stream signal output from the demodulator 5020 may be input to the controller 5070. The control unit 5070 may control demultiplexing, video/audio signal processing, and the like, and control an image output through the display unit 5080 and an audio output through the audio output unit 5085.

The external device interface unit 5056 provides an environment in which various external devices are interfaced to the digital device 5000. To this end, the external device interface unit 5035 may include an A/V input/output unit (not shown) or a wireless communication unit (not shown).

The external device interface 5056 may be connected in a wired/wirelessly manner to external devices such as a digital versatile disk (DVD), a blu-ray, game devices, cameras, camcorders, computers (laptops, tablets), smartphones, Bluetooth devices, and cloud. The external device interface unit 5056 transmits a video, audio, or data (including image) signal input from the outside through the connected external device to the controller 5070 of the digital device. The control unit 5070 may control the processed image, audio, or data signal to be output to the connected external device. To this end, the external device interface unit 5056 may further include an A/V input/output unit (not shown) or a wireless communication unit (not shown).

The A/V input/output unit may include a USB terminal, a composite video banking sync CVBS terminal, a component terminal, an S-video terminal (analog), and a DVI (digital visual interface) terminal, an HDMI (high definition multime-dia interface) terminal, an RGB terminal, a D-SUB terminal and the like, to input video and audio signals of an external device to the digital device 5000.

The wireless communication unit may perform short-range wireless communication with other electronic devices. The digital device 5000 may be networked with other electronic devices according to a communication protocol, for example, Bluetooth, radio frequency identification RFID, infrared data association IrDA, ultra wideband UWB, ZigBee, digital living network alliance DLNA, etc.

And, the external device interface unit 5056 may be connected to at least one of various set-top boxes and various terminals described above, and perform input/output operations with the set-top box.

Meanwhile, the external device interface unit 5056 may receive an application or a list of applications in an adjacent external device and transmit it to the control unit 5070 or the storage unit 5040.

The network interface unit 5030 provides an interface for connecting the digital device 5000 with a wired/wireless network including an Internet network. The network interface unit 5030 may include, for example, an Ethernet terminal or the like for connection with a wired network, and use communication standards such as, for example, a wireless LAN (WLAN) (Wi-FI), wireless broadband (Wibro), world interoperability for microwave access (Wimax), and high speed downlink packet access (HSDPA) for connection with a wireless network.

The network interface unit 5030 may transmit or receive data with other users or other digital devices through a connected network or another network linked to the connected network. In particular, some content data stored in the digital device 5000 may be transmitted to another user registered in advance in the digital device 5000 or to a selected user or selected digital device among other digital devices.

Meanwhile, the network interface unit 5030 may access a predetermined web page through a connected network or another network linked to the connected network. That is, it is possible to connect to a predetermined web page through a network and transmit or receive data with the corresponding server. In addition, content or data provided by a content provider or a network operator may be received. That is, it is possible to receive content such as a movie, advertisement, game, VOD, broadcast signal, and related information provided by a content provider or a network provider through a network. Further, it is possible to receive update information and update files of firmware provided by a network operator. The network interface unit 5030 may also send data to the Internet or a content provider or network operator.

Also, the network interface unit 5030 may select and receive a desired application from among applications that are open to the public through a network.

The storage unit 5040 may store a program for processing and controlling each signal in the controller 5070, or may store a signal-processed image, audio, or data signal.

Also, the storage unit 5040 may perform a function for temporarily storing an image, audio, or data signal input from the external device interface unit 5035 or the network interface unit 5030. The storage unit 5040 may store information related to a predetermined broadcast channel through a channel memory function.

The storage unit 5040 may store an application or application list input from the external device interface unit 5035 or the network interface unit 5030.

Also, the storage unit 5040 may store various platforms described later.

The storage unit 5040 may include at least one storage medium among, for example, flash memory type, hard disk type, multimedia card micro type, and a card type memory (for example, SD or XD memory, etc.), RAM and ROM (EEPROM, etc.). The digital device 5000 may play and provide content files (video files, still image files, music files, document files, application files, etc.) stored in the storage unit 5040 to the user.

FIG. 50 illustrates an embodiment in which the storage unit 5040 is provided separately from the control unit 5070, but the scope of the disclosure is not limited thereto. That is, the storage unit 5040 may be included in the control unit 5070.

The user input interface unit 5050 transmits a signal input by the user to the control unit 5070 or a signal from the control unit 5070 to the user.

For example, the user input interface unit 5050 may receive a control signal related to controls power on/off, channel selection, and screen setting from the remote control device 5100 according to various communication methods such as an RF communication method and an infrared IR communication method and process it. Or the user input interface unit 5050 may process a control signal from the control unit 5070 to be transmitted to the remote control device 5100.

And, the user input interface unit 5050 may transmit a control signal input from a local key (not shown) such as a power key, a channel key, a volume key, and a value-setting key to the controller 5070.

The user input interface unit 5050 may transmit a control signal input from a sensing unit (not shown) that senses a user's gesture to the control unit 5070, or transmit a signal from the control unit 5070 to a sensing unit (not shown). Here, the sensing unit (not shown) may include a touch sensor, a voice sensor, a position sensor, and a motion sensor.

The controller 5070 may de-multiplex the stream input through the tuner 5010, the demodulator 5020, or the external device interface 5056 or processes the demultiplexed signals to generate and out a signal for video or audio output. The control unit 5070 may include the above-described encoding apparatus and/or decoding apparatus.

The image signal processed by the controller 5070 may be input to the display unit 5080 and displayed as an image corresponding to the image signal. Also, the image signal processed by the control unit 5070 may be input to an external output device through the external device interface unit 5056.

The audio signal processed by the control unit 5070 may be audio output to the audio output unit 5085. Also, the audio signal processed by the controller 5070 may be input to the external output device through the external device interface 5056.

Although not illustrated in FIG. 50, the control unit 5070 may include a demultiplexer, an image processor, and the like.

The control unit 5070 may control the overall operation of the digital device 5000. For example, the control unit 5070 may control the tuner 5010 to tune an RF broadcast corresponding to a channel selected by a user or a pre-stored channel.

The control unit 5070 may control the digital device 5000 by a user command input through the user input interface unit 5050 or an internal program. In particular, it is possible to access a network and download a desired application or application list into the digital device 5000.

For example, the control unit 5070 controls the tuner 5010 in order for a signal of a channel selected according to a predetermined channel selection command received through the user input interface unit 5050 to be input, and process video, audio, or data signals of the selected channel. The control unit 5070 allows the channel information, etc. selected by the user to be output through the display unit 5080 or the audio output unit 5085 along with the processed image or audio signal.

As another example, according to an external device image playback command received through the user input interface unit 5050, the control unit 5070 may allow a video signal or an audio signal input through the external device interface unit 5035 from an external device (for example, a camera or camcorder) to be output through the display unit 5080 or the audio output unit 5085.

Meanwhile, the control unit 5070 may control the display unit 5080 to display an image. For example, the control unit 5070 may control the display unit 5080 to display a broadcast image input through the tuner 5010, an external input image input through the external device interface unit 5056, an image input through the network interface unit, or an image stored in the storage unit 5040. At this time, the image displayed on the display unit 5080 may be a still image or a video, and may be a 2D video or a 3D video.

Also, the control unit 5070 may control to play content. At this time, the content may be content stored in the digital device 5000, or received broadcast content, or external input content input from the outside. The content may be at least one of a broadcast image, an external input image, an audio file, a still image, a connected web screen, and a document file.

When entering an application view item, the control unit 5070 may control to display a list of applications or applications that is located within the digital device 5000 or that can be downloaded from an external network.

The control unit 5070 may control to install and operate an application downloaded from an external network along with various user interfaces. And, the control unit 5070 may control an image related to an application to be executed to be displayed on the display unit 5080 by a user's selection.

Although not shown in the drawing, it is also possible to be further equipped with a channel browsing processing unit for generating a thumbnail image corresponding to a channel signal or an external input signal.

The channel browsing processing unit may receives a stream signal TS output from the demodulation unit 5020 or a stream signal output from the external device interface unit 5056, extract an image from the input stream signal, and generate a thumbnail image.

The generated thumbnail image may be input to the control unit 5070 as it is or as encoded. Also, the generated thumbnail image may be encoded in a stream form and input to the control unit 5070. The control unit 5070 may display a thumbnail list including a plurality of thumbnail images on the display unit 5080 using the input thumbnail images. The thumbnail images in this thumbnail list may be updated sequentially or simultaneously. Accordingly, the user can easily grasp the contents of a plurality of broadcast channels.

The display unit 5080 converts image signals, data signals, OSD signals and the like processed by the controller 5070 or image signals and data signals received from the external device interface unit 5056 into R, G, and B signals, respectively and generates a drive signal.

The display unit 5080 may be a PDP, LCD, OLED, flexible display, 3D display, or the like.

The display unit 5080 may be configured as a touch screen and used as an input device in addition to an output device.

The audio output unit 5085 receives a signal processed by the controller 5070, for example, a stereo signal, a 3.1 channel signal, or a 5.1 channel signal, and outputs it as audio. The audio output unit 5085 may be implemented as various types of speakers.

Meanwhile, in order to sense a user's gesture, as described above, a sensing unit (not shown) having at least one of a touch sensor, a voice sensor, a position sensor, and a motion sensor may be further provided in the digital device 5000. The signal detected by the sensing unit (not shown) may be transmitted to the control unit 5070 through the user input interface unit 5050.

A photographing unit (not shown) for photographing a user may be further provided. Image information photographed by the photographing unit (not shown) may be input to the control unit 5070.

The control unit 5070 may detect a user's gesture by individually or in combination with an image captured by the photographing unit (not shown) or a signal sensed by the sensing unit (not shown).

The power supply unit 5090 supplies power throughout the digital device 5000.

In particular, the power supply 5090 may supply power to the control unit 5070 that can be implemented in the form of a system on chip SOC, the display unit 5080 for image display, and the audio output unit 5085 for audio output.

To this end, the power supply unit 5090 may include a converter (not shown) that converts AC power into DC power. For example, when the display unit 5080 is implemented as a liquid crystal panel having a plurality of backlight lamps, a PWM-operable inverter (not shown) may be further provided for luminance change or dimming driving.

The remote control device 5100 transmits a user input to the user input interface unit 5050. To this end, the remote control device 5100 may use Bluetooth, RF (radio frequency) communication, infrared IR communication, UWB (Ultra Wideband), ZigBee (ZigBee) method, etc.

In addition, the remote control device 5100 may receive an image, audio, or data signal output from the user input interface unit 5050, display it on the remote control device 5100, or output voice or vibration.

The digital device 5000 described above may be a digital broadcast receiver capable of processing a fixed or mobile ATSC type or DVB type digital broadcast signal.

Furthermore, the digital device according to the disclosure may omit some components or further include components not illustrated, as required. As described above, the digital device may not have a tuner and a demodulator, and may also receive and play content through a network interface unit or an external device interface unit.

FIG. 51 is a block diagram illustrating a detailed configuration of the control unit of FIGS. 48 to 50.

An example of the control unit may include a demultiplexing unit 5110, an image processing unit 5120, an on-screen display OSD generating unit 5140, a mixer 5150, a frame rate converter FRC 5155, and a formatter 5160. In addition, although not illustrated, the control unit may further include a voice processing unit and a data processing unit.

The demultiplexing unit 5110 demultiplexes an input stream. For example, the demultiplexing unit 5110 may demultiplex input MPEG-2 TS into video, audio, and data signals. Here, the stream signal input to the demultiplexing unit 5110 may be a stream signal output from a tuner or demodulator or an external device interface.

The image processing unit 5120 performs image processing of the demultiplexed image signal. To this end, the image processing unit 5120 may include a video decoder 5125 and a scaler 5135.

The video decoder 5125 decodes the demultiplexed video signal, and the scaler 5135 scales the resolution of the decoded video signal to be output on the display unit.

The video decoder 5125 may support various standards. For example, the video decoder 5125 performs the function of the MPEG-2 decoder when the video signal is encoded in the MPEG-2 standard, and the function of the H.264 decoder when the video signal is encoded in the digital multimedia broadcasting DMB method or the H.264 standard.

The video signal decoded by the video processing unit 5120 is input to the mixer 5150.

The OSD generating unit 5140 generates OSD data according to a user input or by itself. For example, the OSD generating unit 5140 generates data for displaying various data on a screen of the display unit 5080 in a graphic or text form based on a control signal of the user input interface unit. The generated OSD data includes various data such as a user interface screen of a digital device, various menu screens, widgets, icons, and viewing rate information.

The OSD generating unit 5140 may generate data for displaying subtitles of broadcast images or broadcast information based on EPG.

The mixer 5150 mixes the OSD data generated by the OSD generating unit 5140 and the image signal processed by the video processing unit and provide it the formatter 5160. Because the decoded video signal and the OSD data are mixed, the OSD is displayed overlaid on a broadcast video or an external input video.

The frame rate converter FRC 5155 converts a frame rate of an input video. For example, the frame rate converter 5155 may convert the input 60 Hz image frame rate to have a frame rate of, for example, 120 Hz or 240 Hz, depending on the output frequency of the display unit. As described above, various methods may exist in the method for converting the frame rate. For example, when the frame rate converter 5155 converts the frame rate from 60 Hz to 120 Hz, the same first frame is inserted between the first frame and the second frame, or a third frame predicted from the first frame and the second frame is inserted between the first frame and the second frame. As another example, when the frame rate converter 5155 converts the frame rate from 60 Hz to 240 Hz, three identical frames or predicted frames may be inserted between existing frames. If a separate frame conversion is not performed, the frame rate conversion unit 5155 may be bypassed.

The formatter 5160 changes the output of the frame rate converter 5155 to match the output format of the display unit. For example, the formatter 5160 may output R, G, and B data signals, and these R, G, and B data signals may be output as low voltage differential signaling LVDS or mini-LVDS. Also, when the output of the frame rate converter 5155 is a 3D video signal, the formatter 5160 may support 3D service through the display unit by configuring the output as a 3D format according to the output format of the display unit.

An audio processing unit (not shown) in the control unit may perform audio processing of the demultiplexed audio signal. The audio processing unit (not shown) may support various audio formats. For example, even when an audio signal is encoded in formats such as MPEG-2, MPEG-4, AAC, HE-AAC, AC-3, BSAC, the audio processing unit may be provided with a decoder corresponding thereto.

Also, the audio processing unit (not shown) in the control unit may process a base, treble, volume control, and the like.

A data processing unit (not shown) in the control unit may perform data processing of a demultiplexed data signal. For example, the data processing unit may decode the demultiplexed data signal even when it is encoded. Here, the encoded data signal may be EPG information including broadcast information such as start time and end time of a broadcast program broadcast on each channel.

Meanwhile, the above-described digital device is an example according to the disclosure, and each component may be integrated, added, or omitted depending on the specification of the actual digital device. That is, if necessary, two or more components may be combined into one component, or one component may be subdivided into two or more components. Also, a function performed in each block is for describing an embodiment of the disclosure, and the specific operation or device does not limit the scope of the disclosure.

The digital device may be an image signal processing device that performs signal processing of an image stored in the device or an input image. As another example of the image signal processing apparatus, a set-top box STB, a DVD player, a Blu-ray player, a game device, a computer and the like may be further exemplified from which the display unit 5080 and the audio output unit 5085 shown in FIG. 50 are excluded.

FIG. 52 is a diagram illustrating an example in which a screen of a digital device displays a main image and a sub image simultaneously, according to an embodiment.

The digital device according to an embodiment may simultaneously display a main image 5210 and an auxiliary image or sub image 5220 on the screen 5200. The main image 5210 may be referred to as a first image, and the auxiliary image 5220 may be referred to as a second image. The main image 5210 and the auxiliary image 5220 may include a video, a still image, an electronic program guide EPG, a graphical user in-terface GUI, an on-screen display OSD, and the like and are not limited thereto. The main image 5210 may mean an image that is relatively smaller in size than the screen 5200 of the electronic device while being simultaneously displayed on the screen 5200 of the electronic device along with the auxiliary image 5220, and may be referred to as a picture in picture PIP. In FIG. 52, the main image 5210 is displayed on the upper left of the screen 5200 of the digital device, but the location where the main image 5210 is displayed is not limited to this, and the main image 5210 may be displayed at any location within the screen 5200 of the digital device.

The main image 5210 and the auxiliary image 5220 may be related to each other directly or indirectly. As an example, the main image 5210 may be a streaming video, and the auxiliary image 5220 may be a GUI that sequentially displays thumbnails of videos including information similar to the streaming video. As another example, the main image 5210 may be a broadcast image, and the auxiliary image 5220 may be an EPG. As another example, the main image 5210 may be a broadcast image, and the auxiliary image 5220 may be a GUI. Examples of the main image 5210 and the auxiliary image 5220 are not limited thereto.

In one embodiment, the main image 5210 is a broadcast image received through a broadcasting channel, and the auxiliary image 5220 may be information related to a broadcast image received through a broadcast channel. Information related to a broadcast image received through a broadcast channel may include, for example, EPG information including an integrated channel schedule and broadcast program detailed information, and broadcast program review information, but is not limited thereto.

In another embodiment, the main image 5210 is a broadcast image received through a broadcast channel, and the auxiliary image 5220 may be an image generated based on information pre-stored in a digital device. The image generated based on the information pre-stored in the digital device may include, for example, a basic user interface UI of the EPG, basic channel information, an image resolution manipulation UI, and a bedtime reservation UI, and does not limited thereto.

In another embodiment, the main image 5210 is a broadcast image received through a broadcast channel, and the auxiliary image 5220 may be information related to a broadcast image received through a network. The information related to the broadcast image received through the network may be, for example, information obtained through a search engine based on the network. More specifically, for example, information related to a character currently being displayed on the main image 5210 may be obtained through a network-based search engine.

However, the example is not limited to this, and information related to a broadcast image received through a network may be obtained by using, for example, an artificial intelligence AI system. More specifically, for example, an estimated-location in map of a place currently being displayed on the main image 5210 may be obtained by using network-based deep-learning, and the digital device may receive information about the estimated location on the map of the place currently being displayed on the main image 5210 through the network.

The digital device according to an embodiment may receive at least one of image information of the main image 5210 and image information of the auxiliary image 5220 from the outside. The image information of the main image 5210 may include, for example, a broadcast signal received through a broadcasting channel, source code information of the main image 5210, and IP packet (internet protocol packet) information of the main image 5210 received through a network, but is not limited thereto. Similarly, the image information of the auxiliary image 5220 includes, for example, a broadcast signal received through a broadcast channel, source code information of the auxiliary image 5220, IP packet information of the auxiliary image 5220 received through a network, etc., but is not limited to. The digital device may decode and use the image information of the main image 5210 received from the outside or the image information of the auxiliary image 5220. However, in some cases, the digital device may store image information of the main image 5210 or image information of the auxiliary image 5220 internally.

The digital device may display the main image 5210 and the auxiliary image 5220 on the screen 5200 of the digital device based on the image information of the main image 5210 and information related to the auxiliary image 5220.

In one example, the decoding apparatus 200 of the digital device includes a main image decoding apparatus and an auxiliary image decoding apparatus, and the main image decoding apparatus and the auxiliary image decoding apparatus may respectively decode image information of the main image 5210 and image information of the auxiliary image 5220. A renderer includes a main video renderer (first renderer) and an auxiliary video renderer (second renderer). The main image renderer may display the main image 5210 on the first area of the screen 5200 of the digital device based on the information decoded by the main image decoding apparatus, and the auxiliary image renderer may cause the auxiliary image 5220 to be displayed on the second area of the screen 5200 of the digital device based on the information decoded by the auxiliary image decoding apparatus.

In another example, the decoding apparatus 200 of the digital device may decode image information of the main image 5210 and image information of the auxiliary image 5220. Based on the information decoded by the decoding apparatus 200, the renderer may process the main image 5210 and the auxiliary image 5220 together to be simultaneously displayed on the screen 5200 of the digital device.

That is, according to this document, it is possible to provide a method for processing an image service in a digital device. The image service processing method may comprise: receiving image information, decoding a (main) image based on the image information, rendering or displaying the decoded image in a first area on the display, and rendering or displaying an auxiliary image an auxiliary image in a second area on the display. In this case, the step of decoding the first image may follow the decoding procedure in the decoding apparatus 200 according to FIG. 3 described above. For example, as described above, the step of decoding the first image may include deriving prediction samples for a current block based on inter or intra prediction, deriving residual samples for the current block based on the received residual information, and generating reconstructed samples based on prediction samples and/or the residual samples. Additionally, the step of decoding the first image may include performing an in-loop filtering procedure on a reconstructed picture including reconstructed samples.

For example, the auxiliary image may be an electronic program guide EPG, an on-screen display OSD, or a graphical user interface GUI. For example, the image information may be received through a broadcast network, and information regarding the auxiliary image may be received through the broadcast network. For example, the image information may be received through the communication network, and information regarding the auxiliary image may be received through the communication network. For example, the image information may be received through the broadcast network, and information regarding the auxiliary image may be received through the communication network. For example, the image information may be received through the broadcast network or the communication network, and information regarding the auxiliary image may be stored in a storage medium in the digital device.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

What is claimed is:

1. A method of decoding an image based on inter prediction, the method comprising: deriving a motion vector predictor (MVP) based on motion information of a neighboring block of a current block; deriving layer information indicating a current layer to which horizontal and vertical components of a motion vector difference (MVD) used for the inter prediction of the current block belong; deriving index information indicating a combination of the horizontal and vertical components of the MVD in the current layer; deriving the MVD based on the layer information and the index information; deriving a motion vector of the current block based on the MVP and the MVD; and generating a prediction block of the current block based on the motion vector of the current block, wherein the deriving the MVD further comprises:

parsing a first syntax indicating whether an identification (ID) of the current layer is greater than 0, parsing a second syntax indicating whether the current layer belongs to a first layer group based on that the ID of the current layer is greater than 0, parsing a third syntax indicating whether the ID of the current layer is 1 or 2 based on that the current layer belongs to a first layer group, and parsing ID information indicating the ID of the current layer based on that the ID of the current layer is greater than 0.

2. The method of claim 1, wherein the layer information includes at least one syntax element indicating a layer group to which the current layer belongs, and wherein the index information is binarized based on a truncated binarization scheme.

3. The method of claim 1, wherein the ID of the current layer is determined as 3 based on that the current layer does not belong to the first layer group.

4. The method of claim 1, wherein the ID information is binarized based on exponential Golomb code with order 1.

5. A method of encoding an image based on inter prediction, the method comprising: deriving a motion vector predictor (MVP) based on motion information of a neighboring block of a current block; deriving layer information indicating a current layer to which horizontal and vertical components of a motion vector difference (MVD) used for the inter prediction of the current block belong; deriving index information indicating a combination of the horizontal and vertical components of the MVD in the current layer; deriving the MVD based on the layer information and the index information; deriving a motion vector of the current block based on the MVP and the MVD; and generating a prediction block of the current block; and encoding image information including the layer information and the index information, wherein the deriving the MVD further comprises:

parsing a first syntax indicating whether an identification (ID) of the current layer is greater than 0, parsing a second syntax indicating whether the current layer belongs to a first layer group based on that the ID of the current layer is greater than 0, parsing a third syntax indicating whether the ID of the current layer is 1 or 2 based on that the current layer belongs to a first layer group, and parsing ID information indicating the ID of the current layer based on that the ID of the current layer is greater than 0.

6. The method of claim 5, wherein the layer information includes at least one syntax element indicating a layer group to which the current layer belongs, and wherein the index information is binarized based on a truncated binarization scheme.

7. The method of claim 5, wherein the ID of the current layer is determined as 3 based on that the current layer does not belong to the first layer group.

8. The method of claim 5, wherein the ID information is binarized based on exponential Golomb code with order 1.

9. A transmission method for data comprising a bitstream for an image, the method comprising: obtaining the bitstream for the image; and transmitting the data comprising the bitstream, wherein the bitstream is generated by performing the steps of: deriving a motion vector predictor (MVP) based on motion information of a neighboring block of a current block; deriving layer information indicating a current layer to which horizontal and vertical components of a motion vector difference (MVD) used for inter prediction of the current block belong; deriving index information indicating a combination of the horizontal and vertical components of the MVD in the current layer; deriving the MVD based on the layer information and the index information; deriving a motion vector of the current block based on the MVP and the MVD; and generating a prediction block of the current block; and encoding image information including the layer information and the index information, wherein the deriving the MVD further comprises:

parsing a first syntax indicating whether an identification (ID) of the current layer is greater than 0, parsing a second syntax indicating whether the current layer belongs to a first layer group based on that the ID of the current layer is greater than 0, parsing a third syntax indicating whether the ID of the current layer is 1 or 2 based on that the current layer belongs to a first layer group, and parsing ID information indicating the ID of the current layer based on that the ID of the current layer is greater than 0.

\* \* \* \* \*